United States Patent
Bhattad et al.

(10) Patent No.: US 11,570,815 B2
(45) Date of Patent: Jan. 31, 2023

(54) SHARED CHANNEL DESIGN AROUND RESERVED RESOURCES

(71) Applicant: QUALCOMM Incorporated, San Diego, CA (US)

(72) Inventors: Kapil Bhattad, Bangalore (IN); Jing Sun, San Diego, CA (US); Xiaoxia Zhang, San Diego, CA (US); Ananta Narayanan Thyagarajan, Bangalore (IN); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/474,750

(22) Filed: Sep. 14, 2021

(65) Prior Publication Data

US 2021/0410189 A1 Dec. 30, 2021

Related U.S. Application Data

(62) Division of application No. 16/406,624, filed on May 8, 2019, now Pat. No. 11,129,196.

(30) Foreign Application Priority Data

May 11, 2018 (IN) .............................. 201841017827

(51) Int. Cl.
*H04W 74/08* (2009.01)
*H04W 74/00* (2009.01)
(Continued)

(52) U.S. Cl.
CPC ....... *H04W 74/0825* (2013.01); *H04L 1/0013* (2013.01); *H04W 16/14* (2013.01);
(Continued)

(58) Field of Classification Search
CPC ............. H04W 74/0825; H04W 16/14; H04W 72/1268; H04W 72/14; H04W 74/006; H04L 1/0013
See application file for complete search history.

(56) References Cited

U.S. PATENT DOCUMENTS 10,397,939 B2 * 8/2019 Yin ..................... H04W 84/042
10,694,535 B2 * 6/2020 Park ................... H04W 74/0808
(Continued)

FOREIGN PATENT DOCUMENTS

| WO | WO2016122249 A2 | 8/2016 | |
|---|---|---|---|
| WO | WO2017130764 A1 | 8/2017 | |
| WO | WO-2017171350 A1 * | 10/2017 | ........... H04L 5/0035 |

OTHER PUBLICATIONS

International Preliminary Report on Patentability—PCT/US2019/031441, The International Bureau of WIPO—Geneva, Switzerland, dated Nov. 26, 2020.
(Continued)

*Primary Examiner* — Michael J Moore, Jr.
(74) *Attorney, Agent, or Firm* — Liem T. Do; Holland & Hart LLP

(57) ABSTRACT

Methods, systems, and devices for wireless communications are described. A user equipment (UE) may rate match an uplink transmission around a set of resources reserved by a base station. The base station may indicate a set of reserved resources which overlaps an uplink resource allocation to the UE. The base station may transmit an indicator of the reserved resources, and the UE may identify a location of a clear channel assessment (CCA) gap in a symbol period relative to the reserved resources. By rate matching around the reserved resources and one or more CCA gaps, the UE may transmit uplink information despite the allocated uplink resources colliding with the reserved resources.

28 Claims, 28 Drawing Sheets

(51) Int. Cl.
- *H04L 1/00* (2006.01)
- *H04W 72/14* (2009.01)
- *H04W 72/12* (2009.01)
- *H04W 16/14* (2009.01)

(52) U.S. Cl.
CPC ....... *H04W 72/1268* (2013.01); *H04W 72/14* (2013.01); *H04W 74/006* (2013.01)

(56) References Cited

U.S. PATENT DOCUMENTS

| | | | |
|---|---|---|---|
| 11,129,196 B2* | 9/2021 | Bhattad | H04W 16/14 |
| 2016/0344526 A1* | 11/2016 | Fan | H04L 5/0051 |
| 2017/0135090 A1* | 5/2017 | Yin | H04L 5/001 |
| 2017/0215171 A1 | 7/2017 | Sun et al. | |
| 2017/0238272 A1* | 8/2017 | You | H04L 5/001 370/350 |
| 2017/0325216 A1* | 11/2017 | Nogami | H04L 1/1896 |
| 2017/0325258 A1* | 11/2017 | Nogami | H04J 11/00 |
| 2017/0332395 A1* | 11/2017 | Yin | H04W 72/1294 |
| 2018/0205534 A1* | 7/2018 | Yi | H04W 72/044 |
| 2018/0234871 A1* | 8/2018 | Ahn | H04L 5/0048 |
| 2019/0014598 A1 | 1/2019 | Yoshimura et al. | |
| 2019/0075581 A1* | 3/2019 | Salem | H04W 72/1289 |
| 2019/0090276 A1* | 3/2019 | Lee | H04W 74/0808 |
| 2019/0349992 A1* | 11/2019 | Zhang | H04L 5/0048 |
| 2019/0349998 A1* | 11/2019 | Bhattad | H04W 74/0825 |
| 2019/0363824 A1* | 11/2019 | Sun | H04L 1/1887 |
| 2020/0374897 A1* | 11/2020 | Yerramalli | H04L 27/2662 |

OTHER PUBLICATIONS

International Search Report and Written Opinion—PCT/US2019/031441—ISA/EPO—dated Sep. 25, 2019.

Partial International Search Report—PCT/US2019/031441—ISA/EPO—dated Jul. 18, 2019.

\* cited by examiner

SHARED CHANNEL DESIGN AROUND RESERVED RESOURCES

CROSS REFERENCES

The present Application for Patent is a Divisional of U.S. patent application Ser. No. 16/406,624 by Bhattad et al., entitled "SHARED CHANNEL DESIGN AROUND RESERVED RESOURCES" filed May 8, 2019, which claims the benefit of Indian Patent Application No. 201841017827 by Bhattad et al., entitled "Shared Channel Design Around Reserved Resources," filed May 11, 2018, assigned to the assignee hereof, and expressly incorporated herein.

BACKGROUND

The following relates generally to wireless communications, and more specifically to shared channel design around reserved resources.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A base station may provide a grant of uplink resources to a UE for transmitting information via an uplink shared channel, such as a physical uplink shared channel (PUSCH). In some examples, the UE and the base station may communicate using a shared radio frequency spectrum band (e.g., an unlicensed radio frequency spectrum band). A wireless device which wants to transmit on the shared radio frequency spectrum band may first perform a clear channel assessment (CCA) procedure before transmitting to determine whether any other wireless device is currently transmitting in the shared radio frequency spectrum band. If the shared radio frequency spectrum band is available, the wireless device may transmit after completing the CCA procedure. If unavailable, the wireless device may perform a subsequent CCA procedure at a later time before attempting to transmit on the shared radio frequency spectrum band. Conventional techniques for transmitting uplink transmission using a shared radio frequency spectrum band are deficient.

SUMMARY

The techniques described herein generally relate to a user equipment (UE) rate matching an uplink transmission around a set of reserved resources and a clear channel assessment (CCA) gap. A base station may indicate a set of reserved resources which may overlap with resources of a shared radio frequency spectrum band in which the UE may be allocated resources for transmitting an uplink transmission. In some cases, the base station may explicitly indicate the locations of one or more CCA gaps. The reserved resources may include, for example, a physical random access channel (PRACH) in which one or more wireless devices (e.g., other UEs) may transmit a random access request when attempting to establish connectivity with the base station. The CCA gap may be positioned relative to the reserved resources to enable a wireless device (e.g., second UE) to perform a CCA procedure within the CCA gap. If the CCA procedure indicates that the shared radio frequency spectrum band is available, the UE may send a transmission using the reserved resources. The UE may rate match its uplink transmission around the reserved resources and in the CCA gap to avoid transmitting in the reserved resources and in the CCA gap. Such rate matching may permit the reserved resources to remain accessible by other wireless devices. By rate matching around the reserved resources and the CCA gap, the UE may transmit uplink information despite the allocated uplink resources colliding with the reserved resources and the CCA gap.

A method of wireless communication at a UE is described. The method may include receiving an indicator of reserved resources in a shared radio frequency spectrum band, rating matching an uplink shared data channel transmission around the reserved resources, and transmitting, within the shared radio frequency spectrum band, the rate matched uplink shared data channel transmission.

An apparatus for wireless communication at a UE is described. The apparatus may include a processor, memory in electronic communication with the processor, and instructions stored in the memory. The instructions may be executable by the processor to cause the apparatus to receive an indicator of reserved resources in a shared radio frequency spectrum band, rate matching an uplink shared data channel transmission around the reserved resources, and transmit, within the shared radio frequency spectrum band, the rate matched uplink shared data channel transmission.

Another apparatus for wireless communication at a UE is described. The apparatus may include means for receiving an indicator of reserved resources in a shared radio frequency spectrum band, rating matching an uplink shared data channel transmission around the reserved resources, and transmitting, within the shared radio frequency spectrum band, the rate matched uplink shared data channel transmission.

A non-transitory computer-readable medium storing code for wireless communication at a UE is described. The code may include instructions executable by a processor to receive an indicator of reserved resources in a shared radio frequency spectrum band, rate matching an uplink shared data channel transmission around the reserved resources, and transmit, within the shared radio frequency spectrum band, the rate matched uplink shared data channel transmission.

Some examples of the method, apparatuses, and non-transitory computer-readable medium described herein may further include operations, features, means, or instructions for identifying a location of a CCA gap relative to the reserved resources, and rate matching the uplink shared data channel transmission around the CCA gap.

In some examples of the method, apparatuses, and non-transitory computer-readable medium described herein, identifying the location of the CCA gap further may include operations, features, means, or instructions for receiving a grant indicating allocated resources within the shared radio frequency spectrum band for the uplink shared data channel transmission, the grant indicating that the CCA gap occurs at a particular period of the allocated resources.

Some examples of the method, apparatuses, and non-transitory computer-readable medium described herein may further include operations, features, means, or instructions for performing a CCA prior to resuming transmission of the rate matched uplink shared data channel transmission, in frequencies occupied by the reserved resources, after an end of the reserved resources and a CCA gap.

In some examples of the method, apparatuses, and non-transitory computer-readable medium described herein, the rate matched uplink shared data channel transmission may be transmitted in an uplink shared data channel and the indicator indicates a configuration of an uplink channel other than the uplink shared data channel.

In some examples of the method, apparatuses, and non-transitory computer-readable medium described herein, the rate matched uplink shared data channel transmission may be transmitted in an uplink shared data channel and the indicator of the reserved resources includes an implicit indication of the reserved resources based on a configuration of a second uplink channel other than the uplink shared data channel.

In some examples of the method, apparatuses, and non-transitory computer-readable medium described herein, receiving the indicator of the reserved resources further may include operations, features, means, or instructions for receiving a broadcast signaling including the indicator of the reserved resources, where the indicator of the reserved resources may be specific to a cell that transmitted the broadcast signaling.

In some examples of the method, apparatuses, and non-transitory computer-readable medium described herein, receiving the indicator of the reserved resources further may include operations, features, means, or instructions for receiving a control signaling including the indicator of the reserved resources, where the indicator of the reserved resources may be specific to the UE.

Some examples of the method, apparatuses, and non-transitory computer-readable medium described herein may further include operations, features, means, or instructions for selecting a collision response from a set of different collisions responses based on determining that a reference signal may be scheduled for transmission within the reserved resources.

Some examples of the method, apparatuses, and non-transitory computer-readable medium described herein may further include operations, features, means, or instructions for selecting the collision response from the set of different collision responses based on a number of symbols of the reference signal, a number of symbols of the reference signal that collide with the reserved resources, a waveform type of the uplink shared data channel transmission, downlink control information (DCI) signaling, whether the reference signal may be scheduled for transmission within the reserved resources, a type of the reserved resources, or any combination thereof.

In some examples of the method, apparatuses, and non-transitory computer-readable medium described herein, the indicator may be a bitmap that identifies a symbol level and resource block level rate matching resource set.

In some examples of the method, apparatuses, and non-transitory computer-readable medium described herein, the indicator may be a bitmap that identifies a symbol level and sub-resource block level rate matching resource set.

A method of wireless communication at a UE is described. The method may include receiving an indicator of a set of random access resources in a shared radio frequency spectrum band, identifying a location of a CCA gap between a first random access resource of the set of random access resources and a second random access resource of the set of random access resources, performing a CCA procedure during the CCA gap, and determining whether to transmit on the second random access resource based on a result of the CCA procedure.

An apparatus for wireless communication at a UE is described. The apparatus may include a processor, memory in electronic communication with the processor, and instructions stored in the memory. The instructions may be executable by the processor to cause the apparatus to receive an indicator of a set of random access resources in a shared radio frequency spectrum band, identify a location of a CCA gap between a first random access resource of the set of random access resources and a second random access resource of the set of random access resources, perform a CCA procedure during the CCA gap, and determine whether to transmit on the second random access resource based on a result of the CCA procedure.

Another apparatus for wireless communication at a UE is described. The apparatus may include means for receiving an indicator of a set of random access resources in a shared radio frequency spectrum band, identifying a location of a CCA gap between a first random access resource of the set of random access resources and a second random access resource of the set of random access resources, performing a CCA procedure during the CCA gap, and determining whether to transmit on the second random access resource based on a result of the CCA procedure.

A non-transitory computer-readable medium storing code for wireless communication at a UE is described. The code may include instructions executable by a processor to receive an indicator of a set of random access resources in a shared radio frequency spectrum band, identify a location of a CCA gap between a first random access resource of the set of random access resources and a second random access resource of the set of random access resources, perform a CCA procedure during the CCA gap, and determine whether to transmit on the second random access resource based on a result of the CCA procedure.

In some examples of the method, apparatuses, and non-transitory computer-readable medium described herein, the indicator indicates that the location of the CCA gap may be between the first random access resource and the second random access resource.

In some examples of the method, apparatuses, and non-transitory computer-readable medium described herein, the CCA gap includes a configurable number of symbol periods.

In some examples of the method, apparatuses, and non-transitory computer-readable medium described herein, a random access occasion associated with a random access resource of the set of random access resources includes one or more of a random access cyclic prefix duration, a set of random access symbol periods, and a guard time.

In some examples of the method, apparatuses, and non-transitory computer-readable medium described herein, identifying the location of the CCA gap further may include operations, features, means, or instructions for determining that the CCA gap may be located between the first random access resource and the second random access resource.

In some examples of the method, apparatuses, and non-transitory computer-readable medium described herein, identifying the location of the CCA gap further may include operations, features, means, or instructions for identifying the location of the CCA gap between each pair of random access resources within the set of random access resources.

Some examples of the method, apparatuses, and non-transitory computer-readable medium described herein may further include operations, features, means, or instructions for determining that a first subset of the set of random access resources correspond to a first transmission time interval (TTI) and a second subset of the set of random access resources correspond to a second TTI, and determining whether to use the second subset of the set of random access resources to transmit a random access message.

In some examples of the method, apparatuses, and non-transitory computer-readable medium described herein, determining whether to use the second subset of the set of random access resources further may include operations, features, means, or instructions for determining to use the second subset of the set of random access resources to send the random access message based on a TTI type indicator or a subframe format indicator (SFI) associated with the second TTI.

In some examples of the method, apparatuses, and non-transitory computer-readable medium described herein, determining whether to use the second subset of the set of random access resources further may include operations, features, means, or instructions for receiving a configuration message that indicates whether to use a random access resource of the set of random access resources that occurs within the second TTI.

A method of wireless communication at a base station is described. The method may include transmitting an indicator of reserved resources in a shared radio frequency spectrum band, receiving, within the shared radio frequency spectrum band, a rate matched uplink shared data channel transmission, and de-rating matching the rate matched uplink shared data channel transmission based on the reserved resources.

An apparatus for wireless communication at a base station is described. The apparatus may include a processor, memory in electronic communication with the processor, and instructions stored in the memory. The instructions may be executable by the processor to cause the apparatus to transmit an indicator of reserved resources in a shared radio frequency spectrum band, receive, within the shared radio frequency spectrum band, a rate matched uplink shared data channel transmission, and de-rate matching the rate matched uplink shared data channel transmission based on the reserved resources.

Another apparatus for wireless communication at a base station is described. The apparatus may include means for transmitting an indicator of reserved resources in a shared radio frequency spectrum band, receiving, within the shared radio frequency spectrum band, a rate matched uplink shared data channel transmission, and de-rating matching the rate matched uplink shared data channel transmission based on the reserved resources.

A non-transitory computer-readable medium storing code for wireless communication at a base station is described. The code may include instructions executable by a processor to transmit an indicator of reserved resources in a shared radio frequency spectrum band, receive, within the shared radio frequency spectrum band, a rate matched uplink shared data channel transmission, and de-rate matching the rate matched uplink shared data channel transmission based on the reserved resources.

Some examples of the method, apparatuses, and non-transitory computer-readable medium described herein may further include operations, features, means, or instructions for identifying a location of a CCA gap relative to the reserved resources, and de-rate matching the rate matched uplink shared data channel transmission based on the location of the CCA gap.

Some examples of the method, apparatuses, and non-transitory computer-readable medium described herein may further include operations, features, means, or instructions for transmitting a grant indicating the location of the CCA gap.

In some examples of the method, apparatuses, and non-transitory computer-readable medium described herein, the indicator may be a bitmap that identifies a symbol level and resource block level rate matching resource set or identifies a symbol level and sub-resource block level rate matching resource set.

A method of wireless communication at a base station is described. The method may include transmitting an indicator of a set of random access resources in a shared radio frequency spectrum band, identifying a location of a CCA gap between a first random access resource of the set of random access resources and a second random access resource of the set of random access resources, and monitoring the second random access resource based on the location of the CCA gap.

An apparatus for wireless communication at a base station is described. The apparatus may include a processor, memory in electronic communication with the processor, and instructions stored in the memory. The instructions may be executable by the processor to cause the apparatus to transmit an indicator of a set of random access resources in a shared radio frequency spectrum band, identify a location of a CCA gap between a first random access resource of the set of random access resources and a second random access resource of the set of random access resources, and monitor the second random access resource based on the location of the CCA gap.

Another apparatus for wireless communication at a base station is described. The apparatus may include means for transmitting an indicator of a set of random access resources in a shared radio frequency spectrum band, identifying a location of a CCA gap between a first random access resource of the set of random access resources and a second random access resource of the set of random access resources, and monitoring the second random access resource based on the location of the CCA gap.

A non-transitory computer-readable medium storing code for wireless communication at a base station is described. The code may include instructions executable by a processor to transmit an indicator of a set of random access resources in a shared radio frequency spectrum band, identify a location of a CCA gap between a first random access resource of the set of random access resources and a second random access resource of the set of random access resources, and monitor the second random access resource based on the location of the CCA gap.

In some examples of the method, apparatuses, and non-transitory computer-readable medium described herein, the indicator indicates that the location of the CCA gap may be between the first random access resource of the set of random access resources and the second random access resource of the set of random access resources.

In some examples of the method, apparatuses, and non-transitory computer-readable medium described herein, the CCA gap includes a configurable number of symbol periods.

Some examples of the method, apparatuses, and non-transitory computer-readable medium described herein may further include operations, features, means, or instructions for receiving a random access message during the first random access resource of the set of random access resources.

Some examples of the method, apparatuses, and non-transitory computer-readable medium described herein may further include operations, features, means, or instructions for receiving a random access message during each random access resource of the set of random access resources.

DETAILED DESCRIPTION

Figure 1:
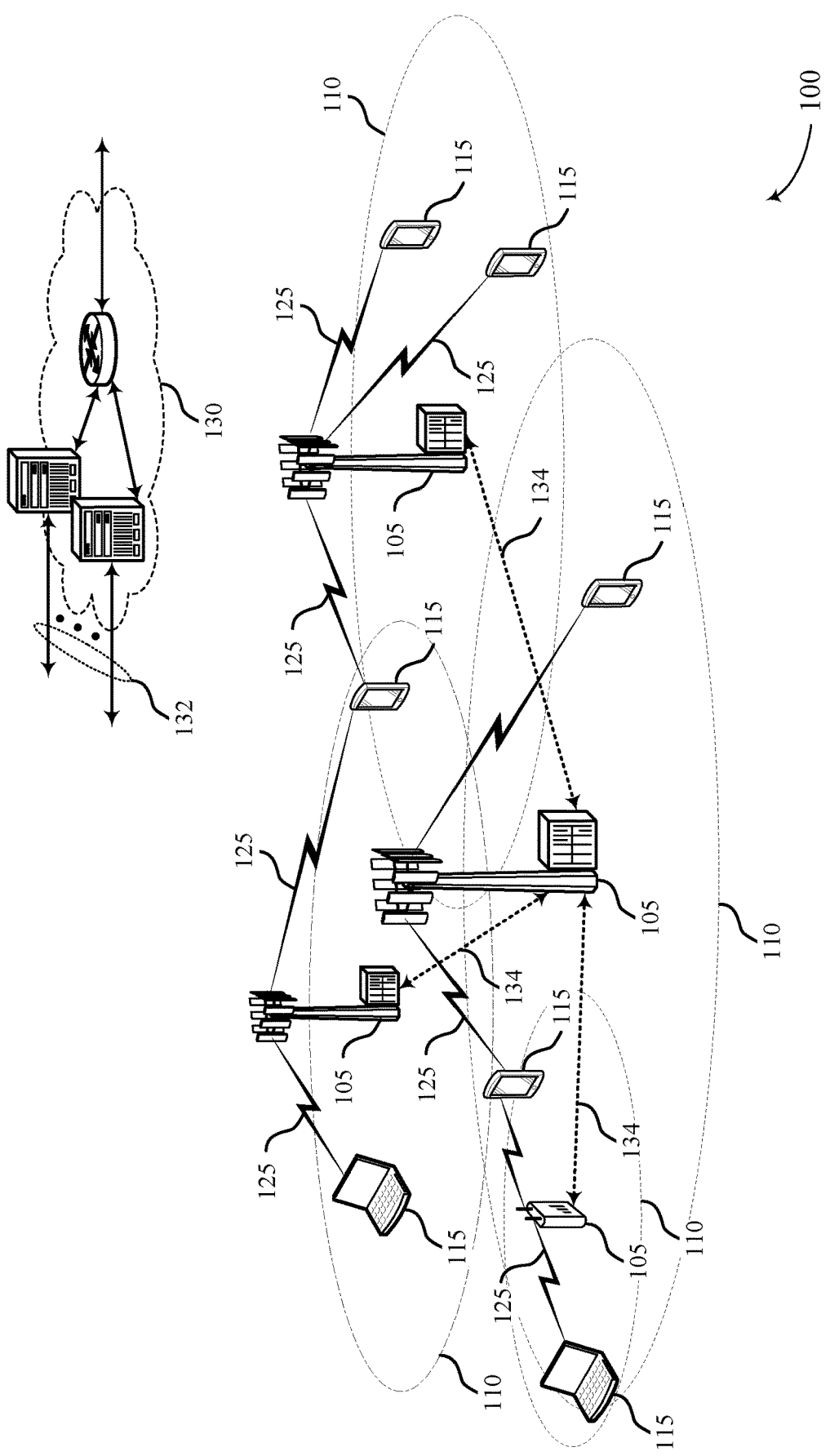
FIG. 1 illustrates an example of a system for wireless communications that supports shared channel design around reserved resources in accordance with aspects of the present disclosure.

The techniques described herein generally relate to a user equipment (UE) transmitting an uplink transmission around a set of reserved resources and a clear channel assessment (CCA) gap. Transmitting an uplink transmission around a set of reserved resource and the CCA gap may include rate matching, or puncturing, or a combination thereof. Rate matching and puncturing may be used interchangeably such that if rate matching is described, puncturing or another method may also apply. A base station may transmit an indicator of reserved resources which, in some examples, may overlap with resources of a shared radio frequency spectrum band in which the UE may be allocated resources for transmitting an uplink transmission. The CCA gap may be positioned relative to the reserved resources to enable a wireless device (e.g., second UE) to perform a CCA procedure within the CCA gap. The UE may rate match its uplink transmission around the reserved resources and the CCA gap to avoid transmitting in the reserved resources and in the CCA gap. By rate matching around the reserved resources, the UE may be able to transmit uplink information despite the allocated uplink resources colliding with the reserved resources and the CCA gap. Thus, the techniques described herein may efficiently use the shared radio frequency spectrum band and use CCA gaps for maintaining fair access to the reserved resources for a number of UEs.

Wireless devices communicating using the shared radio frequency spectrum band may perform a CCA prior to transmitting on the reserved resources. To accommodate use of the reserved resources, the UE may not transmit in a CCA gap that is located relative to the reserved resources. The UE may rate match around the CCA gap and the reserved resources to allow wireless devices (e.g., other UEs or itself) to perform a CCA in the CCA gap and transmit using the reserved resources. In some cases, the UE may transmit in symbol periods of the allocated resources after the reserved resources. In some cases, the reserved resources and CCA gap indicators may be UE-specific or cell-specific. The reserved resources may, for example, only span a few symbols in a slot. The reserved resources may be a random access channel (RACH), a physical uplink control channel (PUCCH), or the like. In some examples, the UE may use the reserved resources for transmitting a sounding reference signal (SRS), uplink ultra-reliable low latency communications (URLLC), or for other uplink communications.

In some cases, a grant indicating an uplink resource allocation to a UE may also indicate the reserved resources. In some cases, the reserved resources may be indicated separately from the grant. The UE may rate match around the reserved resources when transmitting uplink information. In some cases, the reserved resources may occupy a discontinuous set of frequencies. In some cases, if the reserved resources do not occupy the entire allocated bandwidth, the UE may transmit using a subset of the allocated bandwidth which does not overlap with the reserved resources. The UE may transmit on the subset of the allocated bandwidth using a different power spectral density (PSD) than when transmitting on the full allocated bandwidth. In some cases, the UE may perform a CCA prior to resuming transmission of the rate matched uplink shared data channel transmission, in frequencies occupied by the reserved resources, after an end of the reserved resources and the CCA gap.

The base station may transmit an indicator of the reserved resources to UE, and, in some examples, the UE may identify the reserved resources and any CCA gaps associated with the reserved resources based on the indicator. The reserved resources and the CCA gaps may be explicitly or implicitly indicated by the base station, and indicators for different rate matched resources may be transmitted by different layers or using different techniques (e.g., implicitly vs explicitly). In some cases, the indicators for different rate matched resources may be transmitted at different times. In some cases, the base station may not explicitly indicate the reserved resources by an indicator. For example, the UE may identify a RACH configured by the base station and implicitly assume this as a reserved resource. In some cases, the reserved resources may be scheduled for the same time and frequency resources as a demodulation reference signal (DMRS). The UE may implement techniques to handle collisions between a DMRS transmission and the reserved resources.

Aspects of the disclosure are initially described in the context of a wireless communications system. Aspects of the disclosure are further illustrated by and described with reference to apparatus diagrams, system diagrams, and flowcharts that relate to uplink shared channel design around reserved resources and multiple CCA sensing locations for an uplink burst grant. Aspects of the disclosure are further illustrated by and described with reference to apparatus diagrams, system diagrams, and flowcharts that relate to shared channel design around reserved resources and CCA gaps.

FIG. 1 illustrates an example of a wireless communications system 100 that supports shared channel design around reserved resources in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may be called forward link transmissions while uplink transmissions may be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\,T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a mini-slot or a symbol of a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a system bandwidth of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA)

or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

In some cases, base station 105 may use a block interlace structure for PRACH. A shared radio frequency spectrum band (e.g., an unlicensed band) may have regulatory limits on the total power transmitted and the PSD. The PSD limit in the shared radio frequency spectrum band is typically defined as maximum power in a 1 MHz bandwidth. For example, a PSD limit that may be mandated is 10 dBm/MHz, meaning that the max power transmitted in any 1 MHz bandwidth should be less than or equal to 10 dBm. In a typical 20 MHz bandwidth communication the transmit power is limited by the PSD limit. In enhanced licensed assisted access (eLAA), interlaced allocation in the uplink may be used to overcome the PSD limitation on the total power. If a UE is allocated dis-contiguous chunks of frequencies within the bandwidth, where each chunk is separated from its neighbor by more than 1 MHz, then each chunk can transmit the full 10 dBm for example. In eLAA, for a 20 MHz bandwidth there are a total of 100 resource blocks (RBs). The 100 RBs may be divided into 10 interlaces of 10 RBs each, where RBs in each interlace are spaced by 10 RBs. For example, if the RBs are numbered 0-99, interlace0 is defined as {0, 10, 20, . . . , 90}, the interlace1 is {1, 11, 21, . . . 91}, and so forth. Thus, in any given interlace, there is 1 RB within any 1 MHz bandwidth, whereas the total allocation is 10 RBs and the maximum power that can be transmitted is 23 dBm. If the 10 RBs had be allocated contiguously, the UE 115 can transmit a max of 16 dBm power due to 10 contiguous RBs covering 2 MHz bandwidth. In some examples, a UE 115 may be allocated resources in the granularity of interlaces. The regulatory specification may also specify occupied channel bandwidth (OCB) (e.g., the OCB is to span 80% of the total bandwidth). The interlace definitions ay help meet the OCB requirements and, in some examples, it may be permitted to not meet this criteria for occasional short transmissions.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may rate match an uplink transmission around a set of resources reserved by a base station 105. The base station 105 may indicate the reserved resources which may overlap with an uplink resource allocation to the UE 115. The UE 115 may further identify a location of a CCA gap in a symbol period relative to the reserved resources. By rate matching an uplink transmission around the reserved resources and the CCA gap, the UE 115 may be able to still transmit uplink information despite the allocated uplink resources colliding with the reserved resources.

Figure 2:
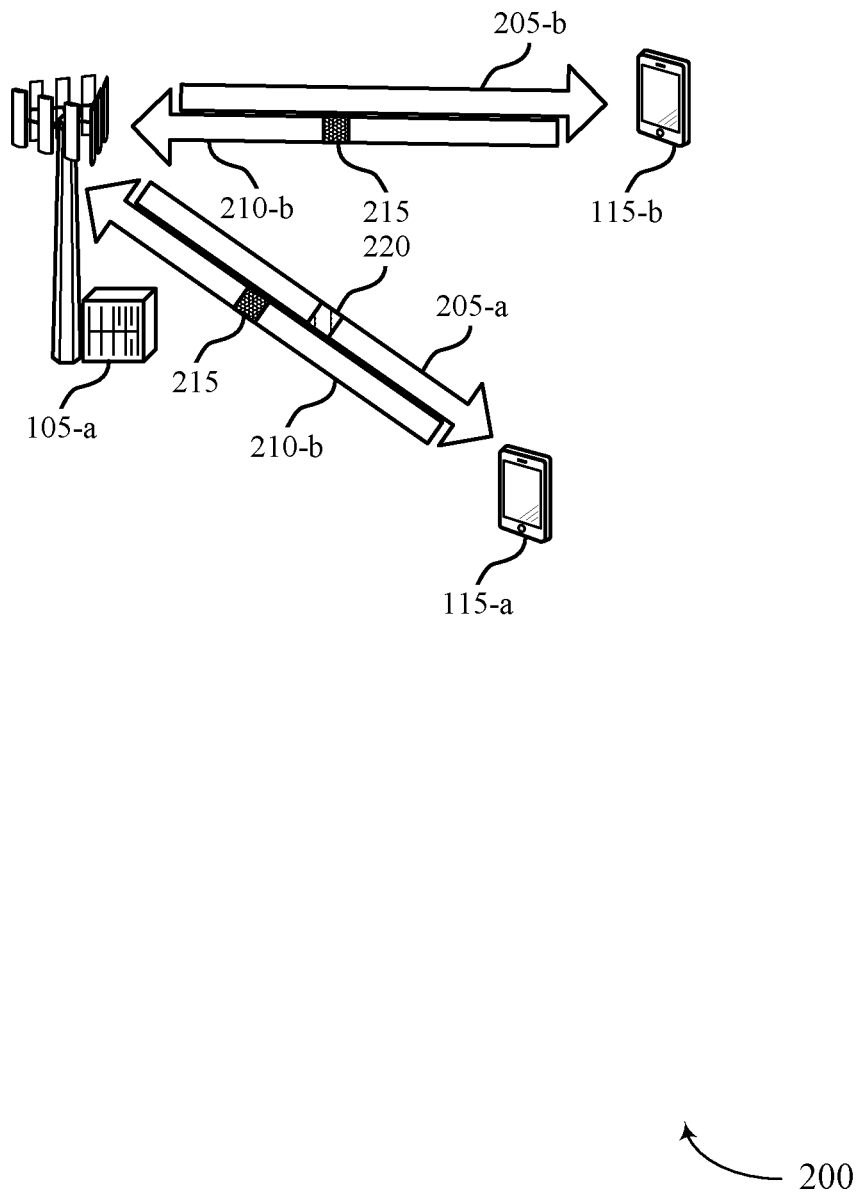
FIG. 2 illustrates an example of a wireless communications system that supports shared channel design around reserved resources in accordance with aspects of the present disclosure.

FIG. 2 illustrates an example of a wireless communications system 200 that supports shared channel design around reserved resources in accordance with aspects of the present disclosure. In some examples, wireless communications system 200 may implement aspects of wireless communications system 100.

Base station 105-a may serve UE 115-a and UE 115-b and communicate with the UEs 115 using a shared radio frequency spectrum band (e.g., an unlicensed radio frequency spectrum band). Base station 105-a may transmit a grant indicating an uplink resource allocation within the shared radio frequency spectrum band for the UE to transmit an uplink transmission (e.g., a physical uplink shared channel (PUSCH) transmission). There may be a CCA gap reserved for a CCA procedure between random access resources. Prior to transmitting, the UE 115 may perform a CCA procedure, such as an LBT procedure, to determine whether the shared radio frequency spectrum band is available (e.g., not currently being used by another detectable wireless device). If the UE 115 determines that the shared radio frequency spectrum band is available, the UE 115 may transmit uplink information to base station 105-a. For example, if UE 115-a is granted an uplink resource allocation on uplink connection 210-a, UE 115-a may perform a CCA procedure. If UE 115-a determines that the shared radio frequency spectrum band passes the CCA procedure, UE 115-a may transmit uplink data to base station 105-a using the shared radio frequency spectrum band. The UE 115 may determine whether to transmit on the uplink transmission or random access resources based on the CCA gap.

Base station 105-a may indicate a set of reserved resources in the shared radio frequency spectrum band, shown by the reserved resources 215. For example, the indication may be transmitted on a downlink connection 205-a. The reserved resources 215 may be reserved for specific UEs 115 (e.g., UE-specific) or on a per-cell basis (e.g., cell-specific), where any served or attached UE 115 may use the reserved resources 215. In some cases, the reserved resources 215 may only span a few symbols in a TTI. The UE or UEs 115 may use the reserved resources 215 for a RACH (e.g., a Physical RACH (PRACH)), transmitting a sounding reference signal (SRS), a physical uplink control channel (PUCCH), or uplink ultra-reliable low latency communications (URLLC), among other uplink communications. In some cases, such as if the reserved resources 215 are for PRACH transmissions, base station 105-*a* may use a known PRACH sequence having increased sub-carrier spacing (SCS) or use a tone interlace structure. In some cases, base station 105-*a* may use a block interlace structure for a reserved resource such as a PRACH.

In some cases, base station 105-*a* may transmit to the UE 115-*a* a grant that indicates the reserved resources 215 and an uplink resource allocation for UE 115-*a*. UE 115-*a* may rate match an uplink transmission around the reserved resources 215 when transmitting uplink information. For example, UE 115-*a* may transmit uplink information in up to all resource elements of a resource allocation indicated in a grant, other than resource elements of the reserved resources 215. In some cases, if the reserved resources 215 do not occupy the entire allocated bandwidth, UE 115-*a* may transmit at the same time as the reserved resources 215 using a subset of the allocated bandwidth which do not overlap with the reserved resources 215 in the frequency domain. UE 115-*a* may transmit on the subset of the allocated bandwidth using a different power spectral density (PSD) than when transmitting on the full allocated bandwidth (e.g., as explain in more detail in FIG. 4).

Wireless devices operating in the wireless communications system 200 may perform a CCA procedure prior to transmitting on the reserved resources 215. To enable performance of the CCA procedure, a CCA gap may be defined relative to the reserved resources 215. The UE 115-*a* may also rate match around the CCA gap and the reserved resources 215 to allow wireless devices (e.g., other UEs 115 or itself) to use the CCA gap to perform a CCA procedure and transmit using the reserved resources 215. In some cases, the CCA gap may be aligned with or adjacent to the reserved resources 215, such that a wireless device may perform a CCA during the CCA gap, and then transmit using the reserved resources 215 in the following symbol period. The UE 115-*a* may skip transmitting within the CCA gap, to avoid interfering with other wireless devices performing a CCA procedure within the CCA gap, thereby providing a fair opportunity for the other wireless devices to gain access to the transmission medium for transmitting using the reserved resources.

UE 115-*a* may transmit an uplink transmission around a set of reserved resources and a CCA gap. Transmitting an uplink transmission around a set of reserved resources and the CCA gap may include rate matching, or puncturing, or a combination thereof. Rate matching and puncturing may be used interchangeably such that if rate matching is described, puncturing or another method may also apply. In some cases, UE 115-*a* may attempt to continue transmitting its rate matched uplink transmission in symbol periods of the allocated resources after the reserved resources 215. To do so, UE 115-*a* may perform a CCA after the reserved resources and/or the CCA gap to confirm that the shared radio frequency band is available. If UE 115-*a* does not transmit in parallel with the reserved resources but transmits after the reserved resources, an additional CCA gap may be provided after the reserved resources for UE 115-*a* to perform the CCA. In some cases, UE 115-*a* may transmit around the reserved resources, CCA gaps before the reserved resources and potential CCA gap after the reserved resources. UE 115-*a* may perform such transmissions using rate matching or puncturing its planned transmission around the CCA gaps and reserved resources.

In some examples, base station 105-*a* may transmit an indicator 220 of the reserved resources 215 to UE 115-*a*. UE 115-*a* may identify the reserved resources 215 based on the indicator 220 and rate match around the reserved resources 215 and any CCA gaps associated with the reserved resources 215. The format of the indicator 220 or technique of indicating the resources may be based on one or more of whether the reserved resources 215 are UE-specific or cell-specific, the location of the reserved resources 215 relative to the resources allocated for UE 115-*a*, the use of the reserved resources 215 (e.g., PRACH, SRS, PUCCH, etc.), or the like.

In some cases, the indicator 220 may provide an explicit indication of the reserved resources (e.g., symbol period and tone), or the indicator 220 may include other information, and UE 115-*a* may implicitly identify the time and frequency information of the reserved resources 215, the CCA gap, or both, from the indicator 220. The indicator 220 may also include explicit or implicit indications of CCA gaps for the reserved resources 215. For example, the indicator 220 may explicitly indicate one of more symbol periods for a CCA gap, or UE 115-*a* may determine the symbol periods for the CCA gap based on the time and frequency resources of the reserved resources 215.

As an example of an explicit indication, the indicator 220 may include a bitmap which indicates the reserved resources at a symbol level in time and an RB level or sub-RB level in frequency. For example, each value in the bitmap may correspond to a resource in time and frequency at a symbol level and tone, resource block, or sub-resource block level. In some examples, a same RB level bitmap, or sub-RB level bitmap, may apply to every symbol in a symbol level bitmap.

In some cases, the wireless communications system 200 may use symbol-RB level rate matching. UE 115-*a* may identify the time and frequency information for the reserved resources 215 and rate match a transmission (e.g., PUSCH, PUCCH, etc.) around the reserved resources 215 at a symbol level in time and an RB level or sub-RB level in frequency and around one or more CCA gaps. An example of sub-RB may include 2, 3, 4, or 6 resource elements (REs), where rate matching at a sub-RB level is rate matching around REs. In some cases, UE 115-*a* may implement symbol-RB level rate matching for any format of indication or rate matching described herein.

As an example of an implicit indication, the indicator 220 may be a part of a grant transmitted by base station 105-*a*. Base station 105-*a* may not schedule UE 115-*a* for the allocated resources which overlap the reserved resources 215. UE 115-*a* may identify the reserved resources 215 based on the scheduling. For example, if UE 115-*a* is not scheduled for PUSCH transmission on certain tones during certain symbol periods, UE 115-*a* may implicitly determine those tones and symbol periods are used for the reserved resources 215, the CCA gap, or both. In some cases, base station 105-*a* may configure the reserved resources 215 for a channel such as RACH, and UE 115-*a* may determine implicitly to rate match around the reserved resources 215 when a grant allocates resources for a transmission (e.g., PUSCH) that collides with the reserved resources 215.

Resources that the UE 115-*a* is to rate match around, such as CCA gaps, UE-specific reserved resources, or cell-specific reserved resources, may be configured via different indications and at different layers or levels. For example, if the reserved resources 215 are cell-specific, the indicator 220 of the reserved resources 215 may be broadcast in system information (e.g., in a system information block (SIB)), indicated in remaining minimum system information (RMSI), or other system information (OSI). If the reserved resources 215 are used for PRACH, base station 105-*a* may transmit an indicator 220 for the PRACH resources. UE 115-*a* may then determine that a CCA gap is in a symbol period adjacent to a beginning symbol period of the indicated PRACH resources, to permit performance of a CCA procedure immediately prior to the beginning symbol period of the PRACH resources. For a CCA gap located between data and control channels (e.g., PUSCH and a reserved resource of PUCCH), the OSI may configure the UE 115-*a* with which resources to rate match around (e.g., rate match around control channel and a CCA gap).

If the reserved resources 215 are UE-specific, the base station 105-*a* may use RRC signaling to indicate the reserved resources 215 to the UE 115-*a*, and hence the indicated reserved resources 215 may be UE-specific. For example, reserved resources for PRACH, PUCCH, etc. may be indicated to UE 115-*a* in UE-specific RRC signaling, and UE 115-*a* may rate match PUSCH around the indicated reserved resources 215.

Figure 5:
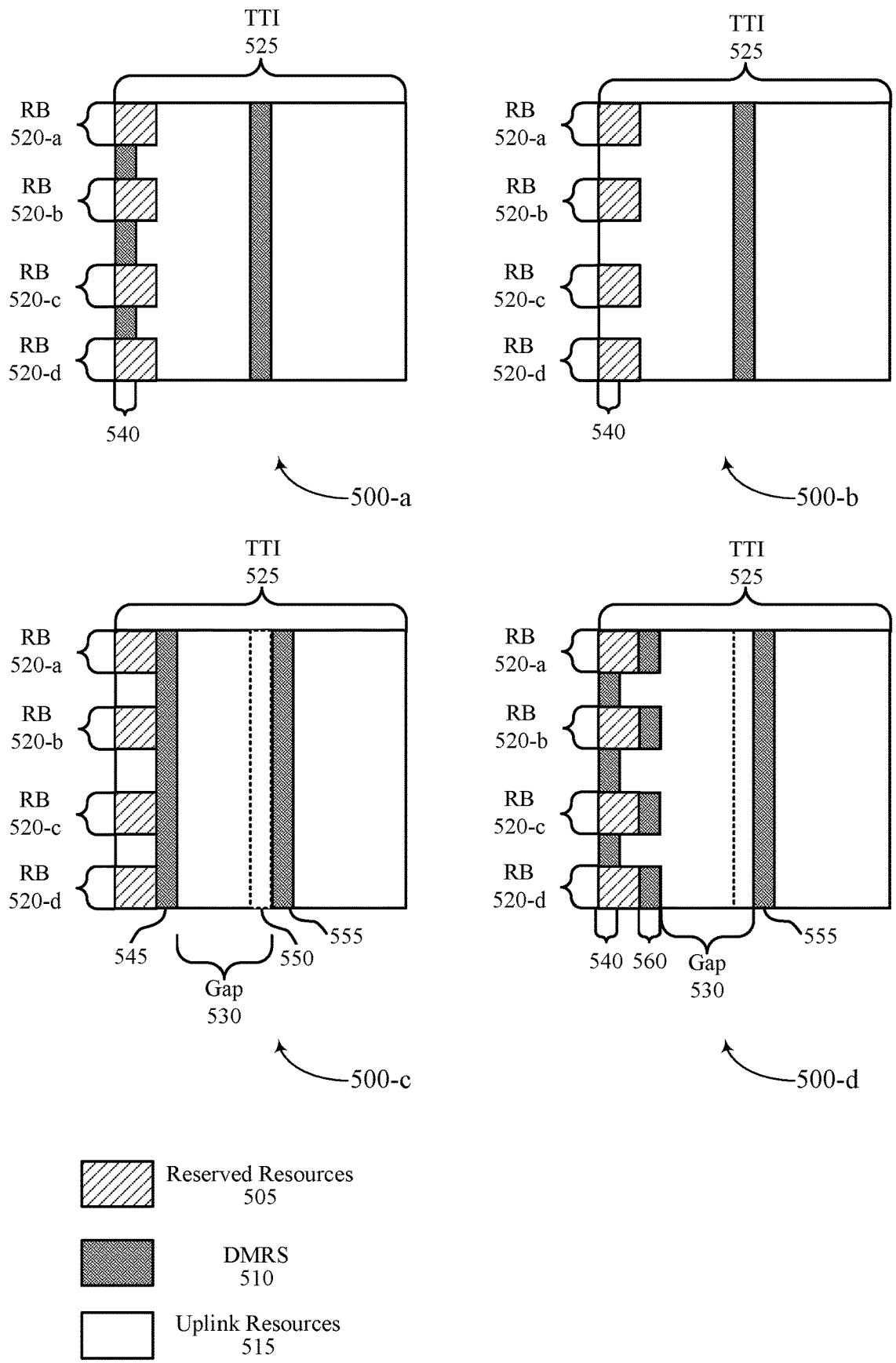
FIG. 5 illustrates examples of collision response schemes that support shared channel design around reserved resources in accordance with aspects of the present disclosure.

In some cases, a DMRS may be scheduled to be transmitted during at least a portion of the time and frequency resources of the reserved resources 215. FIG. 5 illustrates different techniques for handling the collisions of DMRS and the reserved resources 215. In some cases, base station 105-*a* may schedule two consecutive RACH occasions within a reserved resource set. Techniques related to the consecutive RACH occasions are described in more detail in FIGS. 6 and 7. In some cases, a UE 115 in the wireless communications system 200 may implement techniques for multiple sensing occasions in an uplink burst. These techniques are described in more detail in FIGS. 8, 9, 10, and 11.

In some cases, the techniques described herein may lead to some advantages for a UE 115 and base station 105. For example, by rate matching an uplink shared data channel transmission around reserved resources, throughput may on uplink shared channels be increased. These techniques may support the UE 115 to meet stringent reliability and latency conditions for some types of communications (e.g., URLLC) while still providing high throughput for other types of communications. Moreover, internal components of the UE 115 applying the techniques may improve power utilization by improving spectral efficiency such that the UE 115 performs fewer CCA procedures, which may reduce power consumption for components in the UE 115. Additionally, the techniques of providing CCA gaps between (e.g., and before) RACH occasions may increase spectral efficiency, throughput, and latency considerations, as the UE 115 may have increased likelihood to gain control of the transmission medium.

Figure 3:
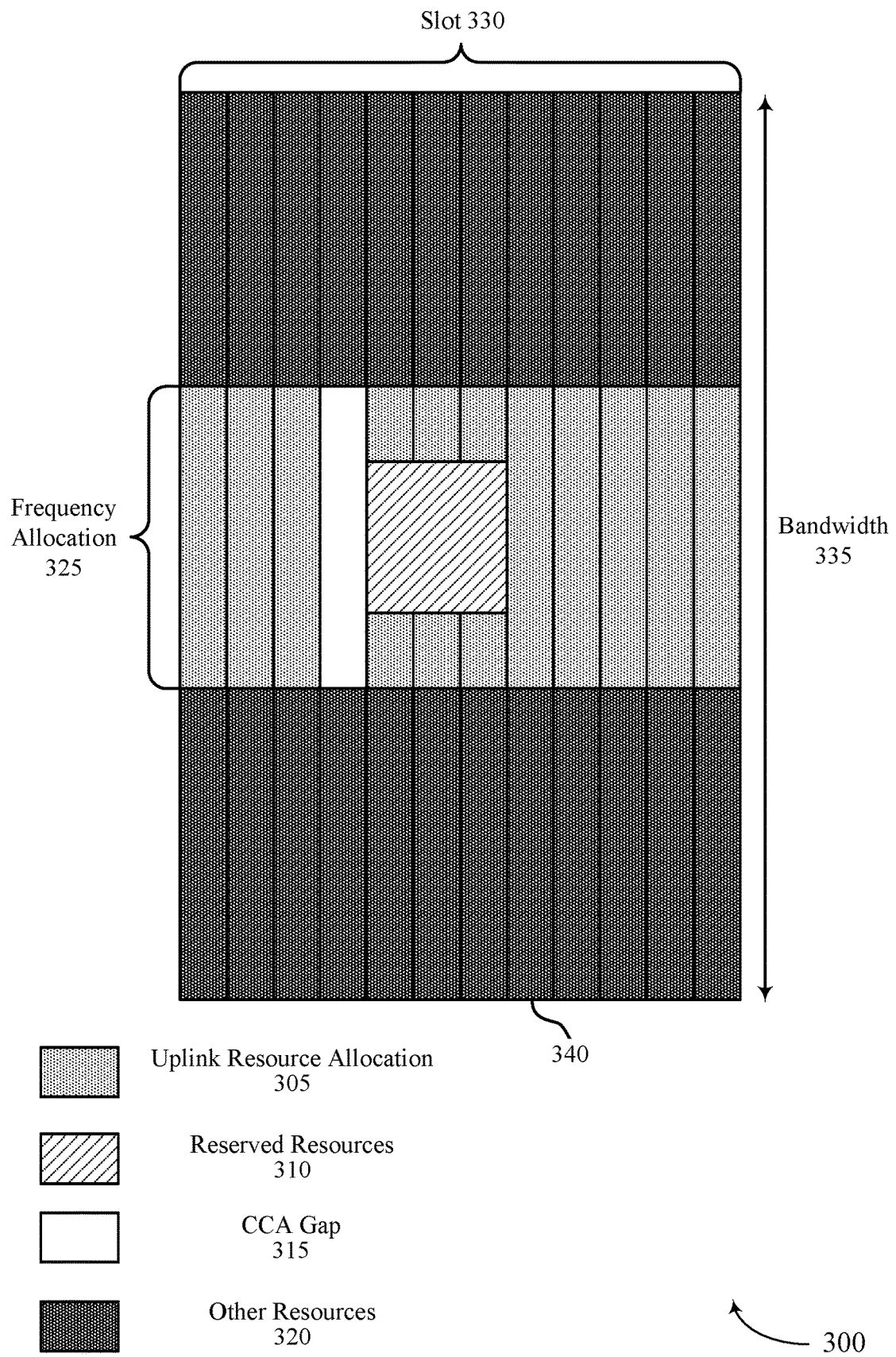
FIG. 3 illustrates an example of a resource grid that supports shared channel design around reserved resources in accordance with aspects of the present disclosure.

FIG. 3 illustrates an example of a resource allocation scheme 300 that supports shared channel design around reserved resources in accordance with aspects of the present disclosure. In some examples, resource allocation scheme 300 may implement aspects of wireless communications system 100.

The resource allocation scheme 300 shows an uplink resource allocation 305, which is an example of an uplink resource allocation to a UE 115 as described in FIG. 2. The base station 105 may, for example, transmit a grant to UE 115 indicating the uplink resource allocation 305 within a shared radio frequency spectrum band. The uplink resource allocation 305 may span a frequency allocation 325 that includes a portion of, or one or more, resource blocks in frequency and one or more TTIs (e.g., one or more slots 330) in time. The UE 115 may transmit a PUSCH transmission to the serving base station within the uplink resource allocation 305.

In some cases, reserved resources (e.g., the reserved resources 310) may overlap the uplink resource allocation 305, and the UE 115 may rate match an uplink transmission around the reserved resources 310. When the UE 115 rate matches around the reserved resources 310, the UE 115 does not transmit within the reserved resources 310, even if the uplink resource allocation indicates that the overlapping resource is allocated to the UE 115. As described in FIG. 2, the reserved resources 310 may be used for PRACH, PUCCH, SRS, etc. In the depicted example, the reserved resources 310 may be in the middle of the uplink resource allocation 305, and the UE 115 may rate match an uplink transmission around the reserved resources 310 (e.g., transmit uplink data using the other resource elements within the uplink resource allocation 305).

In some cases, the reserved resources 310 may be in the middle or the end of the slot 330, and the UE 115 may leave a gap for a CCA opportunity (e.g., a CCA gap 315) so other UEs 115 may contend to use the reserved resources 310. The CCA gap 315 may be between or before random access resources. The CCA may be a contention-based access procedure such as LBT. In some cases, the base station 105 may transmit a grant indicating that up to the full slot the slot 330 is allocated to the UE 115 for data transmission. The UE 115 may receive an indication of the reserved resources 310, determine that the full slot is allocated to the UE 115, and autonomously determine not to transmit within at least one symbol period that occurs prior to the reserved resources 310 (e.g., immediately prior). The blank symbol period may be referred to herein as a CCA gap 315. In some cases, even though a grant allocates the full slot to the UE 115, the UE 115 may determine to refrain from transmitting during the symbol period adjacent to the reserved resources 310 so that the adjacent symbol period may be used as the CCA gap 315. In some cases, the duration of CCA gap 315 may be more than one symbol, such as two symbols etc., where the duration of the gap 315 may be selected to provide sufficient time to enable performing of CCA with acceptable success rates.

In some cases, the reserved resources 310 may be occur at a beginning of the slot 330 (e.g., within a first, beginning, symbol period of the slot 330). To account for this location within slot 330, the base station 105 may control the behavior of the UE 115 via grants. For example, the base station 105 may ensure that a previous grant does not allocate a symbol period occurring immediately prior to a first symbol period of slot 330, so that the unallocated symbol period may be used as a CCA gap 315 for reserved resources 310 occurring at a beginning of slot 330.

In some cases, the UE 115 may refrain from transmitting in a symbol occurring prior to the reserved resources 310 even if the grant does not explicitly indicate to leave that symbol period blank. In some other examples, the UE 115 may follow the grant and leave the symbol period prior to the reserved resources 310 blank only if indicated to do so in the grant or if the base station 105 otherwise indicates to do so.

After a last symbol period of the reserved resources 310, the UE 115 may perform another CCA prior to resuming transmission in a next symbol period. For example, the UE 115 may not transmit using a portion of the transmission of its uplink resource allocation 305 in one or more symbol periods due to the reserved resources 310 occupying that portion. That portion of the transmission bandwidth may be seen as available after a last symbol period of the reserved resources 310. The UE 115 may perform a CCA after a last symbol period of the reserved resources 310, for example at symbol period 340, to regain access to the shared radio frequency bandwidth for that portion of bandwidth.

By rate matching around the reserved resources 310 and the CCA gap 315, the UE 115 may transmit an uplink transmission (e.g., PUSCH transmission) on any resources within its uplink resource allocation 305 except the reserved resources 310 and the CCA gap 315. The UE 115 does not transmit on the reserved resources 310 or the CCA gap 315, so that the UE 115 does not interfere with other UEs performing a CCA procedure within the CCA gap 315 or transmissions using the reserved resources 310.

The UE 115 may identify the rate matching configurations for the reserved resources 310 and the CCA gap 315 as described in FIG. 2. For example, the serving base station 105 may transmit an explicit or implicit indicator of the reserved resources 310 and of the CCA gap 315. In some cases, the rate matching configurations for the reserved resources 310 and the CCA gap 315 may be indicated differently. For example, the reserved resources 310 may be explicitly indicated, and the UE 115 may implicitly identify the CCA gap 315 based on the time and frequency resources of the reserved resources 310.

Figure 4:
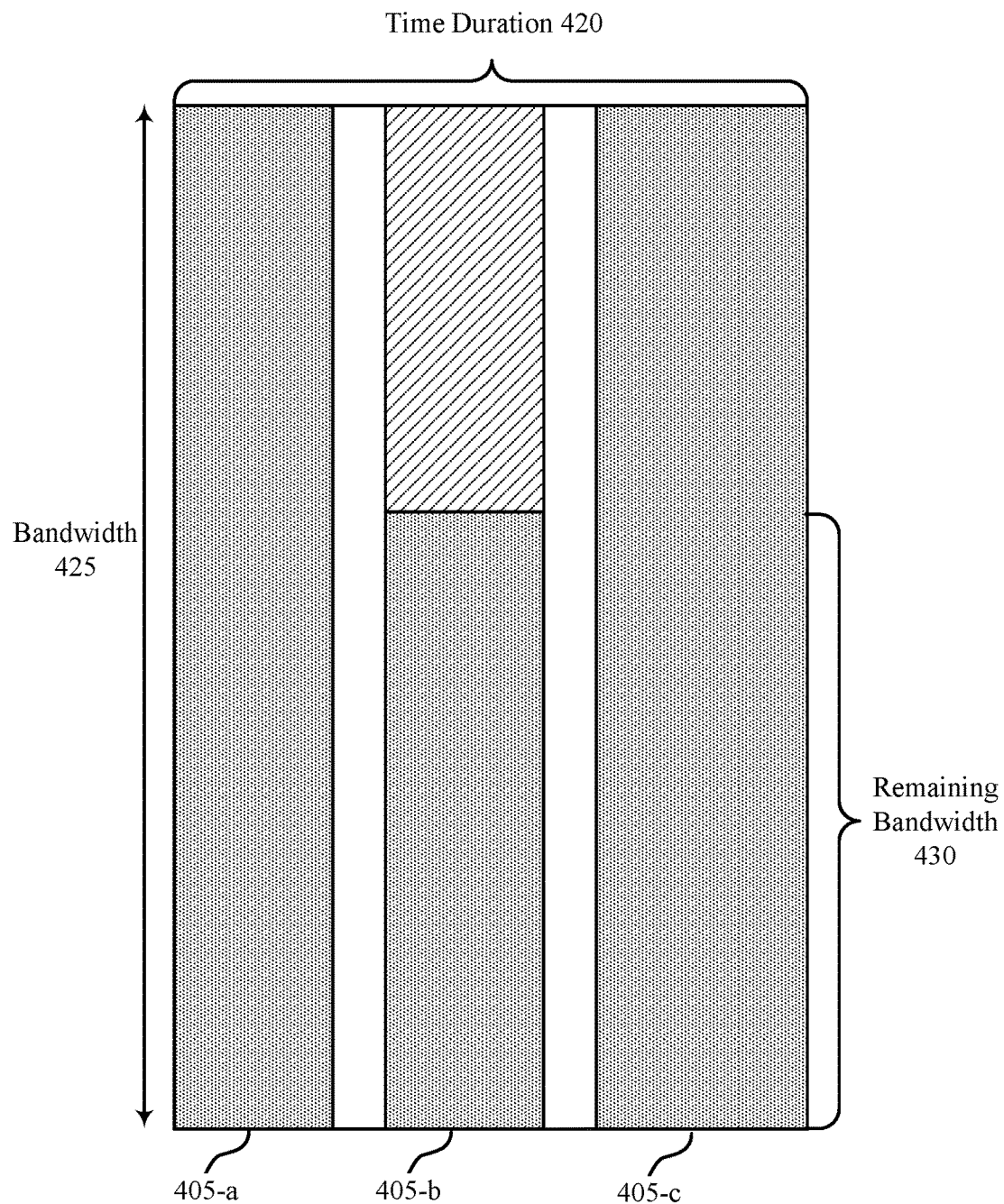
FIG. 4 illustrates an example of a resource grid that supports shared channel design around reserved resources in accordance with aspects of the present disclosure.

FIG. 4 illustrates an example of a resource allocation scheme 400 that supports shared channel design around reserved resources in accordance with aspects of the present disclosure. In some examples, resource allocation scheme 400 may implement aspects of wireless communications system 100.

Resource allocation scheme 400 shows a uplink resource allocation 405 spanning a bandwidth 425 and a time duration 420. The base station 105 may transmit a grant to the UE 115 indicating the uplink resource allocation 405 that allocates time and frequency resources to the UE 115 for sending an uplink transmission, as described in FIG. 2. In some cases, the time duration 420 may be multiple slots, and the bandwidth 425 may be multiple resource blocks. Further, the reserved resources 410 may occupy a subset of resource blocks within the bandwidth 425 for a portion of the time duration 420 (e.g., number of symbol periods or, in some cases, a number of slots). In some cases, the reserved resources 410 may collide or overlap with channels other than data channels. For example, the reserved resources 410 may overlap with a control channel such as PUCCH. If two different allocations collide or overlap, the two different allocations share the same time and frequency resources.

In some examples, the reserved resources 410 may occupy a portion of the bandwidth 425 such that the UE 115 cannot transmit uplink data in that portion of the bandwidth 425. In some cases, the UE 115 may skip uplink transmission in the symbol periods that include the reserved resources 410 (e.g., skip PUSCH transmission if OCB criteria is not met). In some other examples, the UE 115 may still transmit in the unreserved portion of the bandwidth during a time duration that also includes the reserved resources 410 (e.g., shown as the uplink resource allocation 405-b below the reserved resources 410).

The UE 115 may have a number of options of how it operates within a first symbol period occurring after a last symbol period of the reserved resources 410. In an example, the UE 115 may perform a CCA procedure if the UE 115 begins transmitting using a different bandwidth size after the reserved resources 410. For example, the UE 115 may be configured to leave CCA gaps post the reserved resources 410 if a bandwidth of the rate matched uplink transmission changes after the reserved resources 410. Thus, in some cases, the UE 115 may leave a CCA gap 415 after the reserved resources and perform a CCA procedure during the CCA gap 415 when attempting to use the full bandwidth 425 (or a bandwidth that differs from the remaining bandwidth 430), because the UE 115 did not use the full bandwidth 425 due to the reserved resources 410. The UE 115 may determine whether to transmit on the reserved resources 410 or uplink resource allocation 405 based on the CCA gap 415.

In some other examples, the UE 115 may rate match an uplink transmission to use remaining bandwidth 430, which is the portion of bandwidth 425 that does not include the reserved resources 410. In some cases, the UE 115 may skip performing a CCA procedure if the UE 115 continues to use the same bandwidth before, during, and after the reserved resources 410. In some examples, the UE 115 may start using the portion of the bandwidth 425 corresponding to the reserved resources 410 without performing an LBT after a last symbol period of the reserved resources 410. The UE 115 may select which option to perform or be configured with which option to select by the base station 105 based on, for example, the duration and/or bandwidth of the reserved resources 410. It is noted that the reserved resources 410 may collide with other channels (e.g., PUCCH) instead of or in addition to a PUSCH, and the UE 115 may rate match an uplink transmission (e.g., a PUCCH transmission, a PUSCH transmission, or both) around the reserved resources 410 and any CCA gaps 415.

When the UE 115 reduces its transmission bandwidth to avoid the reserved resources 410, the UE 115 may boost its transmission power over the remaining transmission bandwidth 430. The power boost may be performed such that the total power transmitted in the remaining transmission bandwidth 430 (e.g., the non-reserved resource bandwidth) is equal to the total power transmitted over the entire bandwidth 425. Thus, the UE 115 may transmit on uplink resource allocation 405-b using up to the same transmission power as what was used to transmit over the larger bandwidth of uplink resource allocation 405-a and/or 405-b. Based on uplink resource allocation 405-b having a smaller transmission bandwidth, a transmission within uplink resource allocation 405-b may have a higher PSD as compared to a transmission within uplink resource allocation 405-a or 405-c. The PSD for uplink resource allocation 405-b may still be within PSD regulations.

The UE 115 determine whether to indicate that it is boosting its transmission power based on which modulation scheme is being used for the uplink rate matched transmission. If the UE 115 transmits using a quadrature amplitude modulation (QAM) configuration (e.g., 16 QAM or higher), the UE 115 may indicate the power boost to the base station 105 for demodulating the transmission. However, if the UE 115 transmits using binary phase shift keying (BPSK) and/or quadrature phase shift keying (QPSK) modulation, the UE 115 may skip indicating the power boost. In some cases, the base station 105 may indicate to the UE 115 how much to power boost in a DCI or RRC configuration.

FIG. 5 illustrates examples of collision response schemes 500 that support shared channel design around reserved resources in accordance with aspects of the present disclosure. In some examples, the collision response schemes 500 may implement aspects of wireless communications system 100.

In some cases, reserved resources may collide with resources allocated for a DMRS transmission by the UE 115 (e.g., a DMRS transmission is scheduled within at least a portion of the reserved resources). The UE 115 may identify the collision and perform a collision response to avoid the collision. Examples of various different collision responses are shown in FIG. 5. Collision response schemes 500-a to 500-d depict examples of where to transmit a DMRS 510 when a collision is identified.

The selected collision response among collision response schemes 500-a to 500-d may be based on a number of DMRS symbols configured, a number of colliding DMRS symbols, a waveform (e.g., OFDM, single carrier (SC)-OFDM, etc.) used for the uplink transmission, explicit signaling in downlink control information, whether the symbol is a blank symbol or a symbol with a reserved resource, or a type or purpose of the reserved resource (e.g., PUCCH, SRS, etc.).

The collision response schemes 500-a to 500-d may indicate different reference signal patterns (e.g., DMRS patterns) corresponding to different configurations in which a DMRS transmission may be transmitted within a TTI 525 (e.g., a slot) relative to reserved resources 505. In some cases, a reference signal pattern for a DMRS transmission may be that the DMRS 510 is transmitted in pairs of symbols (e.g., code division multiplexed (CDM) across two symbols). If the reference signal pattern includes a pair of symbols, the following techniques may be applied to both symbols or only one of the symbols of the pair. In some cases, the collision response schemes 500-a to 500-d may be applied to two or more symbols of the reference signal pattern and a decision whether to apply at least one of the collision response schemes 500-a to 500-d may be a function a distance between pairs of DMRS symbols. For example, moving one of the DMRS symbols in the pair may be permitted if a distance between the pair of DMRS symbols is less than a predetermined threshold. Otherwise, both symbols may be moved.

In collision response scheme 500-a, there are four RBs 520-a to 520-d reserved as the reserved resources 505. In some cases, there may be one or more intervening RBs between each of the RBs 520 the reserved resources 505, separating RBs 520-a to 520-a in frequency. The one or more RBs 520 overlap uplink resources 515 within a TTI 525. The TTI 525 may include one or more slots. In collision response scheme 500-a, the UE 115 may identify that a DMRS 510 is scheduled for transmission in a symbol period 540 that also includes the reserved resources 505 in RBs 520-a to 520-d. The UE 115 may skip transmitting the DMRS 510 in any resources where a scheduled DMRS transmission collides with the reserved resources 505. The UE 115 may transmit the DMRS 510 in symbol period 540 on interlaces (e.g., tones) corresponding to the intervening RBs which do not collide with the reserved resources 505 and skip transmitting the DMRS 510 on resources that do collide. As shown, the UE 115 does not transmit the DMRS 510 on the RBs which overlap with the reserved resources 505. The UE 115 does transmit on RBs 520 of the uplink resources 515 which do not overlap with the reserved resources 505. In some examples, when the reserved resources 505 use a tone interlace structure, the reference signal pattern (e.g., the DMRS pattern) on those symbols may use the unreserved tone level interlaces or at least data can be transmitted in the un-reserved tones.

In collision response scheme 500-b there are four RBs 520-a to 520-d indicated to be reserved as the reserved resources 505. In some cases, there may be one or more intervening RBs between each of the RBs 520 the reserved resources 505, separating RBs 520-a to 520-a in frequency. The one or more RBs 520-a to 520-a overlap uplink resources 515 within a TTI 525. The TTI 525 may include one or more slots. In collision response scheme 500-b, the UE 115 may skip transmitting the DMRS 510 on any symbol period in which DMRS is scheduled to be transmitted that overlaps with at least one symbol period of the reserved resources 505. As shown, if the UE 115 is scheduled to transmit a DMRS 510 during a symbol period 540, the UE 115 skips transmitting the DMRS 510 in symbol period 540 because reserved resources 505 are included within symbol period 540.

In collision response scheme 500-c there are four RBs 520-a to 520-d reserved as the reserved resources 505. In some cases, there may be one or more intervening RBs between each of the RBs 520 the reserved resources 505, separating RBs 520-a to 520-a in frequency. In some examples, shown by 500-c, the UE 115 may shift in which symbol period a DMRS 510 is transmitted to immediately after a last symbol period of the reserved resources 505. After the last symbol of the reserved resources 505, the UE 115 may transmit the DMRS 510 using all of the allocated frequency resources in the uplink resources 515 during symbol period 545. In some cases, the UE 115 may maintain a defined gap (e.g., minimum gap) between each symbol period within a slot that includes a DMRS transmission. For a slot that includes multiple DMRS transmissions, the UE 115 may adjust in which symbol period a first DMRS transmission is scheduled to be transmitted and determine if the adjusted symbol period impacts the gap spacing relative to any other DMRS transmission. In some cases, the UE 115 may also adjust in which symbol period a second DMRS transmission is scheduled to be transmitted based on the adjusted symbol period for the first DMRS transmission. For example, a DMRS transmission may be shifted over by one or more symbol periods from symbol period 550 to 555 to maintain gap between DMRS transmissions in symbol periods 545 and 555.

In collision response scheme 500-d there are four RBs 520 520-a to 520-d reserved as the reserved resources 505. In some cases, there may be one or more intervening RBs between each of the RBs 520 the reserved resources 505, separating RBs 520-a to 520-a in frequency. In collision response scheme 500-d, the UE 115 may shift colliding DMRS transmissions to a later symbol, and transmit non-colliding DMRS transmissions in their originally scheduled resources. For example, a DMRS transmission may be originally scheduled for transmission in symbol period 540. The UE 115 may transmit the non-colliding DMRS transmissions in their originally scheduled resources within symbol period 540. The DMRS transmissions which collide with the reserved resources 505 may be shifted to a symbol period (e.g., symbol period 560) that occurs after the reserved resources 505 (e.g., in a symbol period that occurs immediately after a last symbol period that includes the reserved resources 505). In some cases, the UE 115 may also shift a second DMRS transmission within the TTI 525 to maintain the gap 530 relative to a DMRS transmission in symbol period 560.

In some cases, when a scheduled DMRS transmission collides with a reserved resource, the UE 115 may have a number of options of which collision response to select, including dropping an uplink transmission (e.g., PUSCH transmission) in a current TTI and sending the dropped uplink transmission in a subsequent TTI, or dropping the scheduled DMRS transmission, or transmitting the scheduled DMRS transmission ignoring the reserved resources 505 (e.g., base station 105 makes transmissions on the reserved resources orthogonal to the DMRS transmission, permits the resulting interference to occur, etc.), or shifting the scheduled DMRS transmission to another symbol, or the like. The option performed by UE 115 may be selected based on number of DMRS symbols configured, or a waveform type of the uplink transmission, or downlink control information (DCI) indicating which option to select, or a type of the reserved resources 505, or the like.

In some additional examples, dropping a DMRS transmission in a particular symbol period may be permitted if multiple symbols are configured for DMRS transmission. The vacated symbol could be used to transmit data (e.g., if it is not a blank symbol for a CCA gap). In some cases, a scheduled DMRS transmission may be moved (e.g., preponed/postponed) to symbols where there are no collisions with the reserved resources. Again, the vacated symbol could be used to transmit data (e.g., if it is not the blank symbol). In some examples, DMRS may be transmitted on resources (e.g., interlaces/RBs) which do not collide with the reserved resources and skipped for resources that collide. For resources (e.g., interlaces/RBs) where DMRS is skipped, a DMRS 510 may be transmitted on subsequent symbols. If the UE has multiple DMRS pattern options, the UE 115 may select among them based on a defined ordering (e.g., pre-determined ordering) to avoid collision of DMRS with the reserved resources, blank symbols, or both, and the selection may also be based on information in uplink grant DCI. In some cases, the selected option among these at any given time may depend on the number of DMRS symbols configured, number of colliding DMRS symbols, a waveform (e.g., OFDM/SC-FDM) being used for UL, explicit signaling in DCI, whether symbol is blank symbol or symbol with reserved resource, type/purpose of the reserved resource, or the like, or any combination thereof.

Figure 6:
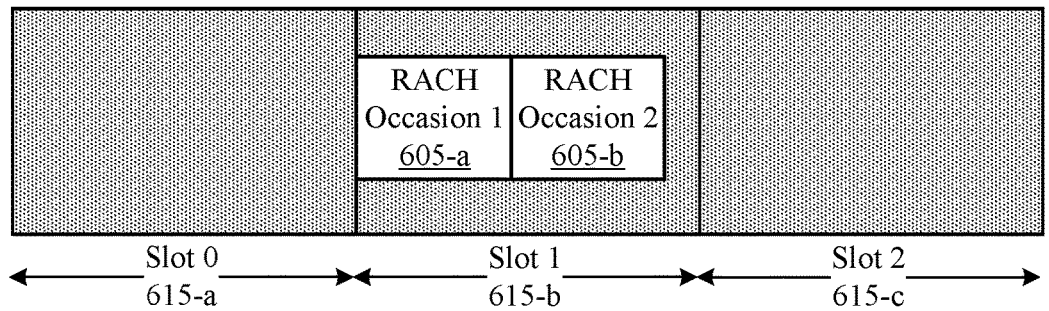
FIG. 6 illustrates an example of back to back RACH occasions that supports shared channel design around reserved resources in accordance with aspects of the present disclosure.
Figure 6:
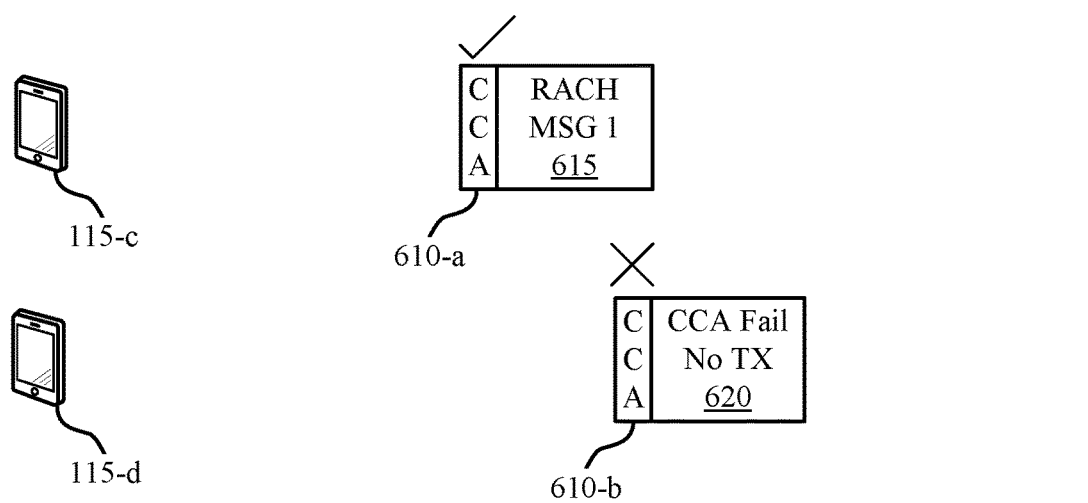

FIG. 6 illustrates an example of a back to back RACH occasion 600 that supports shared channel design around reserved resources in accordance with aspects of the present disclosure. In some examples, back to back RACH occasion 600 may implement aspects of wireless communications system 100.

As described in FIG. 2, a base station 105 may indicate reserved resources to the UE 115. In some examples, the reserved resources may be used for RACH communications. In the depicted example, the reserved resources may include two back to back RACH occasions 605, where RACH occasion 1 605-a is immediately followed by RACH occasion 2 605-b. For example, if a RACH message is 6 symbols long, the base station 105 may schedule a first RACH occasion on symbols 0 to 5 of a slot and a second occasion on symbol 6 to 11. In some examples, there may be a CCA 610 gap between RACH occasion 1 605-a and RACH occasion 2 605-b.

In an example, UE 115-c may be assigned RACH occasion 605-a and UE 115-d may be assigned RACH occasion 605-b. UE 115-c may perform a CCA 610-a prior to transmitting a RACH message 615, pass the CCA 610-a, and transmit the RACH message 615. The RACH message 615 may include, for example, a random access preamble transmission with a RACH occasion 605.

However, based on the RACH occasions 605 being immediately consecutive, the RACH message 615 may be sensed by UE 115-d when UE 115-d performs CCA 610-b. Thus, UE 115-d may fail the CCA 610-d, and UE 115-d may not transmit its RACH message at 620. UE 115-c, by transmitting on the first RACH occasion 1 605-a, causes interference that UE 115-d detects during its CCA 610-b, thereby preventing UE 115-d from using the second RACH occasion 605-b. To avoid this issue and to provide fair access to each of the RACH occasions 605, the base station 105 may implement techniques as described in FIG. 7 to include CCA gaps between each RACH occasion 605.

Figure 7:
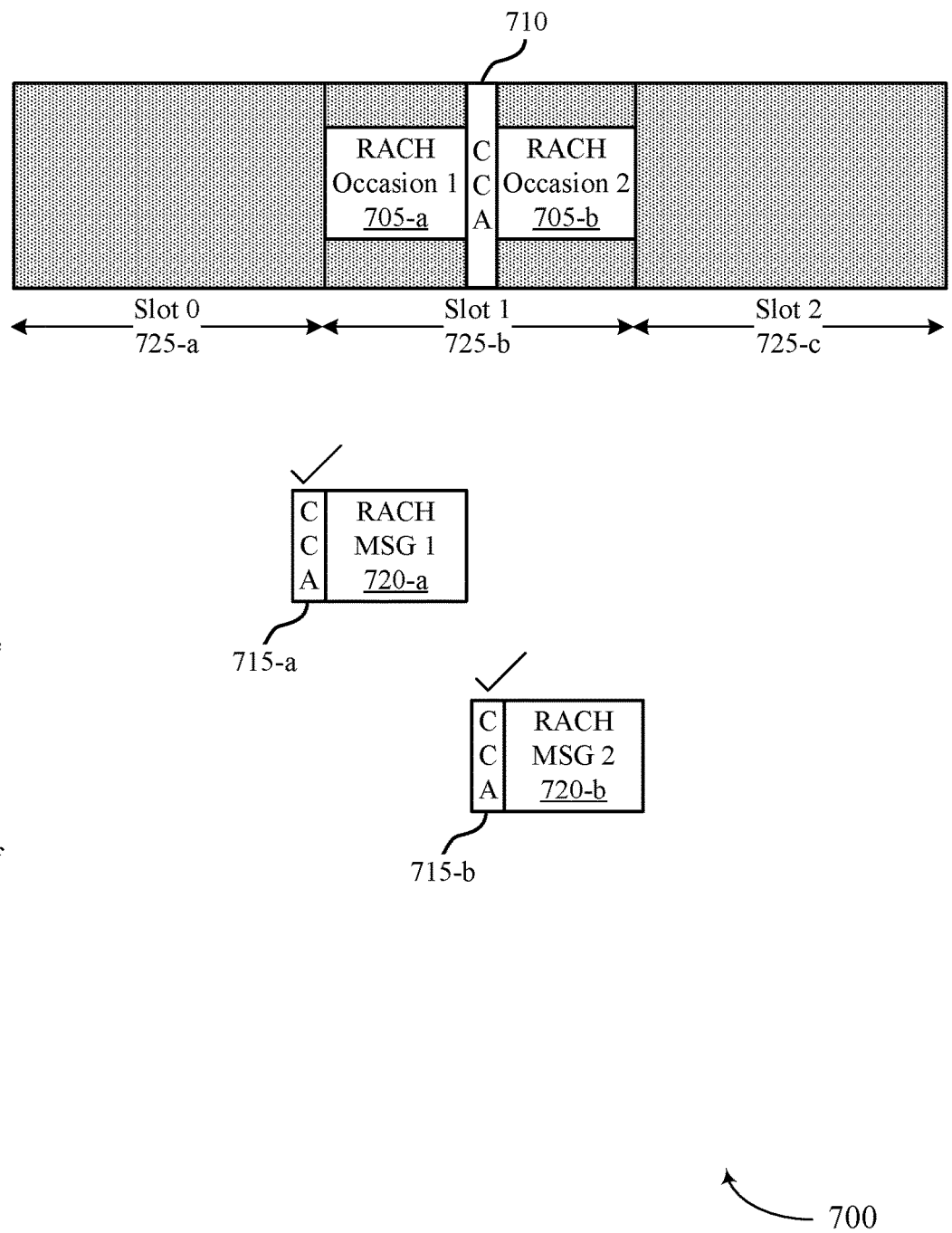
FIG. 7 illustrates an example of back to back RACH occasions that supports shared channel design around reserved resources in accordance with aspects of the present disclosure.

FIG. 7 illustrates an example of a back to back RACH occasion 700 that supports shared channel design around reserved resources in accordance with aspects of the present disclosure. In some examples, back to back RACH occasion 700 may implement aspects of wireless communications system 100.

A base station 105 may indicate to a UE 115 reserved resources that may include multiple RACH occasions 705, such as reserved RACH occasion 705-a, and RACH occasion 705-b. To give each of UE 115-e and 115-f a fair opportunity to use a respective one of the RACH occasions 705, the base station 105 may include a gap (e.g., of at least one symbol period) between RACH occasion 705-a and 705-b so that UE 115-f may perform a CCA 715 and attempt to transmit using the RACH occasion 705-b. In the illustrated example, there may be two RACH occasions 705 (e.g., RACH occasion 705-a and RACH occasion 705-b separated by the CCA gap 710). However, in other examples, there may be additional RACH occasions, each of which may be separated by a CCA gap 710. In some cases, the base station 105 may configure a CCA gap 710 between each of the RACH occasions 705. Or, in some cases, the UEs 115 may treat the RACH occasions 705 as though there is a CCA gap 710 configured between the RACH occasions 705. Therefore, the base station 105 may not configure or perform any signaling to indicate the CCA gap 710, but the UEs 115 may identify a CCA gap 710 and, in some cases, perform a CCA procedure during the CCA gap 710 between the RACH occasions 705. A UE 115 may then transmit in the following RACH occasion 705 based on a result of the CCA procedure.

In some implementations, a RACH format (e.g., a PRACH format) may specify a cyclic prefix (CP) duration and a number of symbol durations to use for PRACH. In some cases, a PRACH format's guard time may be zero or non-zero. A guard time for a PRACH format may be selected such that a combination, or sum, of the guard time, PRACH CP duration, and PRACH symbol duration is an integer multiple of symbol durations. The guard time may be less than a symbol duration in length. In some cases, there may be a gap between the RACH occasions 705-a and 705-b. In some examples, RACH occasions may be integer number of OFDM symbols, including the OFDM CP. in some cases, each RACH occasion may include a RACH CP duration, more than one RACH symbols, and a guard time.

The gap between the between the RACH occasions 705-a and 705-b may be configurable. The gap may be configurable to a guard time which may be less than one symbol duration including a gap in units of integer number of symbols. The UE may implicitly assume a gap of the guard time which may be less than one symbol duration including a gap in some integer number of symbols when operating in unlicensed spectrum as opposed to when operating in licensed spectrum. The gap may be chosen to be larger than the minimum defer period for some LBT configurations (e.g., a category-4 LBT) including a determined number of CCA slots. In some cases, UE 115 may determine whether to transmit using the RACH occasion 705-b based on the CCA 715.

In an example, UE 115-e may perform CCA 715-a, passes, and transmits RACH message 720-a to the base station 105. UE 115-f performs CCA 715-b and, due to the CCA gap 710, passes without detecting the RACH message 720-a transmitted by UE 115-e. UE 115-f may then transmit the RACH message 720-b during RACH occasion 705-b. Thus, each of UE 115-e and UE 115-f may respectively use RACH occasions 705-a and RACH occasion 705-b without a transmission in the earlier RACH occasion 705-a interfering with a CCA procedure performed by UE 115-*f* when attempting to use the later RACH occasion 705-*b*.

In some examples, the UE 115 may interpret a RACH resource configuration as having a gap if there are two or more back to back RACH occasions 705. For example, the base station 105 may transmit a configuration message that configures the UE 115 with at least two back to back PRACH occasions 705 each having a length of a defined number of symbols (e.g., format A3 has a length of 6 symbols) and indicates a one symbol gap between each pair of RACH occasions 705 (e.g., at symbol period 6). The UEs 115 may process the configuration message to determine that the first RACH occasion 705-*a* is on symbols 0 to 5, the second RACH occasion 705-*b* is on symbols 7 to 12, and may assume that symbol 6 is left blank for the CCA gap 710. In this way, the base station 105 may maintain the RACH configuration by adding additional CCA gap configurations if appropriate. The base station 105 may also have flexibility to configure an additional CCA gap period 710 (e.g., based on a blocking probability of a transmission in a first RACH occasion 705 blocking a CCA performed for a second RACH occasion 705).

In some cases, RACH occasions with CCA may extend beyond a current slot and into a next slot. For example, a RACH format such as A1 may have 6 RACH occasions in a slot, where each occasion is 2 symbols long. If a UE 115 identifies 1 symbol CCA gap between each RACH occasion, some RACH occasions (e.g., the last 2) may spill into the next slot. If the RACH occasions begin in slot 725-*b*, the last two RACH occasions may be at the start of slot 725-*c*. If RACH occasions spill into the next slot, the base station 105 may transmit a broadcast message configuring UE 115 whether to use RACH occasions that occur in a next slot. In some other examples, the UEs 115 may not use the RACH occasions that spill into the following slot. Or, in some examples, the UEs 115 may transmit on the RACH occasions that spill into the next slot if a TTI type indicator, a subframe format indicator (SFI), or the like, received from the base station 105 indicates that the next slot is also used for uplink transmission.

Additionally, or alternatively, to the techniques for a CCA gap between RACH occasions, a base station 105 may support a UE 115 to start RACH transmission at a later time based on an LBT outcome. In some cases, the UE 115 may use the earliest symbol period where the LBT passes as a starting point for the RACH transmission. For example, if a RACH occasion is configured for symbols 6-11, base station 105 may allow UE 115 to start transmitting the RACH at symbols 7, 8, or 9 in addition to or instead of starting at symbol 6 but still end RACH transmission at symbol 11. The UE 115 may transmit, for example, by puncturing the portion of the RACH occasion that the UE 115 is able to transmit.

If the UE 115 transmits fewer RACH symbols due to LBT failure at a first supported starting point, the UE 115 may transmit the RACH at a higher power than what would have been used had the UE 115 transmitted for up to all of the RACH symbols. For example, the transmit power may be increased by a factor based on a maximum number of PRACH symbols and the actual number of PRACH symbols transmitted. For example, the factor may be based on the maximum number of PRACH symbols divided by the actual number of PRACH symbols transmitted. Due to the multiple possible starting points within a RACH occasion, the UE 115 may transmit RACH on back to back RACH occasions without blocking other UEs 115.

Figure 8:
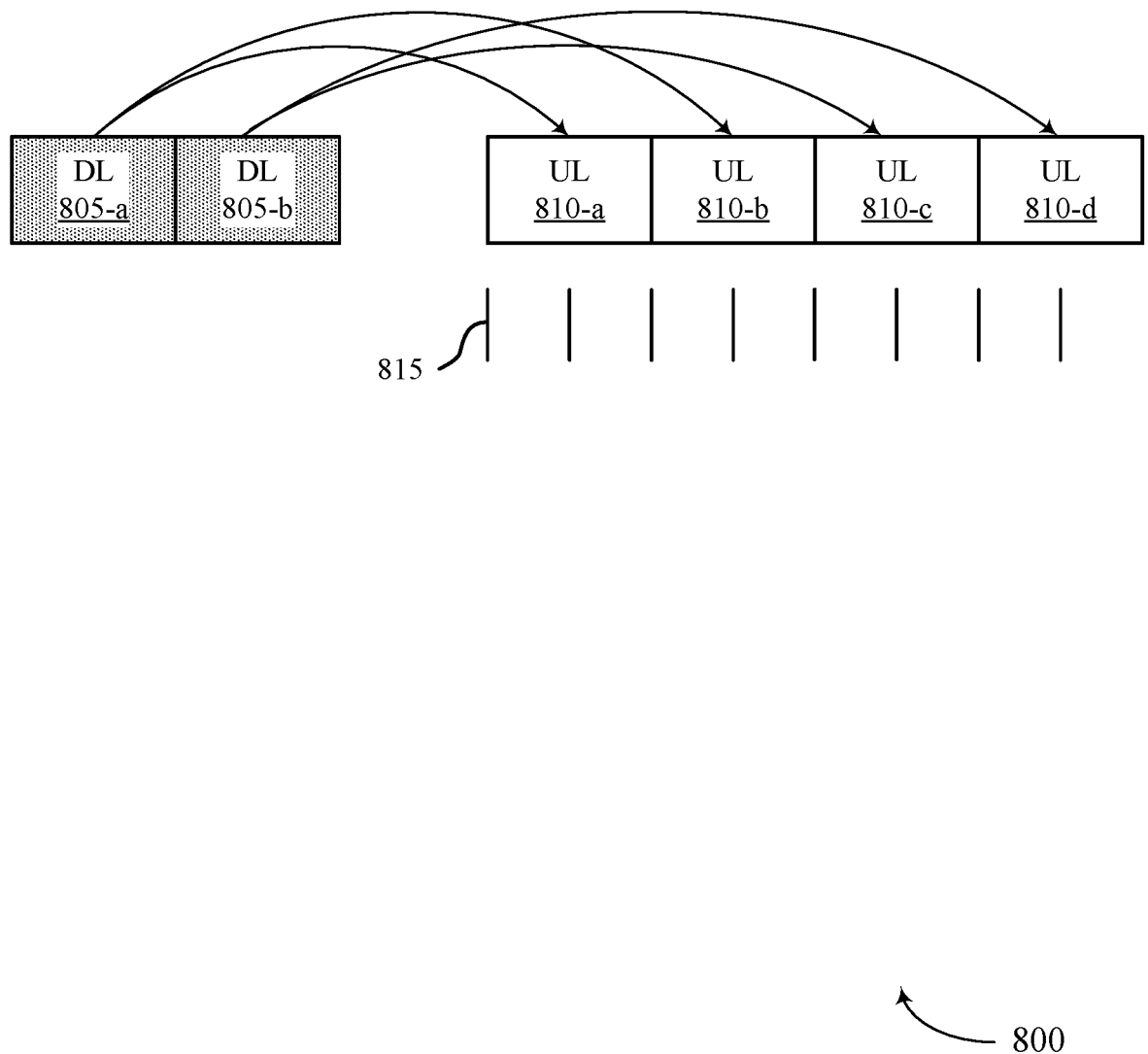
FIGS. 8 through 11 illustrate examples of multiple CCA sensing occasion schemes that supports shared channel design around reserved resources in accordance with aspects of the present disclosure.

FIG. 8 illustrates an example of a multiple CCA sensing occasion scheme 800 that supports shared channel design around reserved resources in accordance with aspects of the present disclosure. In some examples, multiple CCA sensing occasion scheme 800 may implement aspects of wireless communications system 100.

A base station 105 may schedule a UE 115 for uplink transmissions within the base station transmission opportunity (TxOP) (e.g., an amount of time the base station 105 is allowed to use a shared radio frequency spectrum band after passing CCA). For example, downlink subframe 805-*a* may include a grant scheduling the UE 115 with resources in uplink subframes 810-*a* and 810-*b*, and downlink subframe 805-*b* may include a grant scheduling the UE 115 with resources in uplink subframes 810-*c* and 810-*d*. The UE 115 may have a subcarrier spacing of 15 kHz, where each subframe is 1 ms long. In the following example, the UE 115 is scheduled n=4 consecutive uplink frames.

When an uplink transmission is scheduled within the base station TxOP, the number of single-shot CCA attempts (e.g., single-shot LBT attempts) by a UE 115 within the shared base station channel occupancy time (COT) may be based on the number of consecutively allocated uplink subframes 810. For example, if the UE 115 is allocated n consecutive uplink subframes 810 of length 1 ms, the UE may be limited to n+1 single-shot CCA attempts, where n is a positive integer. The consecutive uplink subframes may provide the UE 115 with 2n possible starting positions 815. As depicted, eight vertical lines represent the 2n=8 possible starting locations for the four uplink TTIs 810-*a* to 810-*d* (e.g., uplink subframes). The limit to n+1 single-shot CCA attempts may apply regardless of a number of or a type of grants that were used to schedule the consecutive uplink subframes. The limit to n+1 single-shot CCA attempts also may apply for cases where there may be gaps of one symbol or less between the consecutively allocated subframes.

Figure 9:
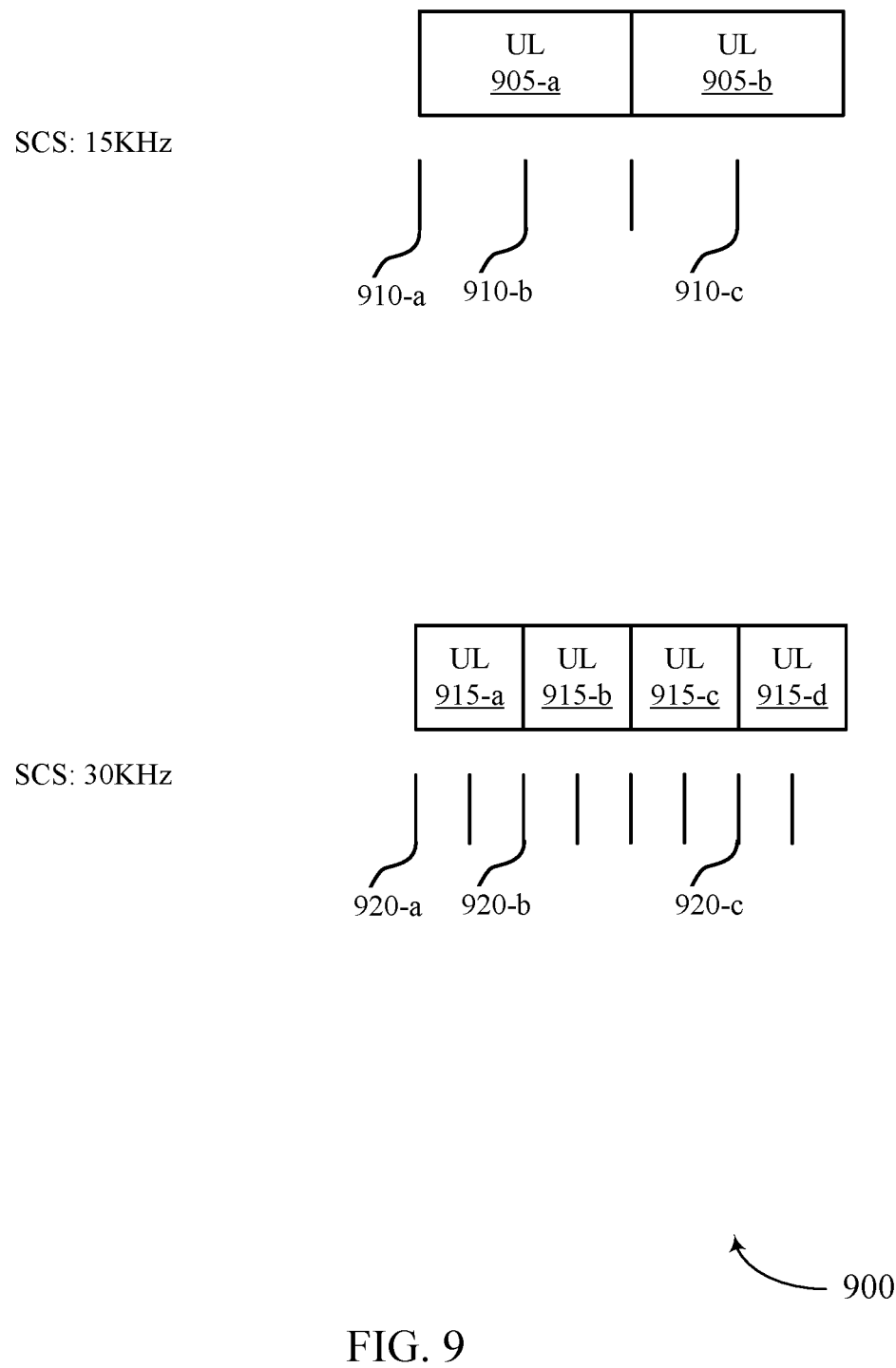
Figure 10:
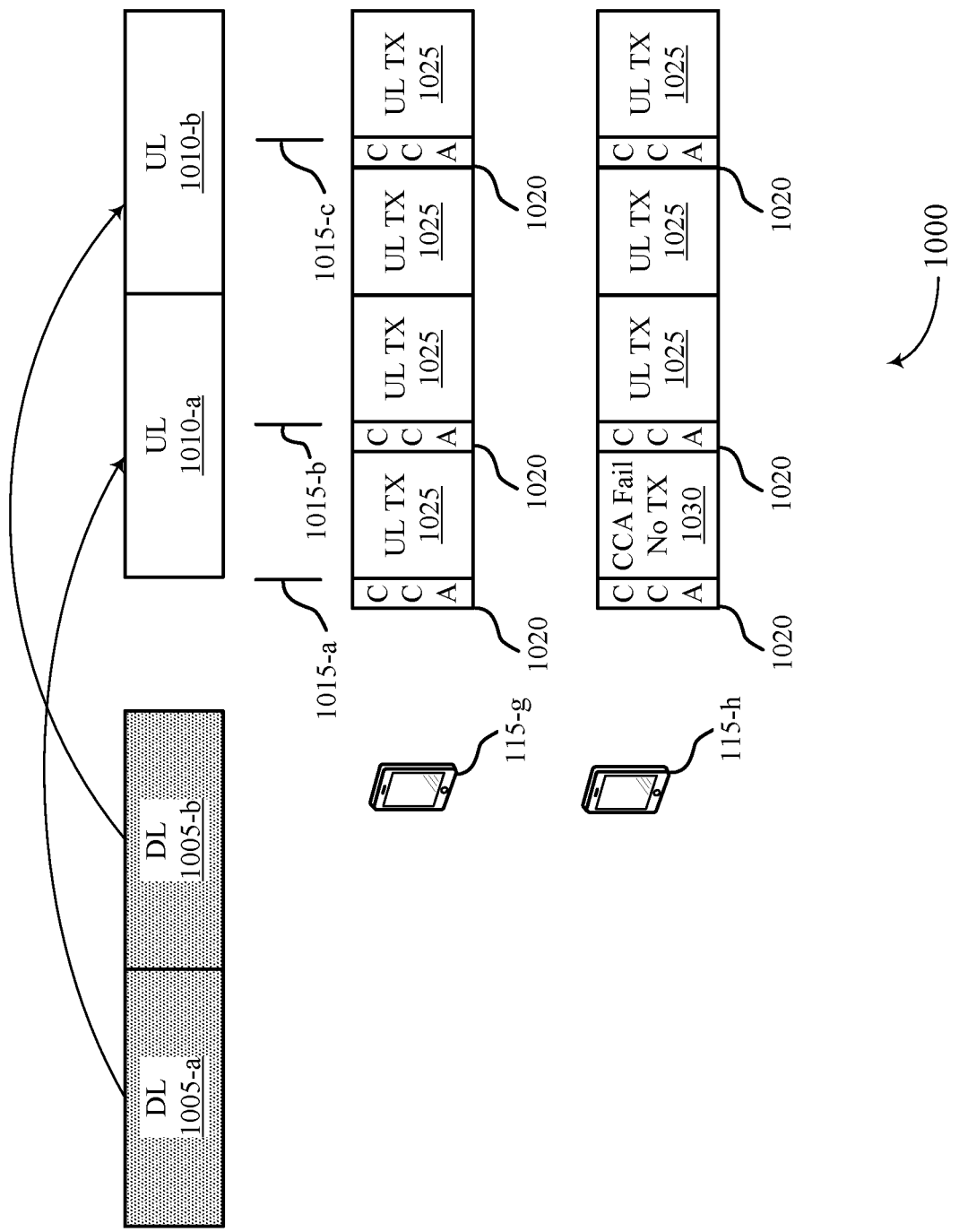
Figure 11:
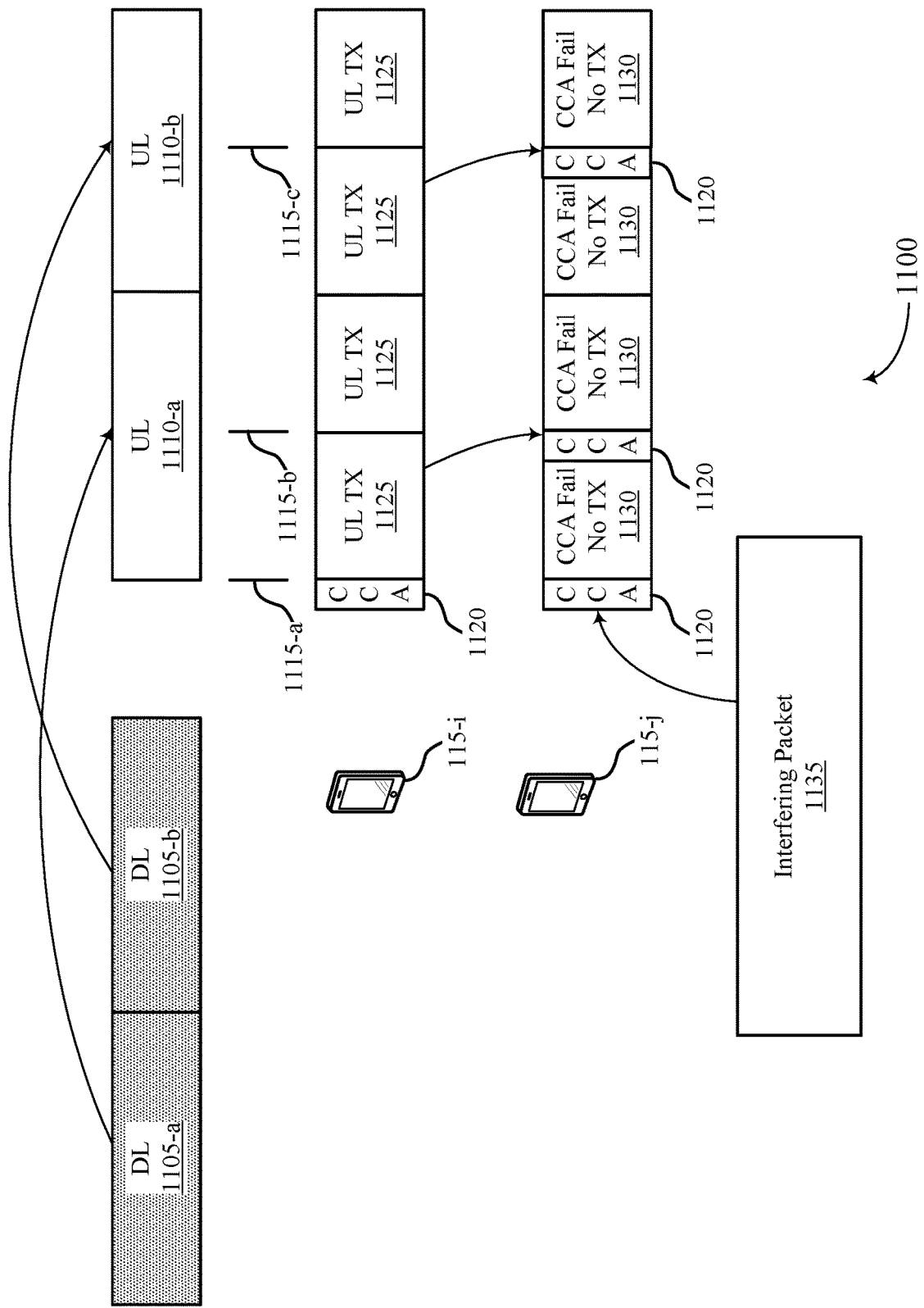

As a wireless communications system may use different SCS, the number of slots that occur within a defined time duration increases as the SCS increases. Therefore, there is a larger number of potential starting positions 815 and single-shot CCA opportunities for UEs 115 with a higher SCS, as compared to the number of single-shot CCA opportunities for UEs 115 with a higher SCS. FIGS. 9-11 describe techniques of selecting a number of single shot LBT attempts for UEs 115 with different SCS.

FIG. 9 illustrates an example of a multiple CCA sensing occasion scheme 900 that supports shared channel design around reserved resources in accordance with aspects of the present disclosure. In some examples, multiple CCA sensing occasion scheme 900 may implement aspects of wireless communications system 100.

Some wireless communications systems may support multiple different SCS. For example, wireless communications systems 100 and 200 may use 15 kHz SCS, 30 kHz SCS, and 60 kHz SCS. Slot with a larger SCS may be shorter in time. Thus, there may be four 30 kHz uplink slots 915 (e.g., 30 kHz uplink slots 915-*a*, 915-*b*, 915-*c*, and 915-*d*) in the same time duration of two 15 kHz uplink slots 905 (e.g., 15 kHz uplink slots 905-*a* and 905-*b*). The 15 kHz uplink slots 905-*a* and 905-*b* may each occupy 1 ms, while two 30 kHz uplink slots 915 occupy 1 ms. Therefore, the 30 kHz uplink slots 915 may have twice as many CCA candidate locations 920, as compared to the candidate locations 910 for the 15 kHz uplink slots 905, in the same amount of time.

The base station 105, the UE 115, or both, may implement techniques to configure both the 15 kHz UE 115 and the 30 kHz UE 115 with a set of CCA locations. For example, the base station 105 may configure each UE 115 (e.g., including those of different SCS) with a set of n+1 CCA locations within the consecutive uplink slots when the base station 105 grants the uplink burst of n milliseconds. For example, if n is 2, this may correspond to two 15 kHz slots and four 30 kHz slots, but both the 15 kHz configuration and the 30 kHz configuration are configured with 3 (e.g., n=2, 2+1=3) CCA locations.

In some cases, the base station 105 configure each UE 115 to leave a gap before each of the n+1 selected locations and to perform a CCA at each of the n+1 selected locations. A UE 115, once CCA determines that the shared radio frequency spectrum band is available, may continue to transmit until the end of the set of consecutive slots without performing a CCA at the subsequent CCA locations as shown in FIG. 11. In FIGS. 10 and 11, the 1st, 2nd, and 4th candidate locations 910 (e.g., candidate locations 910-*a*, 910-*b*, and 910-*c* respectively) are selected for the lower SCS configuration. This corresponds to the 1st, 3rd, and 7th candidate locations 920 of the higher SCS configuration (e.g., candidate locations 920-*a*, 920-*b*, and 920-*c*). Thus, each configuration has 3 locations for a single-shot CCA, despite the two configurations having different SCS.

FIG. 10 illustrates an example of a multiple CCA sensing occasion scheme 1000 that supports shared channel design around reserved resources in accordance with aspects of the present disclosure. In some examples, multiple CCA sensing occasion scheme 1000 may implement aspects of wireless communications system 100.

As described in FIGS. 8 and 9, a base station 105 may transmit a grant for uplink TTI 1010-*a* (e.g., uplink subframe) in downlink TTI 1005-*a* (e.g., downlink subframe) and a grant for uplink TTI 1010-*b* in downlink TTI 1005-*b*. The uplink TTIs 1010 may be to uplink subframes used for uplink transmissions by UE 115-*h* and UE 115-*g*. In the shown example, the UEs 115 are configured with the same single-shot CCA locations 1015-*a* to 1015-*c* within the uplink subframes. Thus, the UEs 115 perform a CCA procedure at each of the CCA locations 1015-*a* to 1015-*c* so as to not cause UE to UE interference (e.g., UE to UE blocking). The single-shot CCA locations 1015 may be configured when the base station 105 grants the uplink burst including the two uplink TTIs 1010. In some cases, an uplink TTI 1010 may be an example of a subframe.

UE 115-*g* and UE 115-*h* may perform a first CCA 1020 at the same time corresponding to CCA location 1015-*a*. In an example, the CCA 1020 performed by UE 115-*g* may pass, and the CCA 1020 performed by UE 115-*h* may fail. UE 115-*g* may transmit an uplink transmission 1025 in a following uplink slot, and UE 115-*h* may not transmit in the following uplink slot at 1030 due to the CCA procedure failure. However, at the next single-shot CCA location 1015, both UEs 115 may again perform another CCA 1020 and both UEs 115 may gain access to the shared radio frequency spectrum band. Both UEs 115 may then transmit uplink information in the following uplink slots.

In this example, although UE 115-*h* failed the first LBT, UE 115-*h* had another opportunity to gain access to the transmission medium at the next single-shot CCA location 1015. The aligned LBT gaps may prevent UE to UE blocking with the same base station 105. In some cases, if a UE passes CCA in a previous CCA location 1015, the UE still needs to perform another CCA procedure in a later CCA location 1015.

In some cases, a UE that obtains a shared radio frequency spectrum band at a particular CCA location may transmit without performing a CCA at the subsequent CCA locations.

FIG. 11 illustrates an example of a multiple CCA sensing occasion scheme 1100 that supports shared channel design around reserved resources in accordance with aspects of the present disclosure. In some examples, multiple CCA sensing occasion scheme 1100 may implement aspects of wireless communications system 100.

As described in FIGS. 8, 9, and 10 a base station 105 may transmit a grant for uplink TTI 1110-*a* in downlink TTI 1105-*a* and a grant for uplink TTI 1110-*b* in downlink TTI 1105-*b*. The uplink TTIs 1110 may be subframes used for uplink transmissions by UE 115-*i* and UE 115-*j*. In the shown example, the UEs 115 are configured with the same single-shot CCA locations 1115 within the uplink subframes. Thus, the UEs 115 perform CCA at the same time as to not cause UE to UE interference. The single-shot CCA locations 1115 may be configured when the base station 105 grants the uplink burst including the two uplink TTIs 1110.

UE 115-*i* and UE 115-*j* may perform a first CCA 1120 at the same time. Once a UE obtains a shared radio frequency spectrum band at a particular CCA location, that UE may transmit for a remainder of the uplink slots indicated in the grant without performing a CCA at the subsequent CCA locations. In an example, the CCA 1120 performed by UE 115-*g* may pass at CCA location 1115-*a*, and the CCA 1120 performed by UE 115-*h* at CCA location 1115-*a* may fail, for example due to an interfering packet 1135 (e.g., from a wireless device using Wi-Fi). UE 115-*g* may transmit an uplink transmission 1125 for the remainder of the consecutive uplink TTIs 1110-*a* and 1110-*b* without performing a CCA at the following single-shot CCA locations 1115-*b* or 1115-*c*. The transmission from UE 115-*i* during the time periods in which UE 115-*j* performs a CCA in CCA locations 1115-*b* and 1115-*c* may cause the CCAs 1120 to fail at the following single-shot CCA locations 1115-*b* and 1115-*c*. Thus, UE 115-*i* may have improved throughput, but UE 115-*j* may not gain access to the transmission medium for the uplink burst due to transmissions on the shared radio frequency spectrum band by UE 115-*i*.

Thus, when a UE 115 is granted multiple slots for transmission under a base station TXOP, for fair channel access, a UE 115 may be limited to n+1 CCA locations within a defined time duration (e.g., n ms), and hence the n+1 number of CCA locations may be a function of time and independent of the SCS. The position of the n+1 number of CCA locations may be at the start or middle of sub-frames according the respective SCS values. In some examples, the base station may let each UE 115 decide which n+1 CCA locations to use. In another example, the base station 105 may configure each UE with the same n+1 locations when granting a uplink burst of n ms. In some examples, the base station 105 may configure each UE 115 to leave a gap before each of these n+1 CCA locations and to perform CCA at each of the n+1 CCA locations. In this example, each UE 115 may leave a CCA gap and perform a CCA procedure at each of the n+1 CCA locations. In some examples, the base station 105 not specify that each UE is to leave a CCA gap before each of the n+1 CCA locations. In such an example, once a UE 115 obtains the shared radio frequency spectrum band, the UE 115 may continue to transmit till end of the burst grant without leaving any CCA gaps.

The technique of FIG. 11 may permit UEs to use any of the n+1 CCA locations to acquire the shared radio frequency spectrum band (e.g., if no other UE jumped in earlier to previously acquire the shared band or a UE that jumped in earlier is a hidden node). In some examples, guidance on the n+1 CCA locations may be used to provide a time instance that may provide certain UEs potential CCA starting locations (e.g., corresponding to different mini-slot boundary). Also, a later UE that was unable to acquire the shared radio frequency spectrum band at an earlier CCA location may optionally skip performing a CCA at subsequent CCA locations that may occurring during a middle of a PUSCH transmission by a UE that acquired the shared band at the earlier CCA location.

Figure 12:
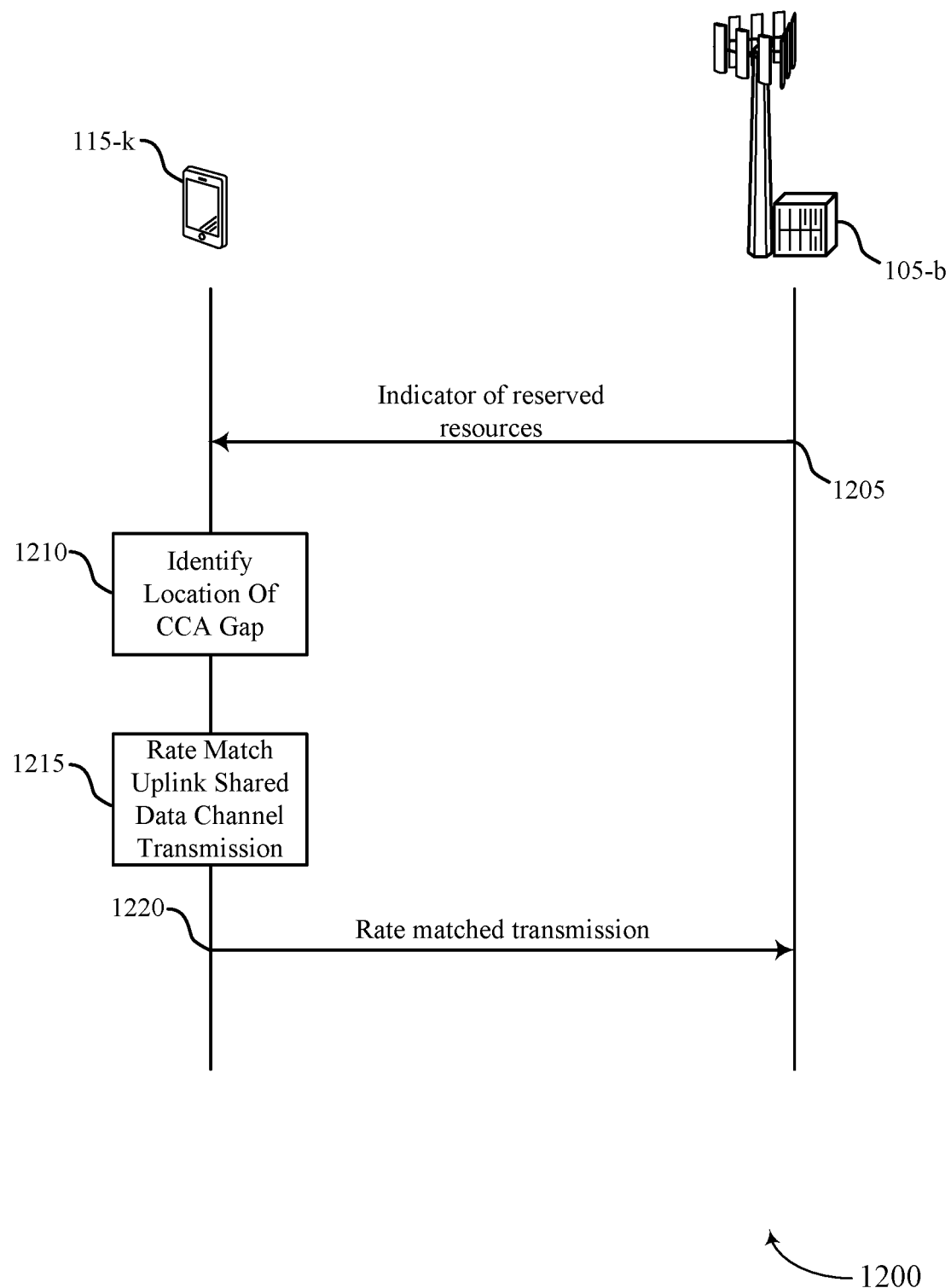
FIGS. 12 and 13 illustrate examples of process flows that support shared channel design around reserved resources in accordance with aspects of the present disclosure.

FIG. 12 illustrates an example of a process flow 1200 that supports shared channel design around reserved resources in accordance with aspects of the present disclosure. In some examples, process flow 1200 may implement aspects of wireless communications system 100. Process flow 1200 includes UE 115-k and base station 105-b, which may be respective examples of a UE 115 and a base station 105 as described herein.

At 1205, base station 105-b may transmit an indicator of reserved resources in a shared radio frequency spectrum band. UE 115-k may receive the indicator of reserved resources. In some cases, at 1210, UE 115-k may identify a location of a CCA gap relative to the reserved resources. In some cases, UE 115-k may identify locations of one more CCA gaps. For example, there may be a CCA gap before the reserved resources and after the reserved resources. In some cases, the indicator of reserved resources may identify a symbol period for each of the one or more gaps. In some cases, base station 105-b may transmit an indicator of one or more CCA gaps identifying a symbol period for each of the one or more gaps. In some cases, UE 115-k may receive the indicator of reserved resources and be configured to determine that a CCA gap occurs in a symbol period that is located before, after, or both, relative to the location of the reserved resources. In an example, the reserved resources may occur in symbol periods 4-7, and the UE 115-k may be configured to determine that a CCA gap occurs in symbol period 3, in symbol period 8, or both.

At 1215, UE 115-k may rate match an uplink shared data channel transmission around the reserved resources. In some examples, UE 115-k may rate match an uplink shared data channel transmission around the CCA gap. At 1220, UE 115-k may transmit, within the shared radio frequency spectrum band, the rate matched uplink shared data channel transmission. UE 115-k may transmit the uplink shared data channel transmission after rate matching around the reserved resources and, in some cases, the one or more CCA gaps.

Figure 13:
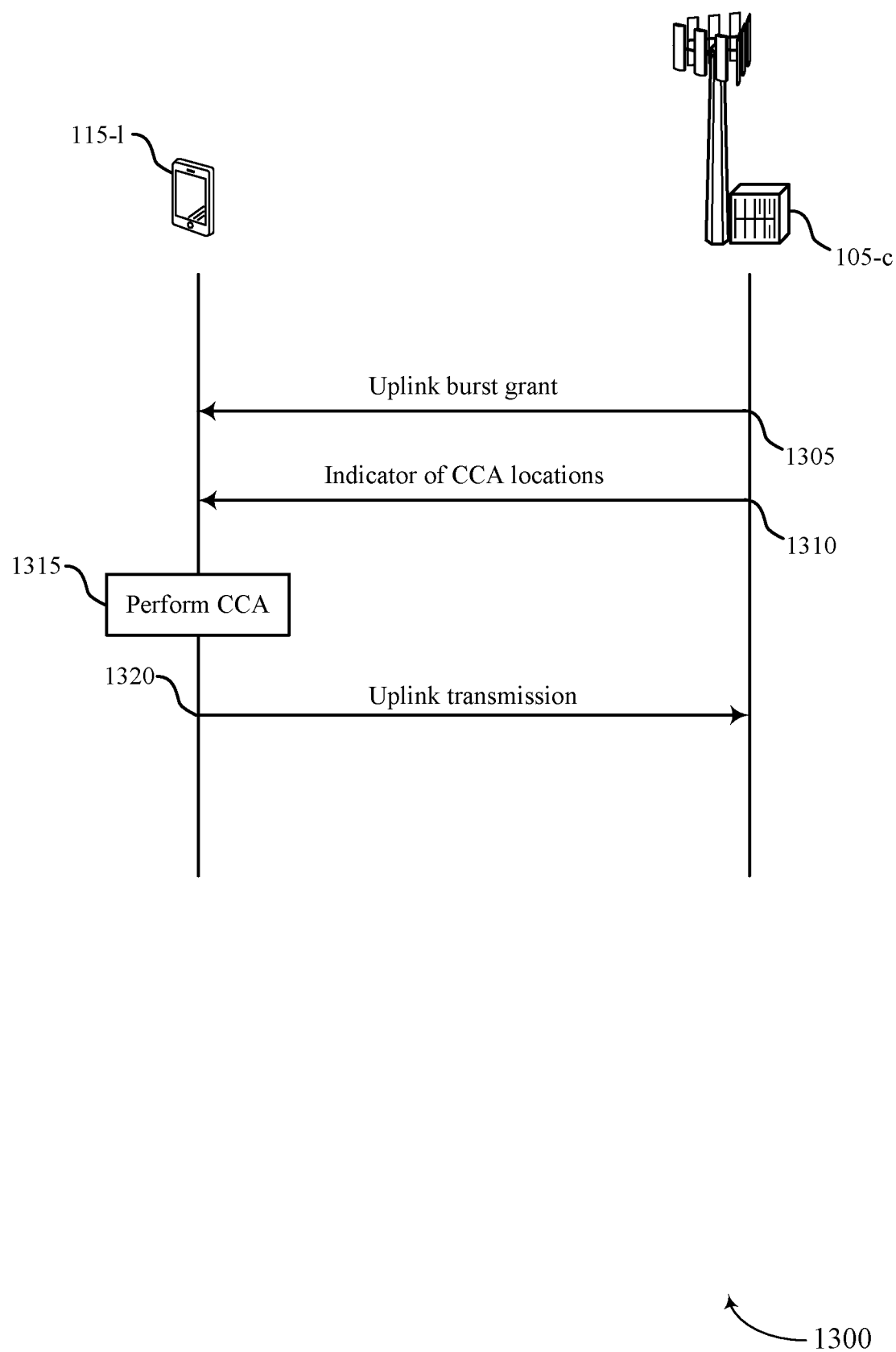

FIG. 13 illustrates an example of a process flow 1300 that supports shared channel design around reserved resources in accordance with aspects of the present disclosure. In some examples, process flow 1300 may implement aspects of wireless communications system 100. Process flow 1300 includes UE 115-l and base station 105-c, which may be respective examples of a UE 115 and a base station 105 as described herein.

At 1305, base station 105-c may transmit an uplink burst grant allocating uplink resources in a shared radio frequency spectrum band for a set of consecutive TTIs. In some examples, at 1310, base station 105-c may transmit an indicator of a set of CCA locations within the set of consecutive TTIs, a number of the set of CCA locations being common to multiple UEs 115 that respectively utilize TTIs having different durations.

At 1315, UE 115-l may perform at CCA at a first CCA location of the set of CCA locations and, at 1320, transmit, in the shared radio frequency spectrum band, an uplink transmission within a TTI of the set of consecutive TTIs based on a result of successful CCA performed at one of the set of CCA locations. The UE 115-l may identify a successful CCA if the CCA indicates that the shared radio frequency spectrum band is available. In some examples, the UE 115-l may transmit, in the shared radio frequency spectrum band, an uplink transmission within a first successful TTI of the set of consecutive TTIs based at least in part on a result of CCA performed at the set of CCA locations.

In some cases, UE 115-l may continue transmission for the set of the TTIs of the uplink burst grant without performing a CCA at subsequent CCA locations of the set of CCA locations based on determining that the shared radio frequency spectrum band is available at a prior CCA location of the set of CCA locations.

Figure 14:
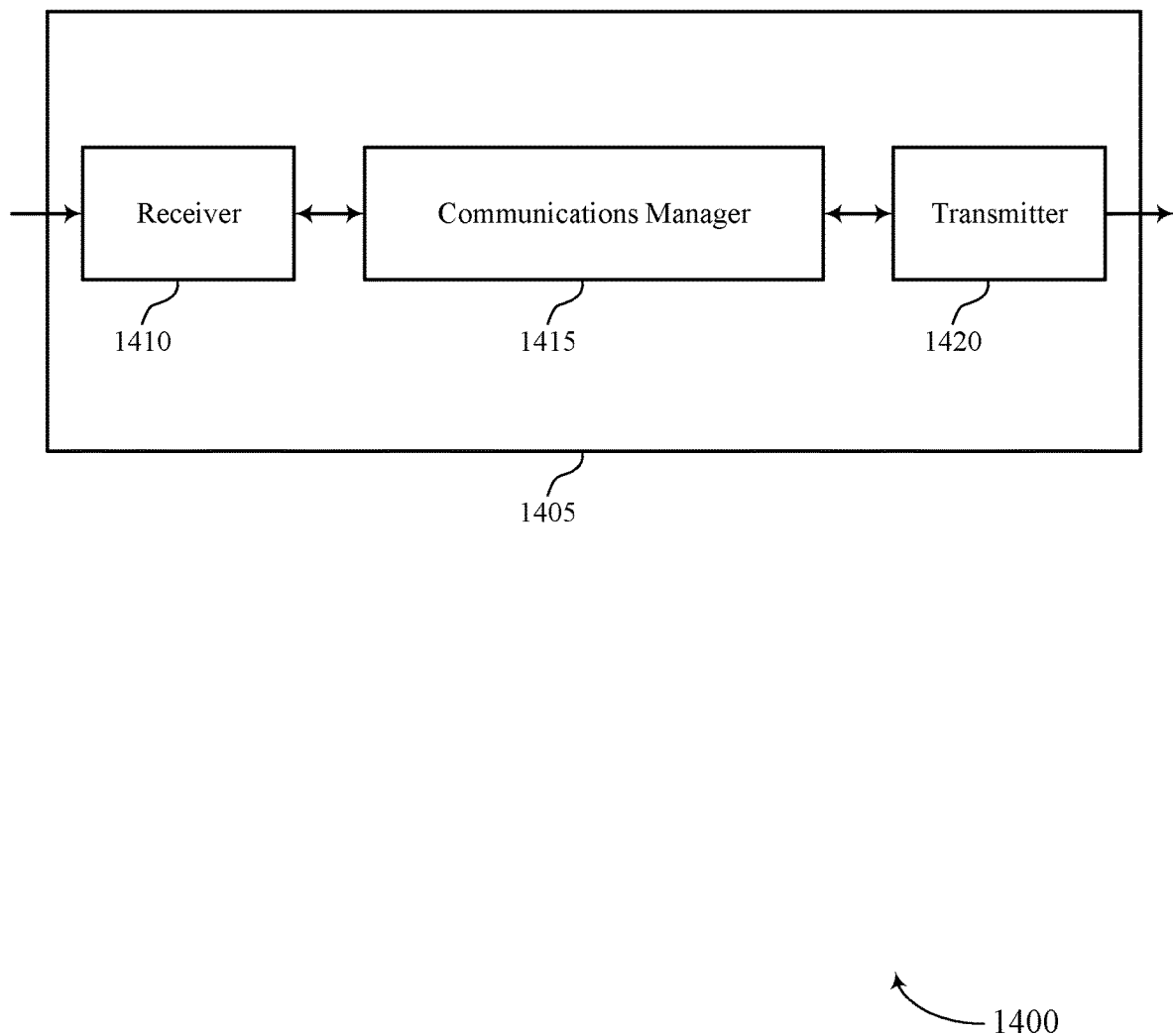
FIGS. 14 and 15 show block diagrams of devices that support shared channel design around reserved resources in accordance with aspects of the present disclosure.

FIG. 14 shows a block diagram 1400 of a device 1405 that supports shared channel design around reserved resources in accordance with aspects of the present disclosure. The device 1405 may be an example of aspects of a UE 115 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to shared channel design around reserved resources, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may receive an indicator of reserved resources in a shared radio frequency spectrum band, rate match an uplink shared data channel transmission around the reserved resources, and transmit, within the shared radio frequency spectrum band, the rate matched uplink shared data channel transmission.

The communications manager 1415 may also receive an uplink burst grant allocating uplink resources in a shared radio frequency spectrum band for a set of consecutive TTIs, receive an indicator of a set of CCA locations within the set of consecutive TTIs, a number of the set of CCA locations being common to a set of UEs that respectively utilize TTIs having different durations, and transmit, in the shared radio frequency spectrum band, an uplink transmission within a TTI of the set of consecutive TTIs based on a result of successful CCA performed at one of the set of CCA locations.

The communications manager 1415 may also receive an indicator of random access resources in a shared radio frequency spectrum band, identify a location of a CCA gap between a first random access resource of the set of random access resources and a second random access resource of the set of random access resources, perform a CCA procedure during the CCA gap and transmit, and determine whether to transmit on the second random access resource based at least in part on a result of the CCA procedure. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
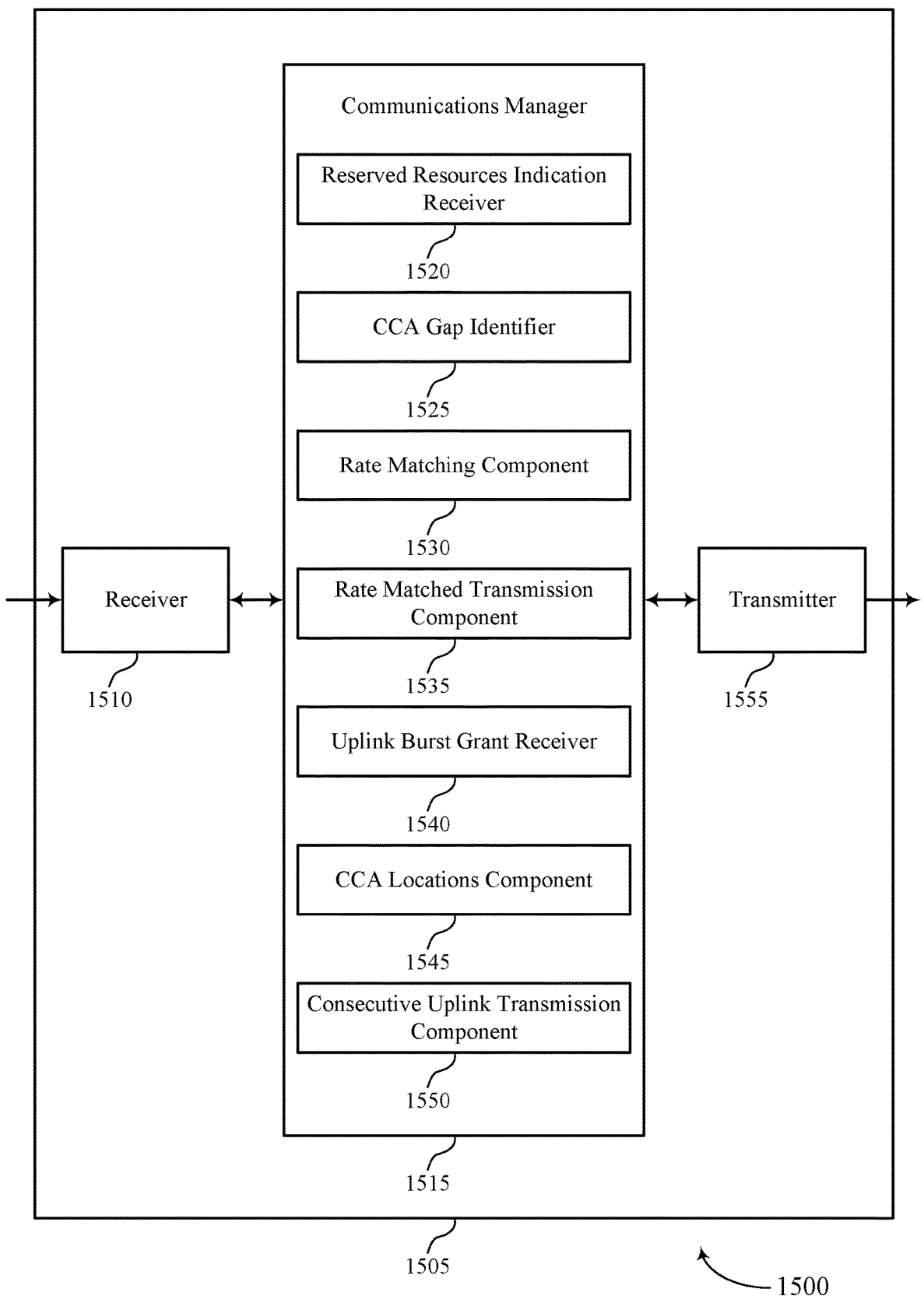

FIG. 15 shows a block diagram 1500 of a device 1505 that supports shared channel design around reserved resources in accordance with aspects of the present disclosure. The device 1505 may be an example of aspects of a device 1405 or a UE 115 as described herein. The device 1505 may include a receiver 1510, a communications manager 1515, and a transmitter 1555. The device 1505 may also include a processor. Each of these components may be in communication with one another (e.g., via one or more buses).

The receiver 1510 may receive information such as packets, user data, or control information associated with various information channels (e.g., control channels, data channels, and information related to shared channel design around reserved resources, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a reserved resources indication receiver 1520, a CCA gap identifier 1525, a rate matching component 1530, a rate matched transmission component 1535, an uplink burst grant receiver 1540, a CCA locations component 1545, and a consecutive uplink transmission component 1550. The communications manager 1515 may be an example of aspects of the communications manager 1710 described herein.

The reserved resources indication receiver 1520 may receive an indicator of reserved resources in a shared radio frequency spectrum band. In some cases, the CCA gap identifier 1525 may identify a location of a CCA gap relative to the reserved resources. The rate matching component 1530 may rate match an uplink shared data channel transmission around the reserved resources. In some cases, the rate matching component 1530 may rate match the uplink shared data channel transmission around the CCA gap. The rate matched transmission component 1535 may transmit, within the shared radio frequency spectrum band, the rate matched uplink shared data channel transmission.

The reserved resources indication receiver 1520 may receive an indicator of a set of random access resources in a shared radio frequency spectrum band. The CCA gap identifier 1525 may identify a location of a CCA gap between a first random access resource of the set of random access resources and a second random access resource of the set of random access resources. The CCA gap identifier 1525 perform a CCA procedure during the CCA gap. The CCA gap identifier 1525 may determine whether to transmit on the second random access resource based on a result of the CCA procedure.

The uplink burst grant receiver 1540 may receive an uplink burst grant allocating uplink resources in a shared radio frequency spectrum band for a set of consecutive TTIs. The CCA locations component 1545 may receive an indicator of a set of CCA locations within the set of consecutive TTIs, a number of the set of CCA locations being common to a set of UEs that respectively utilize TTIs having different durations. The consecutive uplink transmission component 1550 may transmit, in the shared radio frequency spectrum band, an uplink transmission within a TTI of the set of consecutive TTIs based on a result of successful CCA performed at one of the set of CCA locations.

The transmitter 1555 may transmit signals generated by other components of the device 1505. In some examples, the transmitter 1555 may be collocated with a receiver 1510 in a transceiver module. For example, the transmitter 1555 may be an example of aspects of the transceiver 1720 described with reference to FIG. 17. The transmitter 1555 may utilize a single antenna or a set of antennas.

Figure 16:
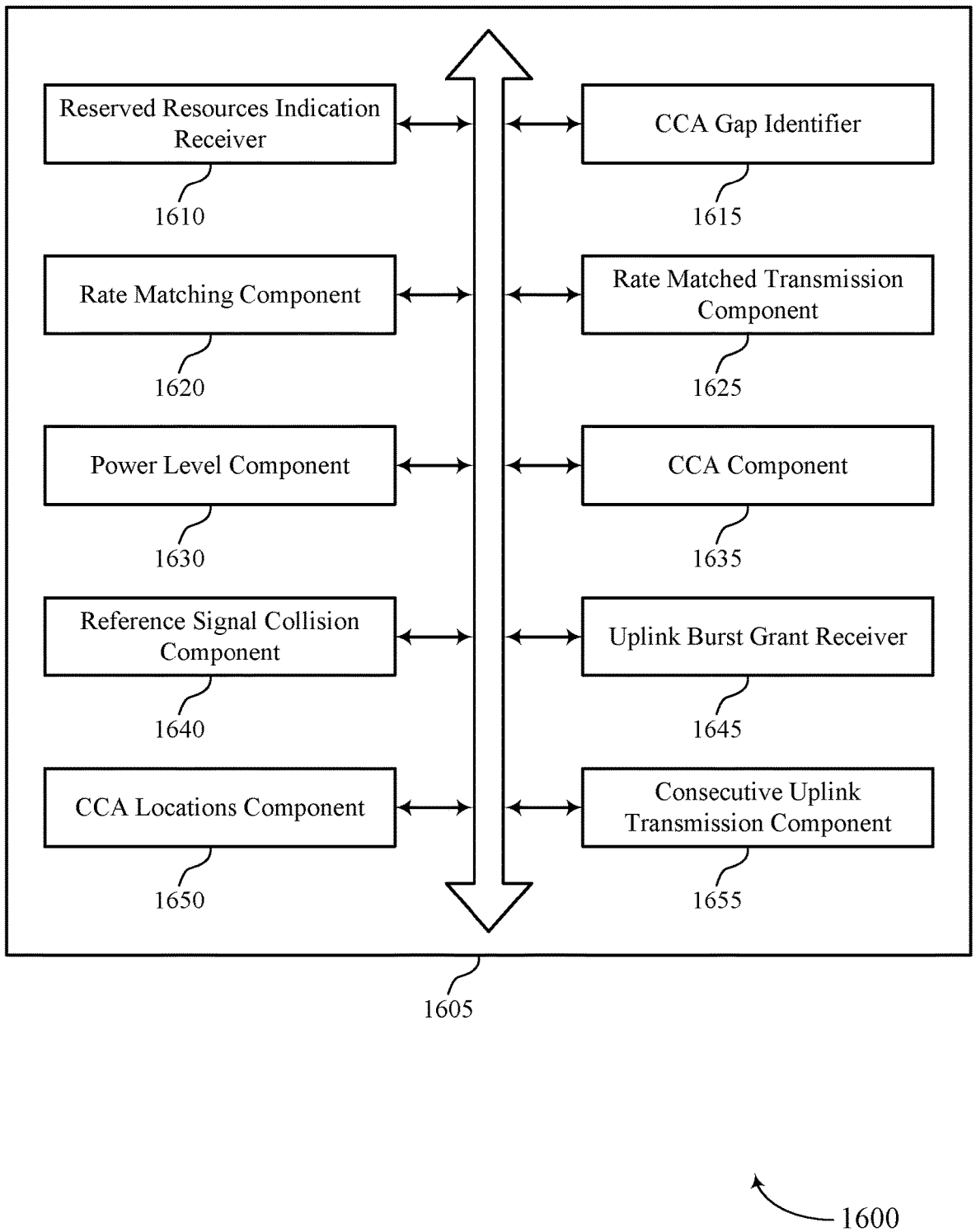
FIG. 16 shows a block diagram of a communications manager that supports shared channel design around reserved resources in accordance with aspects of the present disclosure.

FIG. 16 shows a block diagram 1600 of a communications manager 1605 that supports shared channel design around reserved resources in accordance with aspects of the present disclosure. The communications manager 1605 may be an example of aspects of a communications manager 1415, a communications manager 1515, or a communications manager 1710 described herein. The communications manager 1605 may include a reserved resources indication receiver 1610, a CCA gap identifier 1615, a rate matching component 1620, a rate matched transmission component 1625, a power level component 1630, a CCA component 1635, a reference signal collision component 1640, an uplink burst grant receiver 1645, a CCA locations component 1650, and a consecutive uplink transmission component 1655. Each of these modules may communicate, directly or indirectly, with one another (e.g., via one or more buses).

The reserved resources indication receiver 1610 may receive an indicator of reserved resources in a shared radio frequency spectrum band. In some examples, the reserved resources indication receiver 1610 may receive a broadcast signaling including the indicator of the reserved resources, where the indicator of the reserved resources is specific to a cell that transmitted the broadcast signaling. In some examples, the reserved resources indication receiver 1610 may receive a control signaling including the indicator of the reserved resources, where the indicator of the reserved resources is specific to the UE. In some cases, the reserved resources include a set of random access resources. In some cases, the indicator is a bitmap that identifies a symbol level and resource block level rate matching resource set. In some cases, the indicator is a bitmap that identifies a symbol level and sub-resource block level rate matching resource set. In some cases, the rate matched uplink shared data channel transmission is transmitted in an uplink shared data channel and the indicator of the reserved resources comprises an implicit indication of the reserved resources based at least in part on a configuration of a second uplink channel other than the uplink shared data channel.

The reserved resources indication receiver 1610 may receive an indicator of a set of random access resources in a shared radio frequency spectrum band. In some cases, a random access occasion associated with a random access resource of the set of random access resources includes one or more of a random access cyclic prefix duration, a set of random access symbol periods, and a guard time.

The CCA gap identifier 1615 may identify a location of a CCA gap relative to the reserved resources. The CCA gap identifier 1615 may identify a location of a CCA gap between a first random access resource of the set of random access resources and a second random access resource of the set of random access resources. The CCA gap identifier 1615 perform a CCA procedure during the CCA gap. The CCA gap identifier 1615 may determine whether to transmit on the second random access resource based on a result of the CCA procedure. In some cases, the indicator indicates that the location of the CCA gap is between a first random access resource of the set of random access resources and a second random access resource of the set of random access resources.

In some examples, the CCA gap identifier 1615 may receive a grant indicating allocated resources within the shared radio frequency spectrum band for the uplink shared data channel transmission, the grant indicating that the CCA gap occurs at a particular period of the allocated resources. In some other examples, the CCA gap identifier 1615 may determine that the CCA gap is located between a first random access resource of the set of random access resources and a second random access resource of the set of random access resources. In some cases, the CCA gap identifier 1615 may identify the location of the CCA gap between each pair of random access resources within the set of random access resources. In some cases, the CCA gap identifier 1615 may indicate that the location of the CCA gap is between the first random access resource and the second random access resource. In the cases, the CCA gap identifier 1615 may identify that the CCA may include a configurable number of symbol periods.

In some examples, the CCA gap identifier 1615 may determine that a first subset of the set of random access resources correspond to a first TTI and a second subset of the set of random access resources correspond to a second TTI. In some examples, the CCA gap identifier 1615 may determine whether to use the second subset of the set of random access resources to transmit a random access message.

In some examples, the CCA gap identifier 1615 may determine to use the second subset of the set of random access resources to send the random access message based on a TTI type indicator or a SFI associated with the second TTI. In some examples, the CCA gap identifier 1615 may receive a configuration message that indicates whether to use a random access resource of the set of random access resources that occurs within the second TTI.

The rate matching component 1620 may rate match an uplink shared data channel transmission around the reserved resources and the CCA gap. The rate matched transmission component 1625 may transmit, within the shared radio frequency spectrum band, the rate matched uplink shared data channel transmission. In some cases, the rate matched uplink shared data channel transmission is transmitted in an uplink shared data channel and the indicator indicates a configuration of an uplink channel other than the uplink shared data channel.

The uplink burst grant receiver 1645 may receive an uplink burst grant allocating uplink resources in a shared radio frequency spectrum band for a set of consecutive TTIs.

The CCA locations component 1650 may receive an indicator of a set of CCA locations within the set of consecutive TTIs, a number of the set of CCA locations being common to a set of UEs that respectively utilize TTIs having different durations. In some cases, the indicator indicates to perform a CCA at each CCA location of the set of CCA location prior to transmission within a respective TTI of the set of TTIs corresponding to the each CCA location. In some other examples, the indicator indicates to skip performing a CCA at a subsequent CCA location of the set of CCA locations based on determining that the shared radio frequency spectrum band is available at a prior CCA location of the set of CCA locations.

The consecutive uplink transmission component 1655 may transmit, in the shared radio frequency spectrum band, an uplink transmission within a TTI of the set of consecutive TTIs based on a result of successful CCA performed at one of the set of CCA locations. In some examples, the consecutive uplink transmission component 1655 may continue transmission for the set of TTIs of the uplink burst grant without performing a CCA at subsequent CCA locations of the set of CCA locations based on determining that the shared radio frequency spectrum band is available at a prior CCA location of the set of CCA locations.

The power level component 1630 may transmit the rate matched uplink shared data channel transmission at a higher power level during a first period that is shared with the reserved resources and at a lower power level during a second period that is not shared with the reserved resources. In some examples, the power level component 1630 may transmit uplink control information to indicate the higher power level for the first period.

In some examples, the power level component 1630 may identify the higher power level for the first period based on one or more of downlink control information, a power level for the second period, a bandwidth of the reserved resources, a bandwidth of a shared data channel, modulation of the shared data channel, a transmit power spectral density regulation, or any combination thereof.

The CCA component 1635 may perform a CCA prior to resuming transmission of the rate matched uplink shared data channel transmission, in frequencies occupied by the reserved resources, after an end of the reserved resources and the CCA gap.

The reference signal collision component 1640 may determine that a reference signal is scheduled for transmission within the reserved resources or the CCA gap. In some examples, the reference signal collision component 1640 may determine not to transmit the reference signal. In some examples, the reference signal collision component 1640 may transmit the reference signal in resources that are not within the reserved resources or the CCA gap. In some examples, the reference signal collision component 1640 may transmit the reference signal as scheduled.

In some examples, the reference signal collision component 1640 may skip transmitting of the rate matched uplink shared data channel transmission in a scheduled TTI, where transmitting the rate matched uplink shared data channel transmission occurs in a different TTI than the scheduled TTI. In some examples, the reference signal collision component 1640 may transmit the reference signal using a first reference signal pattern of a set of reference signal patterns, where the first reference signal pattern identifies resources that do not overlap with the reserved resources or the CCA gap. In some cases, the first reference signal pattern indicates a shift of at least one symbol of the reference signal to avoid a collision between the reference signal and the reserved resources, the CCA gap, or both.

In some examples, the reference signal collision component 1640 may select a collision response from a set of different collisions responses based on determining that a reference signal is scheduled for transmission within the reserved resources or the CCA gap.

In some examples, the reference signal collision component 1640 may select the collision response from the set of different collision responses based on a number of symbols of the reference signal, a number of symbols of the reference signal that collide with the reserved resources or the CCA gap, a waveform type of the uplink shared data channel transmission, DCI signaling, whether the reference signal is scheduled for transmission within the reserved resources, whether reference signal is scheduled for transmission within the CCA gap, a type of the reserved resources, or any combination thereof.

In some examples, the reference signal collision component 1640 may determine that the reference signal is scheduled to be transmitted during a set of symbols. In some examples, the reference signal collision component 1640 may apply the selected collision response to adjust in which symbol the reference signal is transmitted on up to each symbol of the set of symbols. In some examples, the reference signal collision component 1640 may determine that a reference signal is scheduled for transmission within the reserved resources, the reserved resources using a tone interlace structure. In some examples, the reference signal collision component 1640 may transmit the reference signal in an unreserved tone level interlace of the tone interlace structure.

Figure 17:
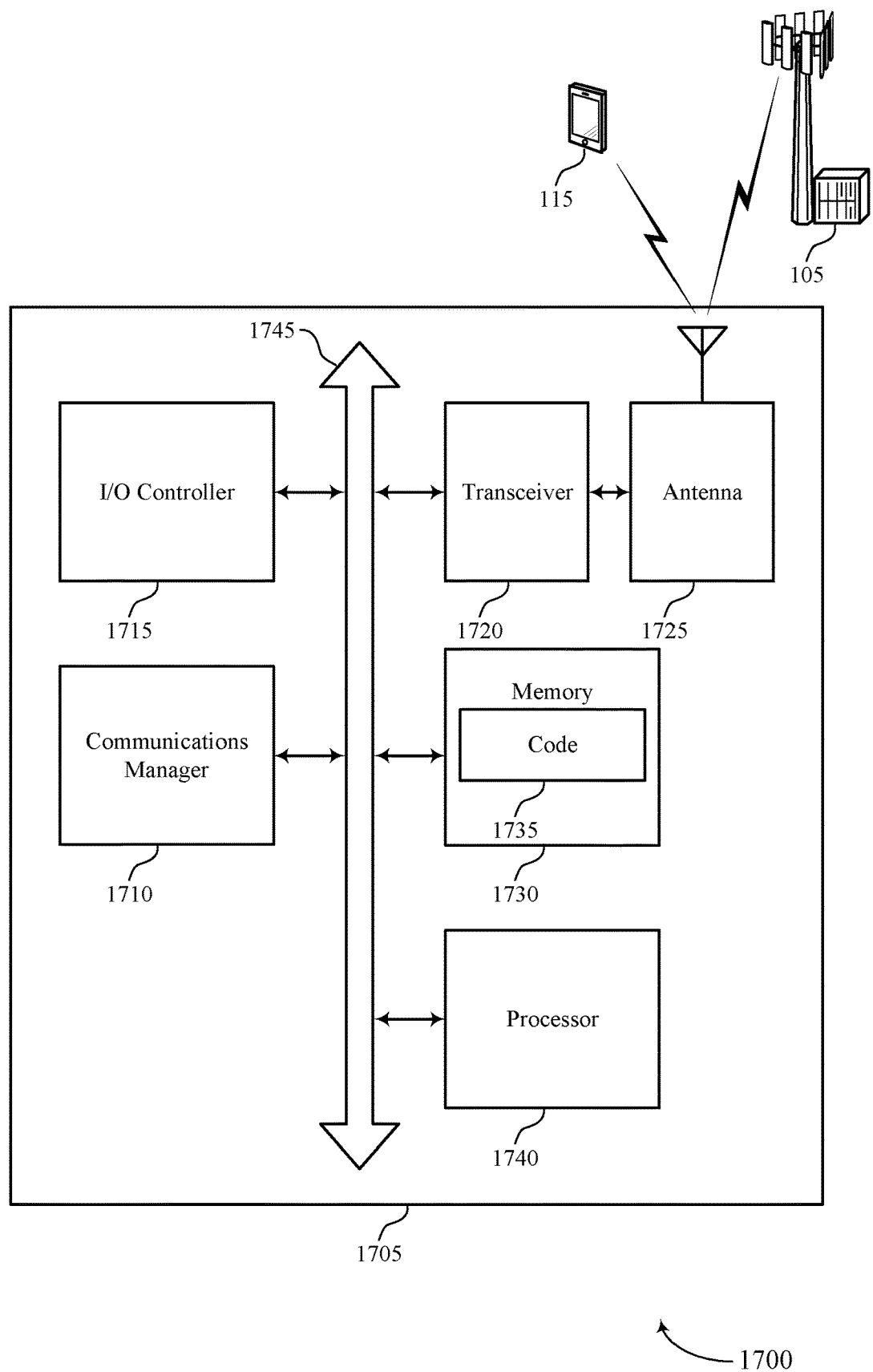
FIG. 17 shows a diagram of a system including a device that supports shared channel design around reserved resources in accordance with aspects of the present disclosure.

FIG. 17 shows a diagram of a system 1700 including a device 1705 that supports shared channel design around reserved resources in accordance with aspects of the present disclosure. The device 1705 may be an example of or include the components of device 1405, device 1505, or a UE 115 as described herein. The device 1705 may include components for bi-directional voice and data communications including components for transmitting and receiving communications, including a communications manager 1710, an I/O controller 1715, a transceiver 1720, an antenna 1725, memory 1730, and a processor 1740. These components may be in electronic communication via one or more buses (e.g., bus 1745).

The communications manager 1710 may receive an indicator of reserved resources in a shared radio frequency spectrum band, rate match an uplink shared data channel transmission around the reserved resources, and transmit, within the shared radio frequency spectrum band, the rate matched uplink shared data channel transmission. In some cases, the communications manager 1710 may identify a location of a CCA gap relative to the reserved resources. In some cases, the communications manager 1710 may rate match the uplink shared data channel transmission around the CCA gap.

The communications manager 1710 may also receive an uplink burst grant allocating uplink resources in a shared radio frequency spectrum band for a set of consecutive TTIs, receive an indicator of a set of CCA locations within the set of consecutive TTIs, a number of the set of CCA locations being common to a set of UEs that respectively utilize TTIs having different durations, and transmit, in the shared radio frequency spectrum band, an uplink transmission within a TTI of the set of consecutive TTIs based on a result of successful CCA performed at one of the set of CCA locations.

The communications manager 1710 may also receive an indicator of a set of random access resources in a shared radio frequency spectrum band, identifying a location of a CCA gap between a first random access resource of the set of random access resources and a second random access resource of the set of random access resources, perform a CCA procedure during the CCA gap, and determine whether to transmit on the second random access resource based at least a result of the CCA procedure.

The I/O controller 1715 may manage input and output signals for the device 1705. The I/O controller 1715 may also manage peripherals not integrated into the device 1705. In some cases, the I/O controller 1715 may represent a physical connection or port to an external peripheral. In some cases, the I/O controller 1715 may utilize an operating system such as iOS®, ANDROID®, MS-DOS®, MS-WINDOWS®, OS/2®, UNIX®, LINUX®, or another known operating system. In other cases, the I/O controller 1715 may represent or interact with a modem, a keyboard, a mouse, a touchscreen, or a similar device. In some cases, the I/O controller 1715 may be implemented as part of a processor. In some cases, a user may interact with the device 1705 via the I/O controller 1715 or via hardware components controlled by the I/O controller 1715.

The transceiver 1720 may communicate bi-directionally, via one or more antennas, wired, or wireless links as described herein. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM and ROM. The memory 1730 may store computer-readable, computer-executable code 1735 including instructions that, when executed, cause the processor to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting shared channel design around reserved resources).

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
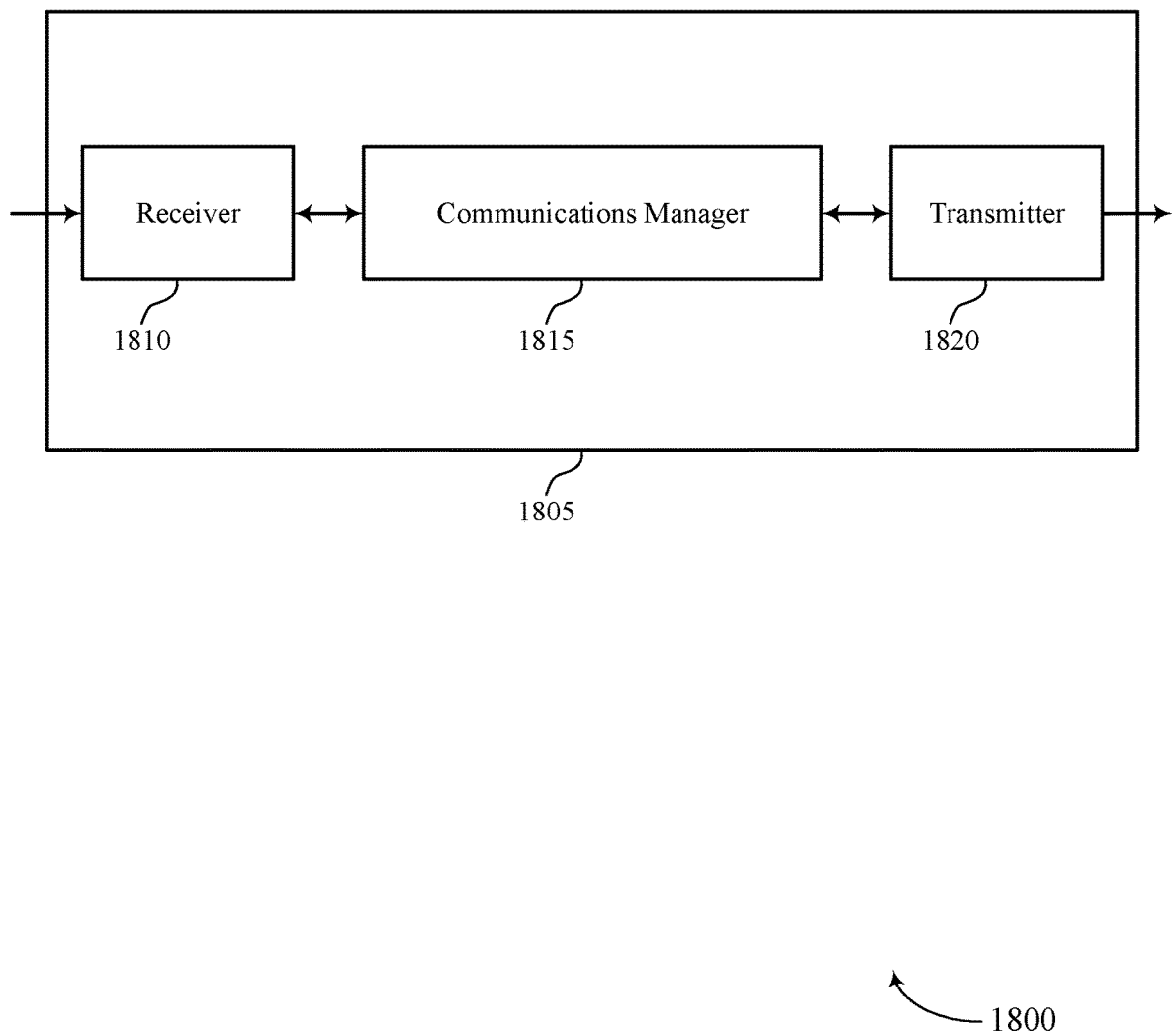
FIGS. 18 and 19 show block diagrams of devices that support shared channel design around reserved resources in accordance with aspects of the present disclosure.

FIG. 18 shows a block diagram 1800 of a device 1805 that supports shared channel design around reserved resources in accordance with aspects of the present disclosure. The device 1805 may be an example of aspects of a base station 105 as described herein. The device 1805 may include a receiver 1810, a communications manager 1815, and a transmitter 1820. The device 1805 may also include a processor. Each of these components may be in communication with one another (e.g., via one or more buses).

The receiver 1810 may receive information such as packets, user data, or control information associated with various information channels (e.g., control channels, data channels, and information related to shared channel design around reserved resources, etc.). Information may be passed on to other components of the device 1805. The receiver 1810 may be an example of aspects of the transceiver 2120 described with reference to FIG. 21. The receiver 1810 may utilize a single antenna or a set of antennas.

The communications manager 1815 may transmit an indicator of reserved resources in a shared radio frequency spectrum band, receive, within the shared radio frequency spectrum band, a rate matched uplink shared data channel transmission, and de-rate match the rate matched uplink shared data channel transmission based on the reserved resources. In some cases, the communications manager 1815 may identify a location of a CCA gap relative to the reserved resources. In some cases, the communications manager 1815 may de-rate match the rate matched uplink shared data channel transmission based on the location of the CCA gap.

The communications manager 1815 may also transmit an uplink burst grant allocating uplink resources in a shared radio frequency spectrum band for a set of consecutive TTIs, transmit an indicator of a set of CCA locations within the set of consecutive TTIs, a number of the set of CCA locations being common to a set of UEs that respectively utilize TTIs having different durations, and receive, in the shared radio frequency spectrum band, an uplink transmission within a first TTI of the set of consecutive TTIs. The communications manager 1815 may be an example of aspects of the communications manager 2110 described herein.

The communications manager 1815 may transmit an indicator of a set of random access resources in a shared radio frequency spectrum band, identify a location of a CCA gap between a first random access resource of the set of random access resources and a second random access resource of the set of random access resources, and monitor the second random access resource based on the location of the CCA gap.

The communications manager 1815, or its sub-components, may be implemented in hardware, code (e.g., software or firmware) executed by a processor, or any combination thereof. If implemented in code executed by a processor, the functions of the communications manager 1815, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1815, or its sub-components, may be physically located at various positions, including being distributed such that portions of functions are implemented at different physical locations by one or more physical components. In some examples, the communications manager 1815, or its sub-components, may be a separate and distinct component in accordance with various aspects of the present disclosure. In some examples, the communications manager 1815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1820 may transmit signals generated by other components of the device 1805. In some examples, the transmitter 1820 may be collocated with a receiver 1810 in a transceiver module. For example, the transmitter 1820 may be an example of aspects of the transceiver 2120 described with reference to FIG. 21. The transmitter 1820 may utilize a single antenna or a set of antennas.

Figure 19:
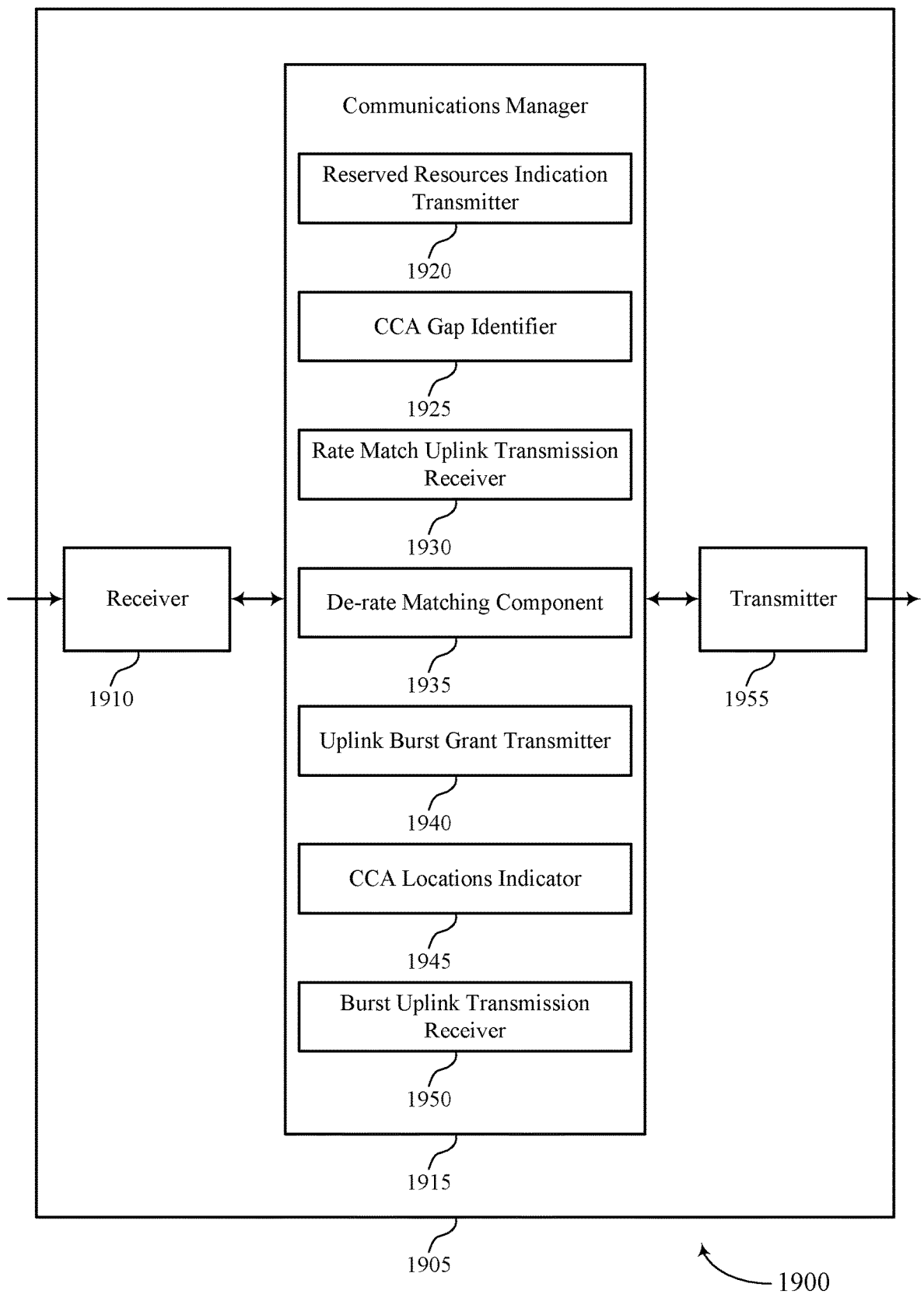

FIG. 19 shows a block diagram 1900 of a device 1905 that supports shared channel design around reserved resources in accordance with aspects of the present disclosure. The device 1905 may be an example of aspects of a device 1805 or a base station 105 as described herein. The device 1905 may include a receiver 1910, a communications manager 1915, and a transmitter 1955. The device 1905 may also include a processor. Each of these components may be in communication with one another (e.g., via one or more buses).

The receiver 1910 may receive information such as packets, user data, or control information associated with various information channels (e.g., control channels, data channels, and information related to shared channel design around reserved resources, etc.). Information may be passed on to other components of the device 1905. The receiver 1910 may be an example of aspects of the transceiver 2120 described with reference to FIG. 21. The receiver 1910 may utilize a single antenna or a set of antennas.

The communications manager 1915 may be an example of aspects of the communications manager 1815 as described herein. The communications manager 1915 may include a reserved resources indication transmitter 1920, a CCA gap identifier 1925, a rate match uplink transmission receiver 1930, a de-rate matching component 1935, an uplink burst grant transmitter 1940, a CCA locations indicator 1945, and a burst uplink transmission receiver 1950. The communications manager 1915 may be an example of aspects of the communications manager 2110 described herein. The reserved resources indication transmitter 1920 may transmit an indicator of reserved resources in a shared radio frequency spectrum band. The CCA gap identifier 1925 may identify a location of a CCA gap relative to the reserved resources. The rate match uplink transmission receiver 1930 may receive, within the shared radio frequency spectrum band, a rate matched uplink shared data channel transmission. The de-rate matching component 1935 may de-rate match the rate matched uplink shared data channel transmission based on the reserved resources. In some cases, the de-rate matching component 1935 may de-rate match the rate matched uplink shared data channel transmission based on the location of the CCA gap The reserved resources indication transmitter 1920 may transmit an indicator of a set of random access resources in a shared radio frequency spectrum band. The CCA gap identifier 1925 may identify a location of a CCA gap between a first random access resource of the set of random access resources and a second random access resource of the set of random access resources. The CCA gap identifier 1925 may monitor the second random access resource based on the location of the CCA gap. The uplink burst grant transmitter 1940 may transmit an uplink burst grant allocating uplink resources in a shared radio frequency spectrum band for a set of consecutive TTIs. The CCA locations indicator 1945 may transmit an indicator of a set of CCA locations within the set of consecutive TTIs, a number of the set of CCA locations being common to a set of UEs that respectively utilize TTIs having different durations. The burst uplink transmission receiver 1950 may receive, in the shared radio frequency spectrum band, an uplink transmission within a first TTI of the set of consecutive TTIs.

The transmitter 1955 may transmit signals generated by other components of the device 1905. In some examples, the transmitter 1955 may be collocated with a receiver 1910 in a transceiver module. For example, the transmitter 1955 may be an example of aspects of the transceiver 2120 described with reference to FIG. 21. The transmitter 1955 may utilize a single antenna or a set of antennas.

Figure 20:
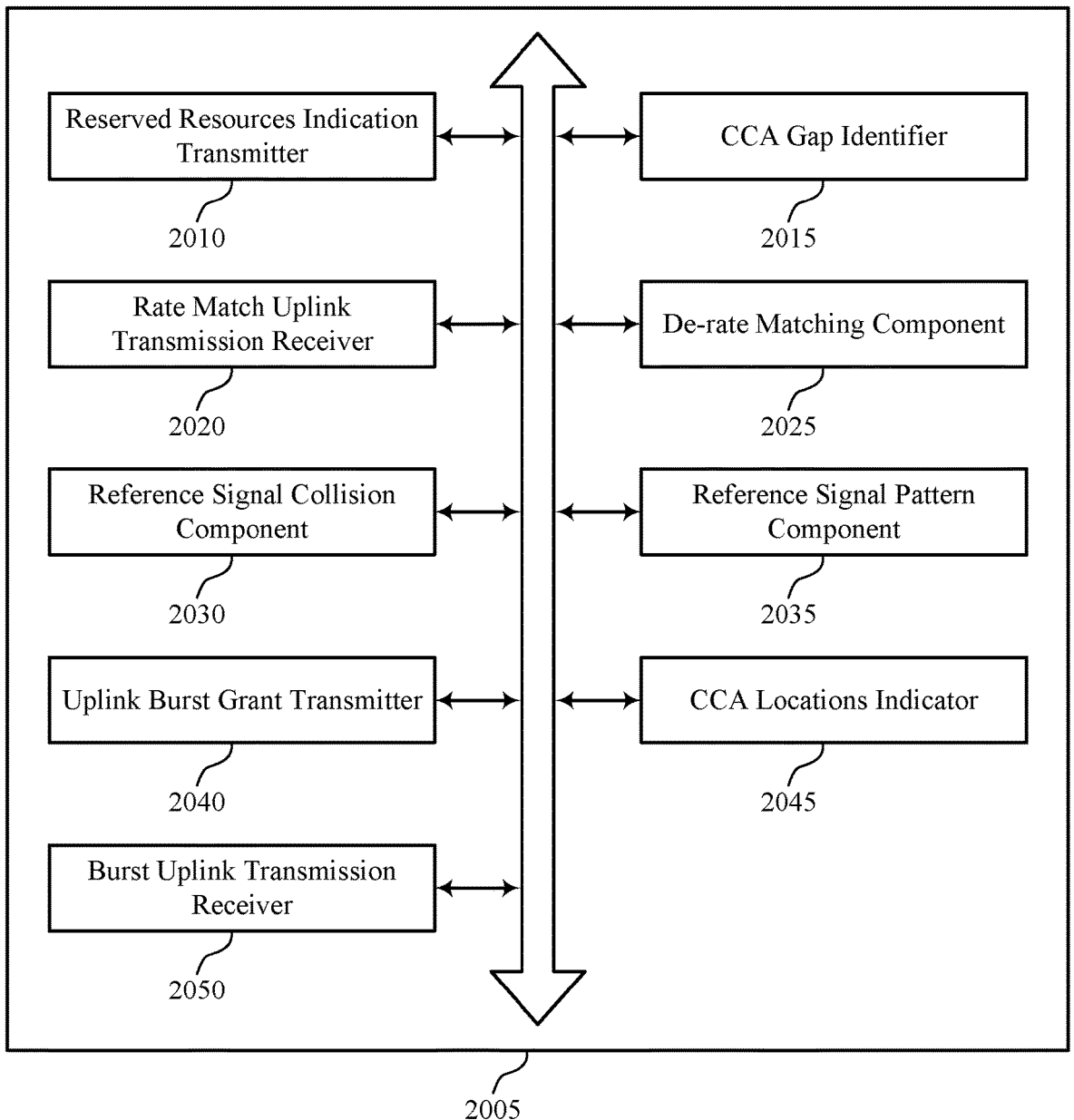
FIG. 20 shows a block diagram of a communications manager that supports shared channel design around reserved resources in accordance with aspects of the present disclosure.

FIG. 20 shows a block diagram 2000 of a communications manager 2005 that supports shared channel design around reserved resources in accordance with aspects of the present disclosure. The communications manager 2005 may be an example of aspects of a communications manager 1815, a communications manager 1915, or a communications manager 2110 described herein. The communications manager 2005 may include a reserved resources indication transmitter 2010, a CCA gap identifier 2015, a rate match uplink transmission receiver 2020, a de-rate matching component 2025, a reference signal collision component 2030, a reference signal pattern component 2035, an uplink burst grant transmitter 2040, a CCA locations indicator 2045, and a burst uplink transmission receiver 2050. Each of these modules may communicate, directly or indirectly, with one another (e.g., via one or more buses).

The reserved resources indication transmitter 2010 may transmit an indicator of reserved resources in a shared radio frequency spectrum band. In some examples, the reserved resources indication transmitter 2010 may receive a random access message during a first random access resource of the set of random access resources. In some examples, the reserved resources indication transmitter 2010 may receive a random access message during each random access resource of the set of random access resources.

In some cases, the reserved resources include a set of random access resources. In some cases, the indicator indicates that the location of the CCA gap is between a first random access resource of the set of random access resources and a second random access resource of the set of random access resources. In some cases, the indicator is a bitmap that identifies a symbol level and resource block level rate matching resource set or identifies a symbol level and sub-resource block level rate matching resource set.

The CCA gap identifier 2015 may identify a location of a CCA gap relative to the reserved resources. In some examples, the CCA gap identifier 2015 may transmit a grant indicating the location of the CCA gap. The CCA gap identifier 2015, may identify a CCA gap that includes a configurable number of symbol periods.

The rate match uplink transmission receiver 2020 may receive, within the shared radio frequency spectrum band, a rate matched uplink shared data channel transmission.

The de-rate matching component 2025 may de-rate match the rate matched uplink shared data channel transmission based on the reserved resources. In some cases, the de-rate matching component 2025 may de-rate match the rate matched uplink shared data channel transmission based on the location of the CCA gap.

The reference signal collision component 2030 may transmit DCI indicating a collision response for a reference signal colliding with the reserved resources. In some examples, the reference signal collision component 2030 may identify a reference signal pattern based on the collision response. In some examples, the reference signal collision component 2030 may demodulate the rate matched uplink shared data channel transmission based on the reference signal pattern.

The reference signal pattern component 2035 may receive uplink control information (UCI) indicating a reference signal pattern. In some examples, the reference signal pattern component 2035 may demodulate the rate matched uplink shared data channel transmission based on the reference signal pattern.

The uplink burst grant transmitter 2040 may transmit an uplink burst grant allocating uplink resources in a shared radio frequency spectrum band for a set of consecutive TTIs.

The CCA locations indicator 2045 may transmit an indicator of a set of CCA locations within the set of consecutive TTIs, a number of the set of CCA locations being common to a set of UEs that respectively utilize TTIs having different durations. In some cases, the indicator indicates to perform a CCA at each CCA location of the set of CCA locations prior to transmission within a respective TTI of the set of TTIs corresponding to the each CCA location. In some cases, the indicator indicates to skip performing a CCA at a subsequent CCA location of the set of CCA locations based on determining that the shared radio frequency spectrum band is available at a prior CCA location of the set of CCA locations.

The burst uplink transmission receiver 2050 may receive, in the shared radio frequency spectrum band, an uplink transmission within a first TTI of the set of consecutive TTIs.

Figure 21:
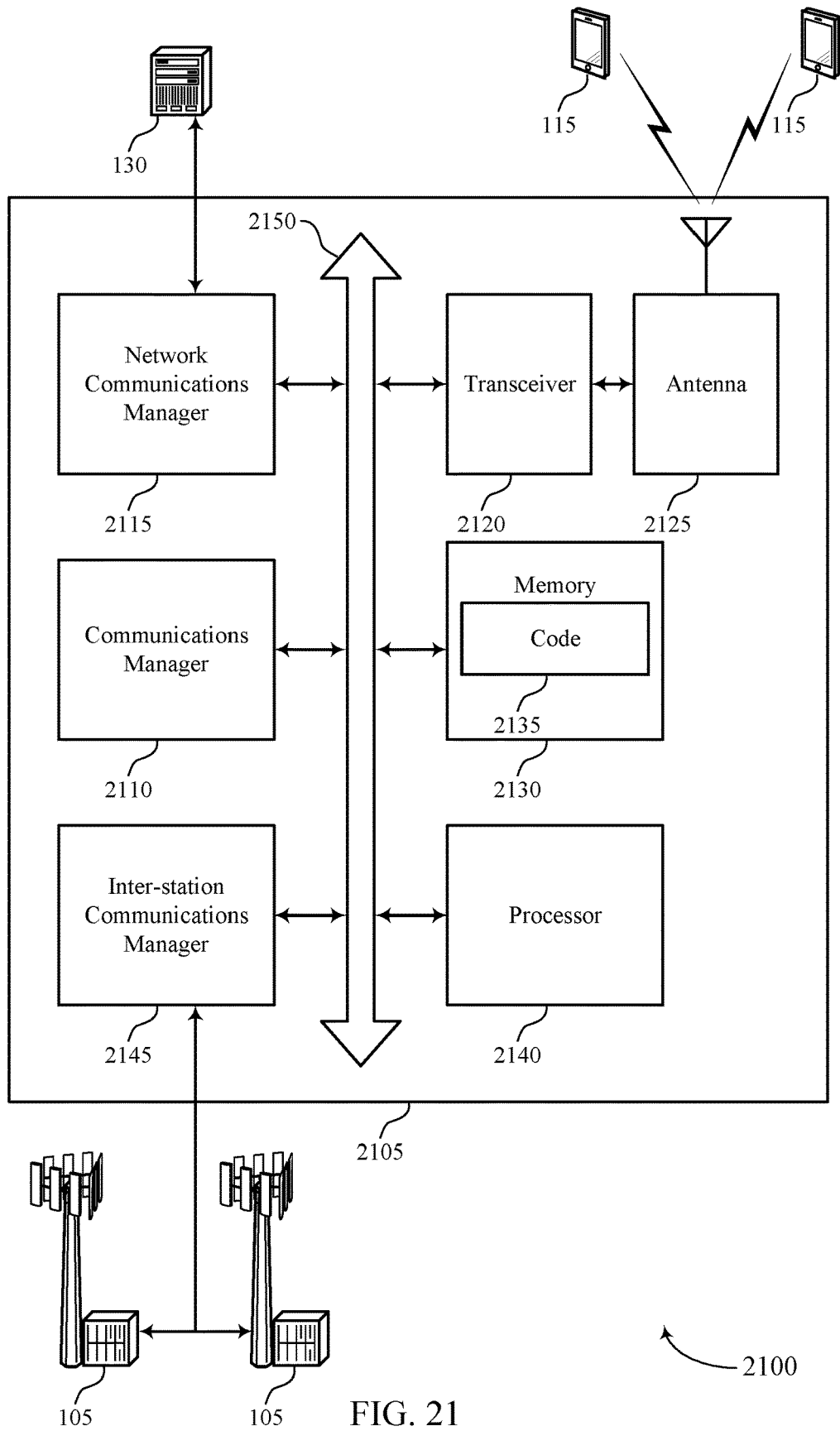
FIG. 21 shows a diagram of a system including a device that supports shared channel design around reserved resources in accordance with aspects of the present disclosure.

FIG. 21 shows a diagram of a system 2100 including a device 2105 that supports shared channel design around reserved resources in accordance with aspects of the present disclosure. The device 2105 may be an example of or include the components of device 1805, device 1905, or a base station 105 as described herein. The device 2105 may include components for bi-directional voice and data communications including components for transmitting and receiving communications, including a communications manager 2110, a network communications manager 2115, a transceiver 2120, an antenna 2125, memory 2130, a processor 2140, and an inter-station communications manager 2145. These components may be in electronic communication via one or more buses (e.g., bus 2150).

The communications manager 2110 may transmit an indicator of reserved resources in a shared radio frequency spectrum band, receive, within the shared radio frequency spectrum band, a rate matched uplink shared data channel transmission, and de-rate match the rate matched uplink shared data channel transmission based on the reserved resources. In some cases, the communications manager 2110 may identify a location of a CCA gap relative to the reserved resources. In some cases, the communications manager 2110 may de-rate match the rate matched uplink shared data channel transmission based on the location of the CCA gap.

The communications manager 2110 may also transmit an uplink burst grant allocating uplink resources in a shared radio frequency spectrum band for a set of consecutive TTIs, transmit an indicator of a set of CCA locations within the set of consecutive TTIs, a number of the set of CCA locations being common to a set of UEs that respectively utilize TTIs having different durations, and receive, in the shared radio frequency spectrum band, an uplink transmission within a first TTI of the set of consecutive TTIs.

The network communications manager 2115 may manage communications with the core network (e.g., via one or more wired backhaul links). For example, the network communications manager 2115 may manage the transfer of data communications for client devices, such as one or more UEs 115.

The transceiver 2120 may communicate bi-directionally, via one or more antennas, wired, or wireless links as described herein. For example, the transceiver 2120 may represent a wireless transceiver and may communicate bi-directionally with another wireless transceiver. The transceiver 2120 may also include a modem to modulate the packets and provide the modulated packets to the antennas for transmission, and to demodulate packets received from the antennas.

In some cases, the wireless device may include a single antenna 2125. However, in some cases the device may have more than one antenna 2125, which may be capable of concurrently transmitting or receiving multiple wireless transmissions.

The memory 2130 may include RAM, ROM, or a combination thereof. The memory 2130 may store computer-readable code 2135 including instructions that, when executed by a processor (e.g., the processor 2140) cause the device to perform various functions described herein. In some cases, the memory 2130 may contain, among other things, a BIOS which may control basic hardware or software operation such as the interaction with peripheral components or devices.

The processor 2140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2140 may be configured to operate a memory array using a memory controller. In some cases, a memory controller may be integrated into processor 2140. The processor 2140 may be configured to execute computer-readable instructions stored in a memory (e.g., the memory 2130) to cause the device 2105 to perform various functions (e.g., functions or tasks supporting shared channel design around reserved resources).

The inter-station communications manager 2145 may manage communications with other base station 105, and may include a controller or scheduler for controlling communications with UEs 115 in cooperation with other base stations 105. For example, the inter-station communications manager 2145 may coordinate scheduling for transmissions to UEs 115 for various interference mitigation techniques such as beamforming or joint transmission. In some examples, the inter-station communications manager 2145 may provide an X2 interface within an LTE/LTE-A wireless communication network technology to provide communication between base stations 105.

The code 2135 may include instructions to implement aspects of the present disclosure, including instructions to support wireless communications. The code 2135 may be stored in a non-transitory computer-readable medium such as system memory or other type of memory. In some cases, the code 2135 may not be directly executable by the processor 2140 but may cause a computer (e.g., when compiled and executed) to perform functions described herein.

Figure 22:
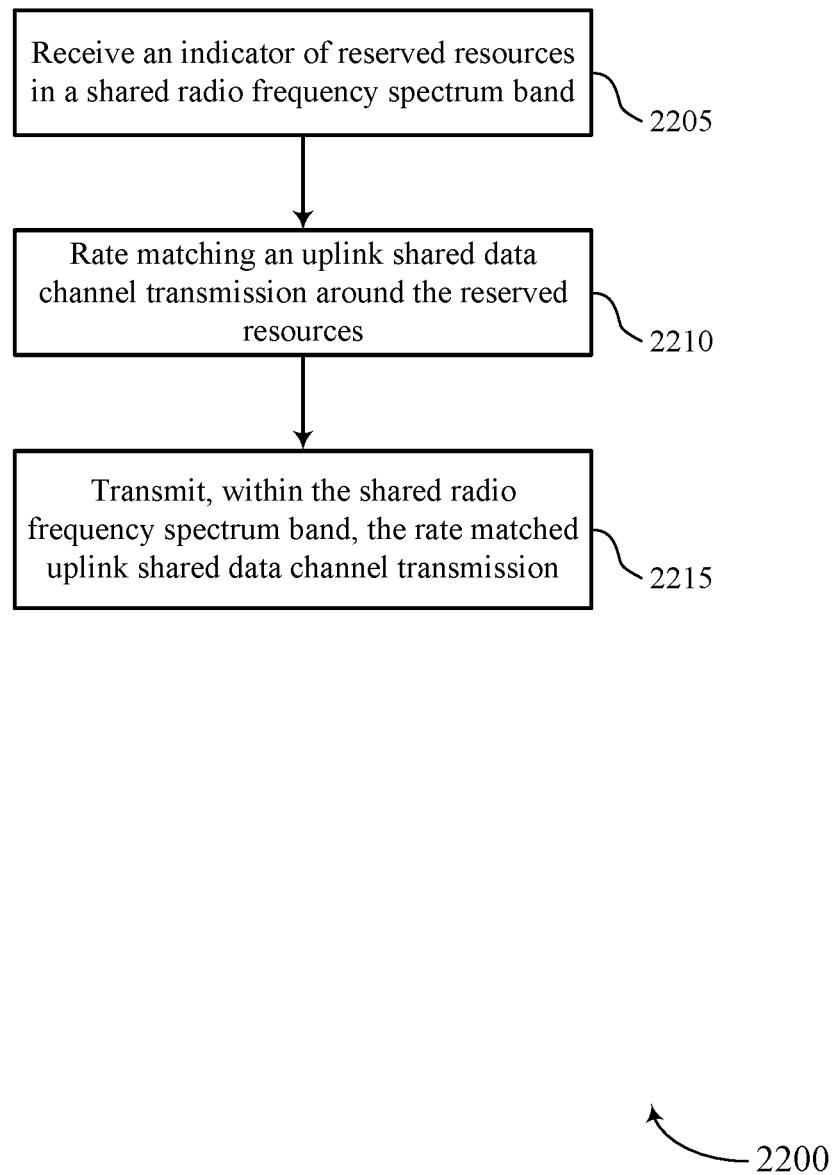
FIGS. 22 through 28 show flowcharts illustrating methods that support shared channel design around reserved resources in accordance with aspects of the present disclosure.

FIG. 22 shows a flowchart illustrating a method 2200 that supports shared channel design around reserved resources in accordance with aspects of the present disclosure. The operations of method 2200 may be implemented by a UE 115 or its components as described herein. For example, the operations of method 2200 may be performed by a communications manager as described with reference to FIGS. 14 through 17. In some examples, a UE may execute a set of instructions to control the functional elements of the UE to perform the functions described herein. Additionally or alternatively, a UE may perform aspects of the functions described herein using special-purpose hardware.

At 2205, the UE may receive an indicator of reserved resources in a shared radio frequency spectrum band. The operations of 2205 may be performed according to the methods described herein. In some examples, aspects of the operations of 2205 may be performed by a reserved resources indication receiver as described with reference to FIGS. 14 through 17.

In some implementations, the UE may identify a location of a CCA gap relative to the reserved resources. Identifying the location of the CCA gap relative to the reserved resources may be performed according to the methods described herein. In some examples, aspects identifying the location of the CCA gap relative to the reserved resources may be performed by a CCA gap identifier as described with reference to FIGS. 14 through 17.

At 2210, the UE may rate match an uplink shared data channel transmission around the reserved resources. The operations of 2210 may be performed according to the methods described herein. In some examples, aspects of the operations of 2210 may be performed by a rate matching component as described with reference to FIGS. 14 through 17.

At 2215, the UE may transmit, within the shared radio frequency spectrum band, the rate matched uplink shared data channel transmission. The operations of 2215 may be performed according to the methods described herein. In some examples, aspects of the operations of 2215 may be performed by a rate matched transmission component as described with reference to FIGS. 14 through 17.

Figure 23:
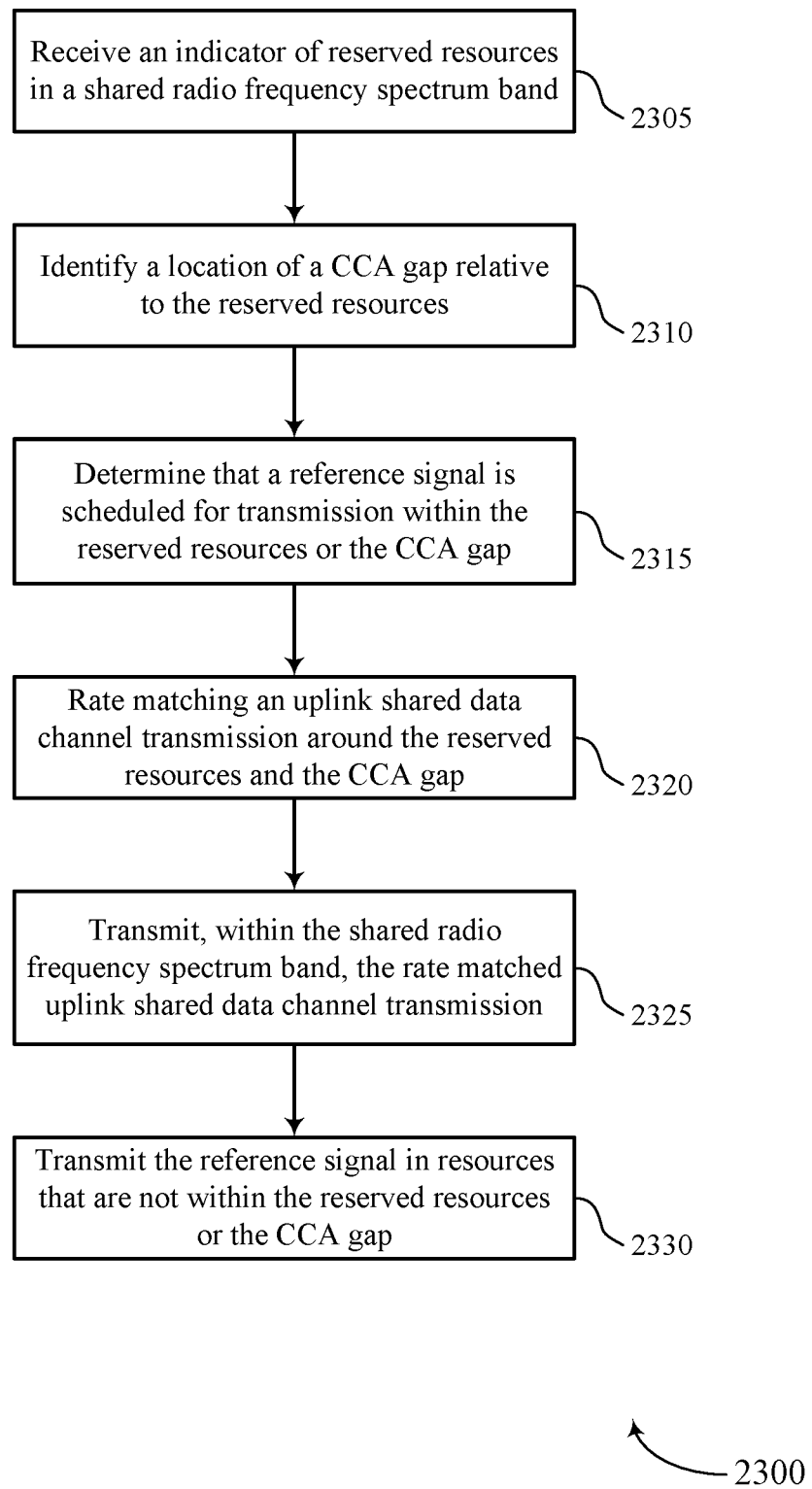

FIG. 23 shows a flowchart illustrating a method 2300 that supports shared channel design around reserved resources in accordance with aspects of the present disclosure. The operations of method 2300 may be implemented by a UE 115 or its components as described herein. For example, the operations of method 2300 may be performed by a communications manager as described with reference to FIGS. 14 through 17. In some examples, a UE may execute a set of instructions to control the functional elements of the UE to perform the functions described herein. Additionally or alternatively, a UE may perform aspects of the functions described herein using special-purpose hardware.

At 2305, the UE may receive an indicator of reserved resources in a shared radio frequency spectrum band. The operations of 2305 may be performed according to the methods described herein. In some examples, aspects of the operations of 2305 may be performed by a reserved resources indication receiver as described with reference to FIGS. 14 through 17.

At 2310, the UE may identify a location of a CCA gap relative to the reserved resources. The operations of 2310 may be performed according to the methods described herein. In some examples, aspects of the operations of 2310 may be performed by a CCA gap identifier as described with reference to FIGS. 14 through 17.

At 2315, the UE may determine that a reference signal is scheduled for transmission within the reserved resources or the CCA gap. The operations of 2315 may be performed according to the methods described herein. In some examples, aspects of the operations of 2315 may be performed by a reference signal collision component as described with reference to FIGS. 14 through 17.

At 2320, the UE may rate match an uplink shared data channel transmission around the reserved resources and the CCA gap. The operations of 2320 may be performed according to the methods described herein. In some examples, aspects of the operations of 2320 may be performed by a rate matching component as described with reference to FIGS. 14 through 17.

At 2325, the UE may transmit, within the shared radio frequency spectrum band, the rate matched uplink shared data channel transmission. The operations of 2325 may be performed according to the methods described herein. In some examples, aspects of the operations of 2325 may be performed by a rate matched transmission component as described with reference to FIGS. 14 through 17.

At 2330, the UE may transmit the reference signal in resources that are not within the reserved resources or the CCA gap. The operations of 2330 may be performed according to the methods described herein. In some examples, aspects of the operations of 2330 may be performed by a reference signal collision component as described with reference to FIGS. 14 through 17.

Figure 24:
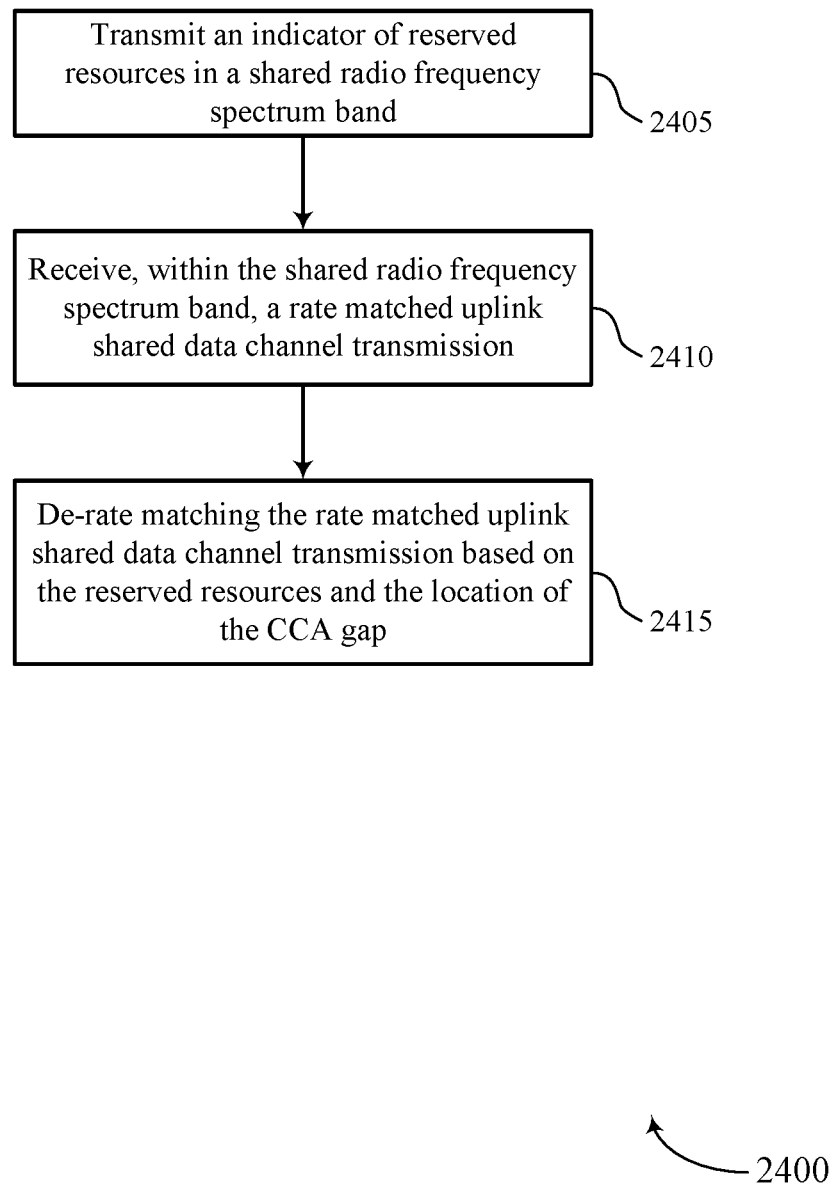

FIG. 24 shows a flowchart illustrating a method 2400 that supports shared channel design around reserved resources in accordance with aspects of the present disclosure. The operations of method 2400 may be implemented by a base station 105 or its components as described herein. For example, the operations of method 2400 may be performed by a communications manager as described with reference to FIGS. 18 through 21. In some examples, a base station may execute a set of instructions to control the functional elements of the base station to perform the functions described herein. Additionally or alternatively, a base station may perform aspects of the functions described herein using special-purpose hardware.

At 2405, the base station may transmit an indicator of reserved resources in a shared radio frequency spectrum band. The operations of 2405 may be performed according to the methods described herein. In some examples, aspects of the operations of 2405 may be performed by a reserved resources indication transmitter as described with reference to FIGS. 18 through 21.

In some implementations, the base station may identify a location of a CCA gap relative to the reserved resources. Identifying the location of the CCA gap relative to the reserved resources may be performed according to the methods described herein. In some examples, aspects of identifying the location of the CCA gap relative to the reserved resources may be performed by a CCA gap identifier as described with reference to FIGS. 18 through 21.

At 2410, the base station may receive, within the shared radio frequency spectrum band, a rate matched uplink shared data channel transmission. The operations of 2410 may be performed according to the methods described herein. In some examples, aspects of the operations of 2410 may be performed by a rate match uplink transmission receiver as described with reference to FIGS. 18 through 21.

At 2415, the base station may de-rate match the rate matched uplink shared data channel transmission based on the reserved resources. The operations of 2415 may be performed according to the methods described herein. In some examples, aspects of the operations of 2415 may be performed by a de-rate matching component as described with reference to FIGS. 18 through 21.

Figure 25:
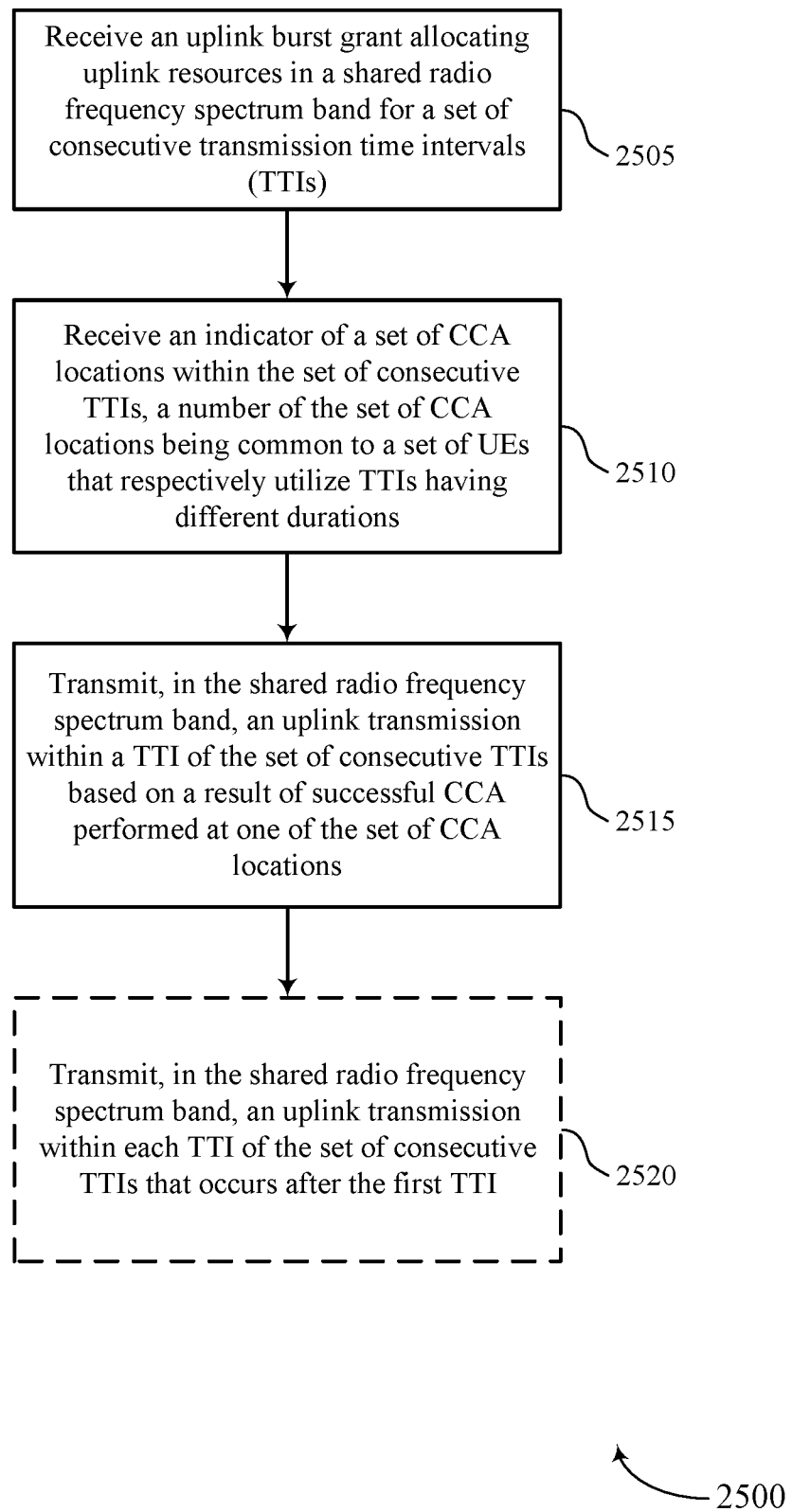

FIG. 25 shows a flowchart illustrating a method 2500 that supports shared channel design around reserved resources in accordance with aspects of the present disclosure. The operations of method 2500 may be implemented by a UE 115 or its components as described herein. For example, the operations of method 2500 may be performed by a communications manager as described with reference to FIGS. 14 through 17. In some examples, a UE may execute a set of instructions to control the functional elements of the UE to perform the functions described herein. Additionally or alternatively, a UE may perform aspects of the functions described herein using special-purpose hardware.

At 2505, the UE may receive an uplink burst grant allocating uplink resources in a shared radio frequency spectrum band for a set of consecutive TTIs. The operations of 2505 may be performed according to the methods described herein. In some examples, aspects of the operations of 2505 may be performed by an uplink burst grant receiver as described with reference to FIGS. 14 through 17.

At 2510, the UE may receive an indicator of a set of CCA locations within the set of consecutive TTIs, a number of the set of CCA locations being common to a set of UEs that respectively utilize TTIs having different durations. The operations of 2510 may be performed according to the methods described herein. In some examples, aspects of the operations of 2510 may be performed by a CCA locations component as described with reference to FIGS. 14 through 17.

At 2515, the UE may transmit, in the shared radio frequency spectrum band, an uplink transmission within a TTI of the set of consecutive TTIs based on a result of successful CCA performed at one of the set of CCA locations. The operations of 2515 may be performed according to the methods described herein. In some examples, aspects of the operations of 2515 may be performed by a consecutive uplink transmission component as described with reference to FIGS. 14 through 17.

In some cases, at 2520, the UE may transmit, in the shared radio frequency spectrum band, an uplink transmission within each TTI of the set of consecutive TTIs that occur after the first TTI, with or without performing CCA at each subsequent CCA location of the set of CCA locations. The operations of 2520 may optionally be performed according to the methods described herein. In some examples, aspects of the operations of 2520 may be performed by a consecutive uplink transmission component as described with reference to FIGS. 14 through 17.

Figure 26:
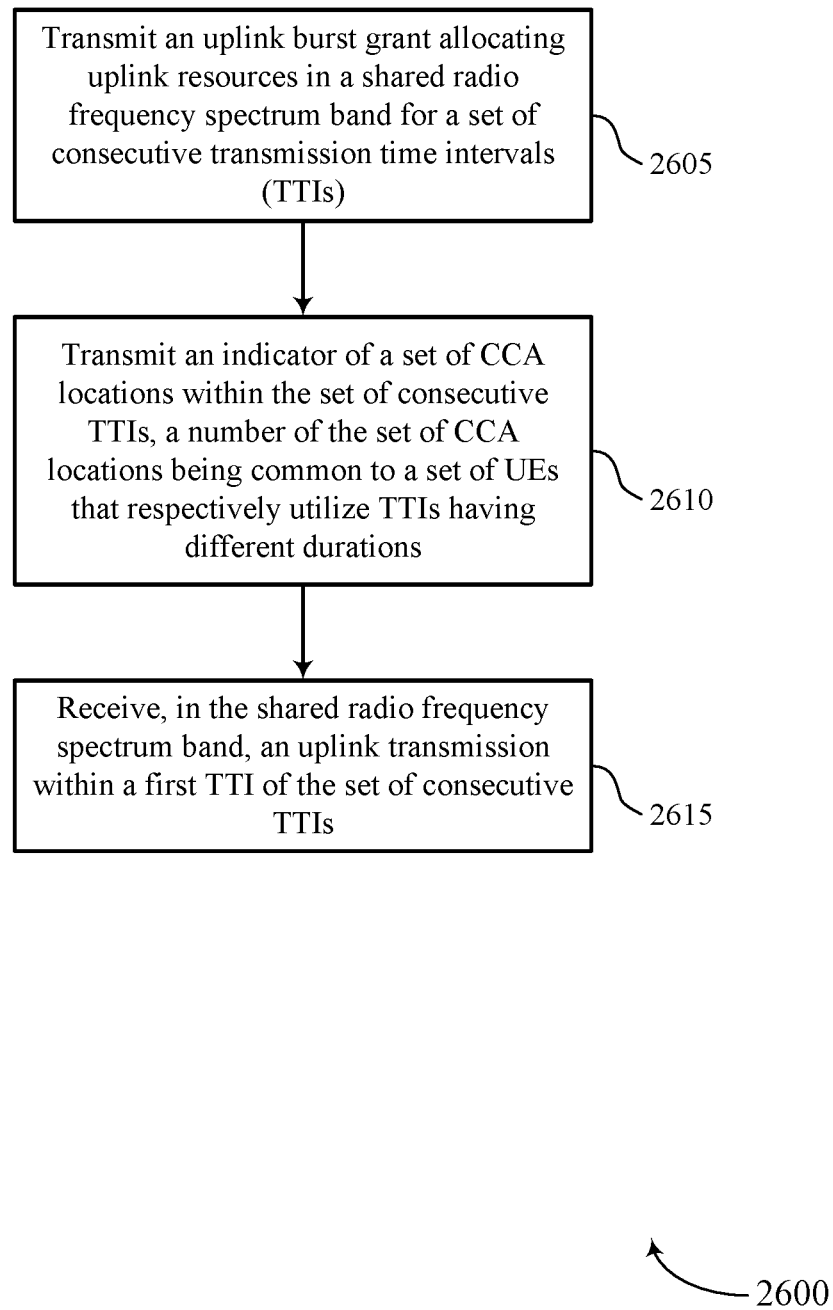

FIG. 26 shows a flowchart illustrating a method 2600 that supports shared channel design around reserved resources in accordance with aspects of the present disclosure. The operations of method 2600 may be implemented by a base station 105 or its components as described herein. For example, the operations of method 2600 may be performed by a communications manager as described with reference to FIGS. 18 through 21. In some examples, a base station may execute a set of instructions to control the functional elements of the base station to perform the functions described herein. Additionally or alternatively, a base station may perform aspects of the functions described herein using special-purpose hardware.

At 2605, the base station may transmit an uplink burst grant allocating uplink resources in a shared radio frequency spectrum band for a set of consecutive TTIs. The operations of 2605 may be performed according to the methods described herein. In some examples, aspects of the operations of 2605 may be performed by an uplink burst grant transmitter as described with reference to FIGS. 18 through 21.

At 2610, the base station may transmit an indicator of a set of CCA locations within the set of consecutive TTIs, a number of the set of CCA locations being common to a set of UEs that respectively utilize TTIs having different durations. The operations of 2610 may be performed according to the methods described herein. In some examples, aspects of the operations of 2610 may be performed by a CCA locations indicator as described with reference to FIGS. 18 through 21.

At 2615, the base station may receive, in the shared radio frequency spectrum band, an uplink transmission within a first TTI of the set of consecutive TTIs. The operations of 2615 may be performed according to the methods described herein. In some examples, aspects of the operations of 2615 may be performed by a burst uplink transmission receiver as described with reference to FIGS. 18 through 21.

Figure 27:
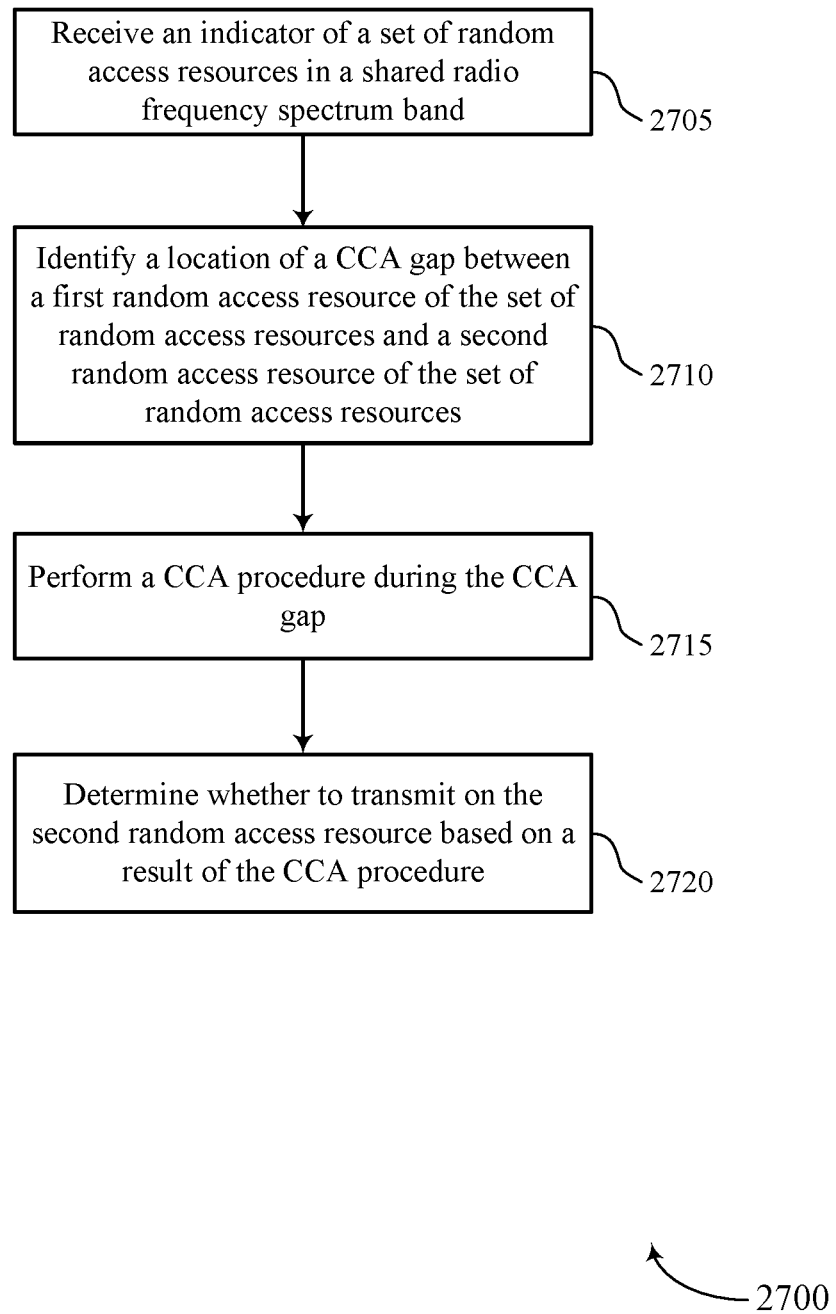

FIG. 27 shows a flowchart illustrating a method 2700 that supports shared channel design around reserved resources in accordance with aspects of the present disclosure. The operations of method 2700 may be implemented by a UE 115 or its components as described herein. For example, the operations of method 2700 may be performed by a communications manager as described with reference to FIGS. 14 through 17. In some examples, a UE may execute a set of instructions to control the functional elements of the UE to perform the functions described herein. Additionally or alternatively, a UE may perform aspects of the functions described herein using special-purpose hardware.

At 2705, receive an indicator of a set of random access resources in a shared radio frequency spectrum band. The operations of 2705 may be performed according to the methods described herein. In some examples, aspects of the operations of 2705 may be performed by a reserved resources indication receiver as described with reference to FIGS. 14 through 17.

At 2710, the UE may identify a location of a CCA gap between a first random access resource of the set of random access resources and a second random access resource of the set of random access resources. The operations of 2710 may be performed according to the methods described herein. In some examples, aspects of the operations of 2710 may be performed by a CCA gap identifier as described with reference to FIGS. 14 through 17.

At 2715, the UE may perform a CCA procedure during the CCA gap. The operations of 2715 may be performed according to the methods described herein. In some examples, aspects of the operations of 2715 may be performed by a CCA gap identifier as described with reference to FIGS. 14 through 17.

At 2720, the UE may determine whether to transmit on the second random access resource based on a result of the CCA procedure. The operations of 2720 may be performed according to the methods described herein. In some examples, aspects of the operations of 2720 may be performed by a rate matched transmission component as described with reference to FIGS. 14 through 17.

Figure 28:
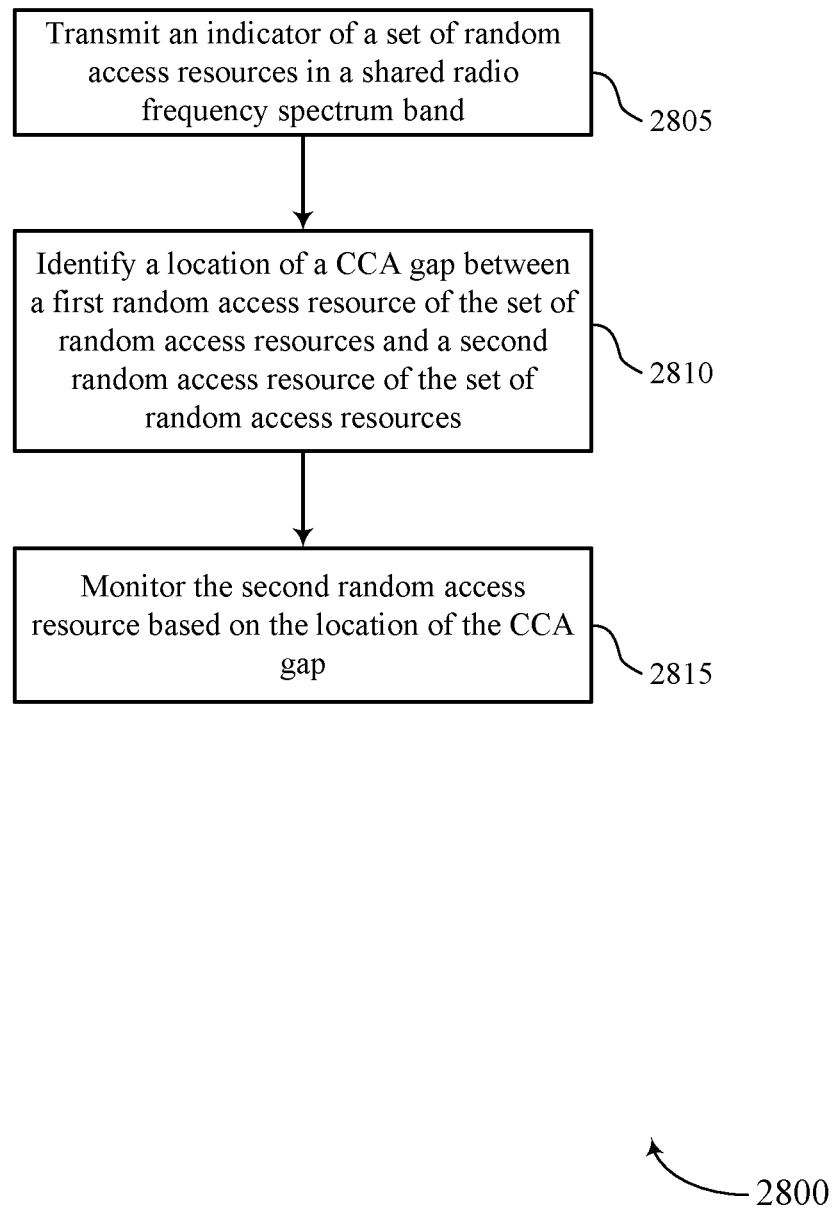

FIG. 28 shows a flowchart illustrating a method 2800 that supports shared channel design around reserved resources in accordance with aspects of the present disclosure. The operations of method 2800 may be implemented by a base station 105 or its components as described herein. For example, the operations of method 2800 may be performed by a communications manager as described with reference to FIGS. 18 through 21. In some examples, a base station may execute a set of instructions to control the functional elements of the base station to perform the functions described herein. Additionally or alternatively, a base station may perform aspects of the functions described herein using special-purpose hardware.

At 2805, the base station may transmit an indicator of a set of random access resources in a shared radio frequency spectrum band. The operations of 2805 may be performed according to the methods described herein. In some examples, aspects of the operations of 2805 may be performed by a reserved resources indication transmitter as described with reference to FIGS. 18 through 21.

At 2810, the base station may identify a location of a CCA gap between a first random access resource of the set of random access resources and a second random access resource of the set of random access resources. The operations of 2810 may be performed according to the methods described herein. In some examples, aspects of the operations of 2810 may be performed by a CCA gap identifier as described with reference to FIGS. 18 through 21.

At 2815, the base station may monitor the second random access resource based on the location of the CCA gap. The operations of 2815 may be performed according to the methods described herein. In some examples, aspects of the operations of 2815 may be performed by CCA gap identifier as described with reference to FIGS. 18 through 21.

In some cases, the techniques described herein may lead to some advantages for a UE 115 and base station 105. For example, by rate matching an uplink shared data channel transmission around reserved resources, throughput may on uplink shared channels be increased. These techniques may support the UE 115 to meet stringent reliability and latency conditions for some types of communications (e.g., URLLC) while still providing high throughput for other types of communications. Moreover, internal components of the UE 115 applying the techniques may improve power utilization by improving spectral efficiency such that the UE 115 performs fewer CCA procedures, which may reduce power consumption for components in the UE 115. Additionally, the techniques of providing CCA gaps between (e.g., and before) RACH occasions may increase spectral efficiency, throughput, and latency considerations, as the UE 115 may have increased likelihood to gain control of the transmission medium.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1λ, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving an indicator of a plurality of random access resources in a shared radio frequency spectrum band;
   identifying a location of a clear channel assessment (CCA) gap between a first random access resource of the plurality of random access resources and a second random access resource of the plurality of random access resources;
   performing a CCA procedure during the CCA gap; and
   determining whether to transmit on the second random access resource based at least in part on a result of the CCA procedure.

2. The method of claim 1, wherein the indicator indicates that the location of the CCA gap is between the first random access resource and the second random access resource.

3. The method of claim 1, wherein the CCA gap comprises a configurable number of symbol periods.

4. The method of claim 1, wherein a random access occasion associated with a random access resource of the plurality of random access resources comprises one or more of a random access cyclic prefix duration, a set of random access symbol periods, and a guard time.

5. The method of claim 1, wherein identifying the location of the CCA gap further comprises:
   determining that the CCA gap is located between the first random access resource and the second random access resource.

6. The method of claim 1, wherein identifying the location of the CCA gap further comprises:
   identifying the location of the CCA gap between each pair of random access resources within the plurality of random access resources.

7. The method of claim 6, further comprising:
   determining that a first subset of the plurality of random access resources correspond to a first TTI and a second subset of the plurality of random access resources correspond to a second TTI; and
   determining whether to use the second subset of the plurality of random access resources to transmit a random access message.

8. The method of claim 7, wherein determining whether to use the second subset of the plurality of random access resources further comprises:
   determining to use the second subset of the plurality of random access resources to send the random access message based at least in part on a TTI type indicator or a subframe format indicator (SFI) associated with the second TTI.

9. The method of claim 7, wherein determining whether to use the second subset of the plurality of random access resources further comprises:
   receiving a configuration message that indicates whether to use a random access resource of the plurality of random access resources that occurs within the second TTI.

10. A method for wireless communication at a base station, comprising:
    transmitting an indicator of a plurality of random access resources in a shared radio frequency spectrum band;
    identifying a location of a clear channel assessment (CCA) gap between a first random access resource of the plurality of random access resources and a second random access resource of the plurality of random access resources; and
    monitoring the second random access resource based at least in part on the location of the CCA gap.

11. The method of claim 10, wherein the indicator indicates that the location of the CCA gap is between the first random access resource of the plurality of random access resources and the second random access resource of the plurality of random access resources.

12. The method of claim 10, wherein the CCA gap comprises a configurable number of symbol periods.

13. The method of claim 10, further comprising:
    receiving a random access message during the first random access resource of the plurality of random access resources.

14. The method of claim 10, further comprising:
    receiving a random access message during each random access resource of the plurality of random access resources.

15. An apparatus for wireless communication at a user equipment (UE), comprising:
    a processor;
    memory coupled with the processor; and
    instructions stored in the memory and executable by the processor to cause the apparatus to:
      receive an indicator of a plurality of random access resources in a shared radio frequency spectrum band;
      identify a location of a clear channel assessment (CCA) gap between a first random access resource of the plurality of random access resources and a second random access resource of the plurality of random access resources;
      perform a CCA procedure during the CCA gap; and
      determine whether to transmit on the second random access resource based at least in part on a result of the CCA procedure.

16. The apparatus of claim 15, wherein the indicator indicates that the location of the CCA gap is between the first random access resource and the second random access resource.

17. The apparatus of claim 15, wherein the CCA gap comprises a configurable number of symbol periods.

18. The apparatus of claim 15, wherein a random access occasion associated with a random access resource of the plurality of random access resources comprises one or more of a random access cyclic prefix duration, a set of random access symbol periods, and a guard time.

19. The apparatus of claim 15, wherein the instructions to identify the location of the CCA gap are further executable by the processor to cause the apparatus to:
determine that the CCA gap is located between the first random access resource and the second random access resource.

20. The apparatus of claim 15, wherein the instructions to identify the location of the CCA gap are further executable by the processor to cause the apparatus to:
identify the location of the CCA gap between each pair of random access resources within the plurality of random access resources.

21. The apparatus of claim 20, wherein the instructions are further executable by the processor to cause the apparatus to:
determine that a first subset of the plurality of random access resources correspond to a first TTI and a second subset of the plurality of random access resources correspond to a second TTI; and
determine whether to use the second subset of the plurality of random access resources to transmit a random access message.

22. The apparatus of claim 21, wherein the instructions to determine whether to use the second subset of the plurality of random access resources are further executable by the processor to cause the apparatus to:
determine to use the second subset of the plurality of random access resources to send the random access message based at least in part on a TTI type indicator or a subframe format indicator (SFI) associated with the second TTI.

23. The apparatus of claim 21, wherein the instructions to determine whether to use the second subset of the plurality of random access resources are further executable by the processor to cause the apparatus to:
receive a configuration message that indicates whether to use a random access resource of the plurality of random access resources that occurs within the second TTI.

24. An apparatus for wireless communication at a base station, comprising:
a processor;
memory coupled with the processor; and
instructions stored in the memory and executable by the processor to cause the apparatus to:
transmit an indicator of a plurality of random access resources in a shared radio frequency spectrum band;
identify a location of a clear channel assessment (CCA) gap between a first random access resource of the plurality of random access resources and a second random access resource of the plurality of random access resources; and
monitor the second random access resource based at least in part on the location of the CCA gap.

25. The apparatus of claim 24, wherein the indicator indicates that the location of the CCA gap is between the first random access resource of the plurality of random access resources and the second random access resource of the plurality of random access resources.

26. The apparatus of claim 24, wherein the CCA gap comprises a configurable number of symbol periods.

27. The apparatus of claim 24, wherein the instructions are further executable by the processor to cause the apparatus to:
receive a random access message during the first random access resource of the plurality of random access resources.

28. The apparatus of claim 24, wherein the instructions are further executable by the processor to cause the apparatus to:
receive a random access message during each random access resource of the plurality of random access resources.

* * * * *